US012804591B2

(12) United States Patent
Li et al.

(10) Patent No.: US 12,804,591 B2
(45) Date of Patent: Nov. 17, 2026

(54) METHOD AND APPARATUS FOR RESOURCE RESELECTION IN A WIRELESS COMMUNICATION SYSTEM

(71) Applicant: ASUS Technology Licensing Inc., Taipei City (TW)

(72) Inventors: Ming-Che Li, Taipei City (TW); Li-Chih Tseng, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 0 days.

(21) Appl. No.: 19/408,225

(22) Filed: Dec. 3, 2025

(65) Prior Publication Data

US 2026/0205992 A1 Jul. 16, 2026

Related U.S. Application Data

(60) Provisional application No. 63/746,220, filed on Jan. 16, 2025.

(51) Int. Cl.

*H04W 64/00* (2009.01)
*H04L 1/1867* (2023.01)
*H04W 72/25* (2023.01)

(52) U.S. Cl.

CPC ........... *H04W 64/00* (2013.01); *H04L 1/1896* (2013.01); *H04W 72/25* (2023.01)

(58) Field of Classification Search

CPC ...... H04W 64/00; H04W 72/25; H04W 72/40
See application file for complete search history.

(56) References Cited

U.S. PATENT DOCUMENTS

| | | | | |
|---|---|---|---|---|
| 10,313,065 | B2 | 6/2019 | Lee et al. | |
| 12,389,432 | B1 * | 8/2025 | Li | H04L 1/1812 |
| 12,550,106 | B1 * | 2/2026 | Tseng | H04W 64/00 |
| 2023/0091628 | A1 * | 3/2023 | Nam | H04W 72/1263 370/329 |
| 2025/0274223 | A1 * | 8/2025 | Han | H04W 72/02 |

FOREIGN PATENT DOCUMENTS

| | | | |
|---|---|---|---|
| WO | 2023201464 | A1 | 10/2023 |

* cited by examiner

*Primary Examiner* — Barry W Taylor
(74) *Attorney, Agent, or Firm* — Skaar Ulbrich Macari, P.A.

(57) ABSTRACT

Methods, systems, and apparatuses are provided for resource reselection in a wireless communication system, wherein a method of a first device comprises receiving a configuration of a first sidelink resource pool for transmission of sidelink data and Sidelink Positioning Reference Signal (SL-PRS), setting or maintaining a first counter for sidelink resource reselection, performing a transmission of a data packet and an SL-PRS in the first sidelink resource pool, determining the transmission corresponding to a last transmission of the data packet and the SL-PRS based on only transmission status of the data packet, and decrementing the first counter by 1 in response to the determined last transmission.

17 Claims, 10 Drawing Sheets

METHOD AND APPARATUS FOR RESOURCE RESELECTION IN A WIRELESS COMMUNICATION SYSTEM

CROSS-REFERENCE TO RELATED APPLICATIONS

The present application claims priority to and the benefit of U.S. Provisional Patent Application Ser. No. 63/746,220, filed Jan. 16, 2025, which is hereby fully incorporated herein by reference.

FIELD

This disclosure generally relates to wireless communication networks and, more particularly, to a method and apparatus for resource selection of sidelink reference signals in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for resource reselection in a wireless communication system, to handle periodical sidelink resource reservation without abnormal termination.

In various embodiments, a method of a first device comprises receiving a configuration of a first sidelink resource pool for transmission of sidelink data and Sidelink Positioning Reference Signal (SL-PRS), setting or maintaining a first counter for sidelink resource reselection, performing a transmission of a data packet and an SL-PRS in the first sidelink resource pool, determining the transmission corresponding to a last transmission of the data packet and the SL-PRS based on only transmission status of the data packet, and decrementing the first counter by 1 in response to the determined last transmission, in accordance with embodiments of the present invention.

In various embodiments, a method of a first device comprises receiving a configuration of a first sidelink resource pool for transmission of sidelink data and SL-PRS, setting or maintaining a first counter for sidelink resource reselection, performing a transmission of a data packet and an SL-PRS in the first sidelink resource pool, determining the transmission corresponding to a last transmission of the data packet and the SL-PRS, if: the first device receives positive acknowledgement for the transmission of the data packet, the first device receives no negative acknowledgement for the transmission of the data packet if negative-only acknowledgement was enabled for the data packet, and/or the first device performs the transmission such that a first number of Hybrid Automatic Repeat Request (HARQ) retransmissions of the data packet has been reached, and decrementing the first counter by 1 in response to the determined last transmission, in accordance with embodiments of the present invention.

In various embodiments, a method of a first device comprises receiving a configuration of a sidelink resource pool for at least transmission of SL-PRS; if the sidelink resource pool is utilized for both transmission of sidelink data and SL-PRS: performing a transmission of a data packet and an SL-PRS in the sidelink resource pool, and determining the transmission corresponding to a last transmission of the data packet and the SL-PRS based on only transmission status of the data packet; decrementing a first counter for sidelink resource reselection by 1 in response to the determined last transmission; or if the sidelink resource pool is dedicated for transmission of SL-PRS: performing another transmission of an SL-PRS in the sidelink resource pool, determining the another transmission corresponding to a last transmission of the SL-PRS based on only transmission status of the SL-PRS, and decrementing a second counter for sidelink resource reselection by 1 in response to the determined last transmission, in accordance with embodiments of the present invention.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WIMAX®, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP TS 38.214 V18.44.0 (2024 September) 3GPP; TSG RAN; NR; Physical layer procedures for data (Release 18); [2] 3GPP TS 38.212 V18.4.0 (2024 September) 3GPP; TSG RAN; NR; Multiplexing and channel coding (Release 18); [3] 3GPP TS 38.331 V18.4.0 (2024 December) 3GPP; TSG RAN; NR; Radio Resource Control (RRC) protocol specification (Release 18); [4] 3GPP TS 38.321 V18.4.0 (2024 December) 3GPP; TSG RAN; NR; Medium Access Control (MAC) protocol specification (Release 18); [5] RAN1 Chair's Notes of 3GPP TSG RAN WG1 #116; and [6] R1-2401552, "Reply LS on MAC agreements for SL Positioning", RAN1. The standards and documents listed above are hereby expressly and fully incorporated herein by reference in their entirety.

Figure 1:
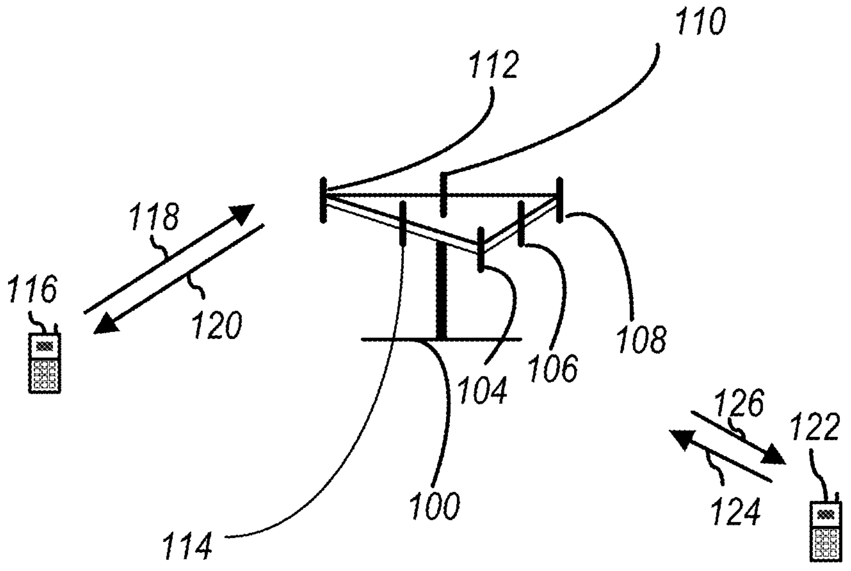
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
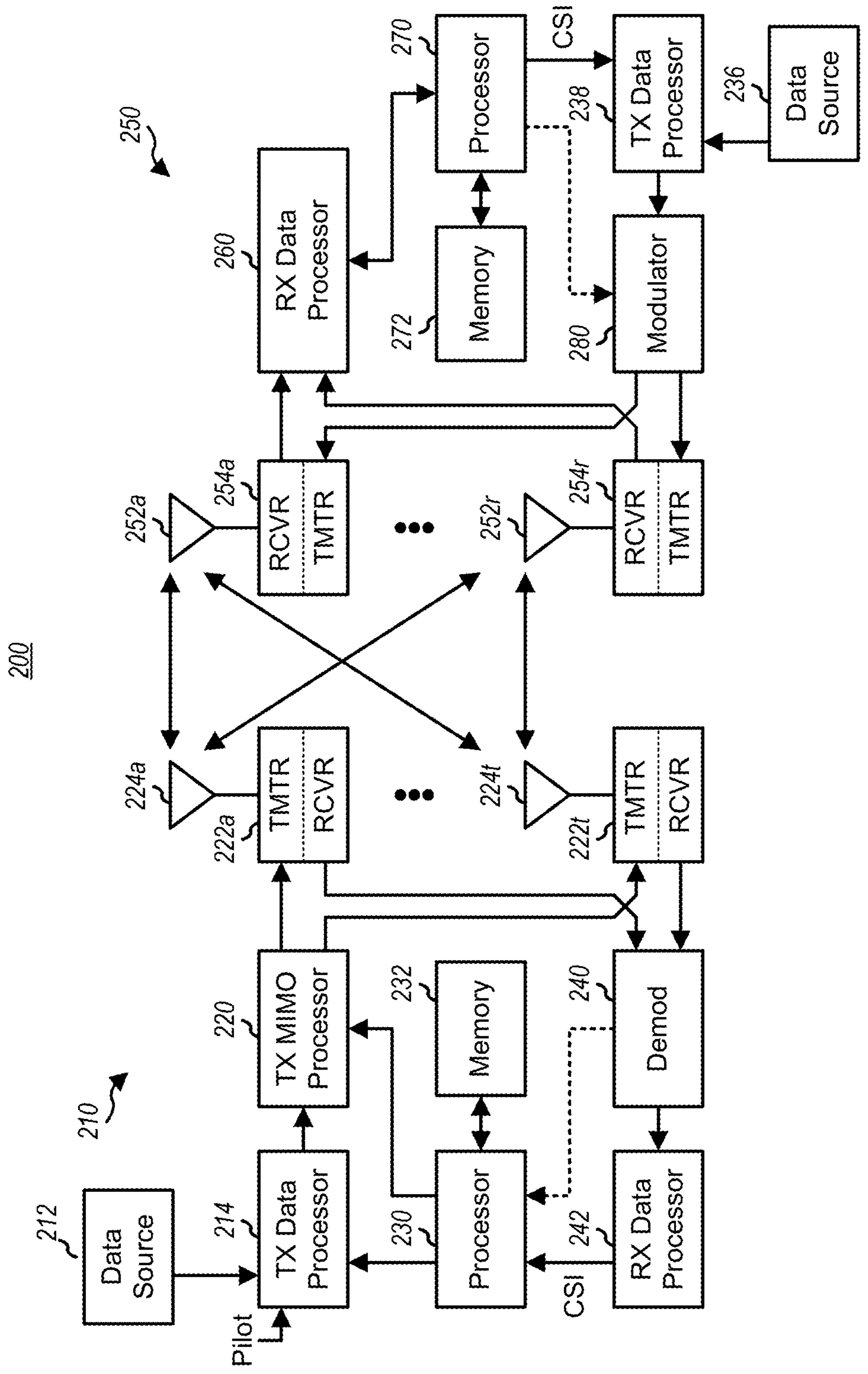
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by NR antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
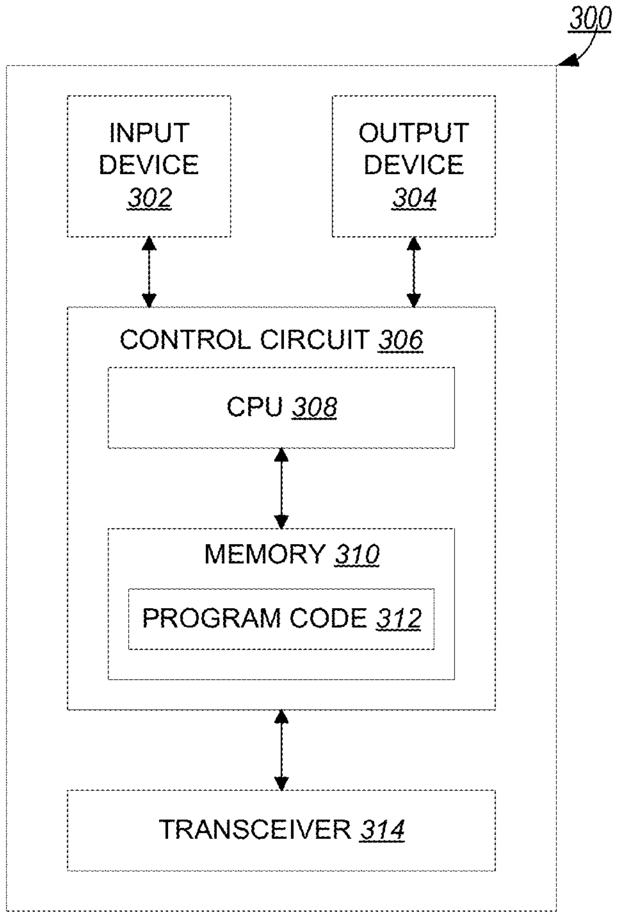
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
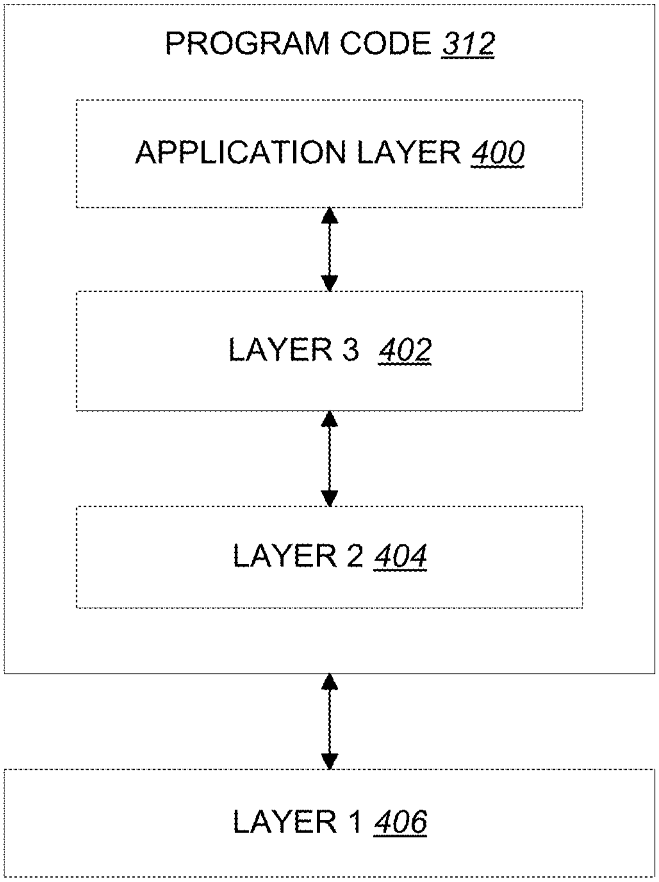
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-) bullets, points, actions, or claims described in each invention paragraph or section may be combined logically, reasonably, and properly to form a specific method.

Any sentence, paragraph, (sub-) bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In [1] 3GPP TS 38.214 V18.44.0 (2024 September) 3GPP, SL related procedure for data is specified:

Quotation [1] Start

8 Physical Sidelink Shared Channel Related Procedures

A UE can be configured by higher layers with one or more sidelink resource pools. A sidelink resource pool can be for transmission of PSSCH, as described in Clause 8.1, and/or SL PRS, as described in Clause 8.2.4, or for reception of PSSCH, as described in Clause 8.3, and/or SL PRS, as described in Clause 8.4.4, and can be associated with either sidelink resource allocation mode 1 or sidelink resource allocation mode 2.

A sidelink resource pool which can be used for transmission of both SL PRS and PSSCH will be referred to as shared SL PRS resource pool.

A sidelink resource pool which can be used for transmission of SL PRS and cannot be used for transmission of PSSCH will be referred to as dedicated SL PRS resource pool.

. . .

The set of slots that may belong to a sidelink resource pool is denoted by $$\left(t_0^{SL}, t_1^{SL}, \ldots, t_{T_{max}-1}^{SL}\right)$$

where $$0 \le t_i^{SL} < 10240 \times 2^{\mu}, 0 \le i < T_{max},$$

- the slot index is relative to slot #0 of the radio frame corresponding to SFN 0 of the serving cell or DFN 0,
- the set includes all the slots except the following slots,

. . .

The UE determines the set of logical slots assigned to a sidelink resource pool as follows:

- a bitmap $(b_0, b_1, \ldots, b_{L_{bitmap}-1})$ associated with the resource pool is used where $L_{bitmap}$ the length of the bitmap is configured by higher layers.
- a slot $$t_k^{SL}(0 \le k < 10240 \times 2^{\mu} - N_{S-SSB} - N_{nonSL} - N_{reserved})$$

belongs to the set if $b_{k'}=1$ where $k'=k \bmod L_{bitmap}$.

- The slots in the set are re-indexed such that the subscripts i of the remaining slots $$t_i'^{SL}$$

are successive $\{0, 1, \ldots, T'_{max}-1\}$ where $T'_{max}$ is the number of the slots remaining in the set.

The UE determines the set of resource blocks assigned to a sidelink resource pool as follows:

The resource block pool consists of $N_{PRB}$ PRBs.

8.1 UE Procedure for Transmitting the Physical Sidelink Shared Channel

Each PSSCH transmission is associated with an PSCCH transmission.

That PSCCH transmission carries the 1st stage of the SCI associated with the PSSCH transmission; the 2nd stage of the associated SCI is carried within the resource of the PSSCH.

If the UE transmits SCI format 1-A on PSCCH according to a PSCCH resource configuration in slot n and PSCCH resource m, then for the associated PSSCH transmission in the same slot

- one transport block is transmitted with up to two layers;
- . . .
- . . .

The UE shall set the contents of the SCI format 2-D as follows:

- the UE shall set value of the 'SL PRS resource ID' field as indicated by higher layers.
- the UE shall set value of the 'SL PRS request' field as indicated by higher layers.
- the UE shall set value of the 'Embedded SCI format' field as indicated by higher layers.
- if 'Embedded SCI format' indicates that SCI format 2-A is embedded within this SCI format 2-D then the UE shall include in the 'Embedded SCI format payload' field the fields of SCI format 2-A, set as specified above.
- if 'Embedded SCI format' indicates that SCI format 2-B is embedded within this SCI format 2-D then the UE shall include in the 'Embedded SCI format payload' field the fields of SCI format 2-B, set as specified above.

. . .

8.1.2.1 Resource Allocation in Time Domain

The UE shall transmit the PSSCH in the same slot as the associated PSCCH.

The minimum resource allocation unit in the time domain is a slot.

The UE shall transmit the PSSCH in consecutive symbols within the slot, subject to the following restrictions:

- The UE shall not transmit PSSCH in symbols which are not configured for sidelink. A symbol is configured for sidelink, according to higher layer parameters sl-StartSymbol and sl-LengthSymbols, where sl-StartSymbol is the symbol index of the first symbol of sl-LengthSymbols consecutive symbols configured for sidelink, except when sl-StartingSymbolFirst and sl-StartingSymbolSecond are provided for a SL-BWP. If sl-StartingSymbolFirst and sl-StartingSymbolSecond are provided for the SL-BWP, a symbol is configured for sidelink, according to higher layer parameters sl-StartingSymbolFirst and sl-LengthSymbols, where sl-StartingSymbolFirst is the symbol index of the first symbol of sl-LengthSymbols consecutive symbols configured for sidelink.
- . . .
- The UE shall not transmit PSSCH in symbols which are configured for use by PSFCH, if PSFCH is configured in this slot.
- The UE shall not transmit PSSCH in the last symbol configured for sidelink.
- The UE shall not transmit PSSCH in the symbol immediately preceding the symbols which are configured for use by PSFCH, if PSFCH is configured in this slot.
- . . .

8.1.2.2 Resource Allocation in Frequency Domain

The resource allocation unit in the frequency domain is the sub-channel.

The sub-channel assignment for sidelink transmission is determined using the "Frequency resource assignment" field in the associated SCI.

The lowest sub-channel for sidelink transmission is the sub-channel on which the lowest PRB of the associated PSCCH is transmitted.

. . .

8.1.4 UE Procedure for Determining the Subset of Resources to be Reported to Higher Layers in PSSCH Resource Selection in Sidelink Resource Allocation Mode 2

In resource allocation mode 2, the higher layer can request the UE to determine a subset of resources from which the higher layer will select resources for PSSCH/PSCCH transmission for a carrier. To trigger this procedure, in slot n for this carrier, the higher layer provides the following parameters for this PSSCH/PSCCH transmission:

- the resource pool from which the resources are to be reported;
- L1 priority, $prio_{TX}$;
- the remaining packet delay budget;
- . . .
- optionally, the resource reservation interval, $P_{rsvp\_TX}$, in units of msec.

. . .

8.1.5 UE Procedure for Determining Slots and Resource Blocks for PSSCH Transmission Associated with an SCI Format 1-A The set of slots and resource blocks for PSSCH transmission is determined by the resource used for the PSCCH transmission containing the associated SCI format 1-A, and fields 'Frequency resource assignment', 'Time resource assignment' of the associated SCI format 1-A as described below.

'Time resource assignment' carries logical slot offset indication of N=1 or 2 actual resources when sl-MaxNumPerReserve is 2, and N=1 or 2 or 3 actual resources when sl-MaxNumPerReserve is 3, in a form of time RIV (TRIV) field which is determined as follows:

```
if N = 1
  TRIV = 0
elseif N = 2
  TRIV = t1
else
  if (t2 − t1 − 1) ≤ 15
    TRIV = 30(t2 − t1 − 1) + t1 + 31
  else
    TRIV = 30(31 − t2 + t1) + 62 − t1
  end if
end if
```

where the first resource is in the slot where SCI format 1-A was received, and $t_i$ denotes i-th resource time offset in logical slots of a resource pool with respect to the first resource where for N=2, $1 \le t_1 \le 31$; and for N=3, $1 \le t_1 \le 30$, $t_1 < t_2 \le 31$.

The starting sub-channel $$n_{subCH,0}^{start}$$

of the first resource is determined according to clause 8.1.2.2. The number of contiguously allocated sub-channels for each of the N resources $L_{subCH} \ge 1$ and the starting sub-channel indexes of resources indicated by the received SCI format 1-A, except the resource in the slot where SCI format 1-A was received, are determined from "Frequency resource assignment" which is equal to a frequency RIV (FRIV) where.

If sl-MaxNumPerReserve is 2 then $$FRIV = n_{subCH,1}^{start} + \sum_{i=1}^{L_{subCH}-1} \left(N_{subchannel}^{SL} + 1 - i\right)$$

If sl-MaxNumPerReserve is 3 then $$FRIV = n_{subCH,1}^{start} + n_{subCH,2}^{start} \cdot \left(N_{subchannel}^{SL} + 1 - L_{subCH}\right) + \sum_{i=1}^{L_{subCH}-1} \left(N_{subchannel}^{SL} + 1 - i\right)^2$$

where $$n_{subCH,1}^{start}$$

denotes the starting sub-channel index for the second resource $$n_{subCH,2}^{start}$$

denotes the starting sub-channel index for the third resource $$N_{subchannel}^{SL}$$

is the number of sub-channels in a resource pool provided according to the higher layer parameter sl-NumSubchannel, or . . . .

. . .

If TRIV indicates N<sl-MaxNumPerReserve,

- if the higher layer parameter sl-TransmissionStructureForPSCCHandPSSCH is set to 'interlaceRB', the starting sub-channel indexes and the starting RB set indexes corresponding to sl-MaxNumPerReserve minus N last resources are not used.
- otherwise, the starting sub-channel indexes corresponding to sl-MaxNumPerReserve minus N last resources are not used.

The number of slots in one set of the time and frequency resources for transmission opportunities of PSSCH is given by $C_{resel}$ where $C_{resel}$=10*SL_RESOURCE_RESELECTION_COUNTER [10, TS 38.321] if configured else $C_{resel}$ IS set to 1.

If a set of sub-channels in slot $$t_m'^{SL}$$

is determined as the time and frequency resource for PSSCH transmission corresponding to the selected sidelink grant (described in [10, TS 38.321]), the same set of sub-channels in slots $$t_{m+j \times P'_{rsvp\_TX}}'^{SL}$$

are also determined for PSSCH transmissions corresponding to the same sidelink grant where j=1, 2, . . . , $C_{resel}-1$, $P_{rsvp\_TX}$, if provided, is converted from units of msec to units of logical slots, resulting in $P'_{rsvp\_TX}$ according to clause 8.1.7, and $$\left(t_0'^{SL}, t_1'^{SL}, t_2'^{SL}, \ldots\right)$$

is determined by Clause 8. Here, $P_{rsvp\_TX}$ is the resource reservation interval indicated by higher layers.

. . .

8.2.4 SL PRS Transmission Procedure

The following parameters for SL PRS transmission are associated with each SL PRS resource:

SL PRS resource ID provided by sl-PRS-ResourceID indicates an identity of a SL PRS resource. The SL PRS resource is identified by the SL PRS resource ID that is unique within a slot of a dedicated SL PRS resource pool. For a shared SL PRS resource pool, a SL PRS resource is uniquely identified by a combination of the SL PRS resource ID, SL PRS frequency domain allocation within a slot indicated by "frequency resource assignment" field in the associated SCI format 1-A, and a starting symbol within the slot as determined by clause 8.2.4.1.1.

sl-CombSize and sl-PRS-comb-offset indicates a comb offset and a comb size of the SL PRS resource in a dedicated SL PRS resource pool. sl-PRS-CombSizeN-AndReOffset indicates a comb offset and a comb size of the SL PRS resource in a shared SL PRS resource pool.

sl-PRS-starting-symbol and sl-NumberOfSymbols indicates the starting symbol index and the number of symbols of the SL PRS resource within a slot in a dedicated SL PRS resource pool. mNumberOfSymbols indicates the number of symbols of the SL PRS resource within a slot in a shared SL PRS resource pool.

For a dedicated SL PRS resource pool, SL PRS resources for a same $$\left\{L_{SL-PRS}, K_{comb}^{SL-PRS}\right\}$$

combination of number of SL PRS symbols $L_{SL-PRS}$ and comb size $$K_{comb}^{SL-PRS}$$

can be mapped to a set of consecutive symbols in a slot. SL PRS resources for different $$\left\{L_{SL-PRS}, K_{comb}^{SL-PRS}\right\}$$

combinations shall be mapped to non-overlapping sets of consecutive symbols in a slot. Up to four non-overlapping sets of consecutive symbols within a slot can be used to map SL PRS resources for same or different $$\left\{L_{SL-PRS}, K_{comb}^{SL-PRS}\right\}$$

combinations, where the case of four non-overlapping sets of consecutive symbols only applies when $$K_{comb}^{SL-PRS} = 2$$

for all the $$\left\{L_{SL-PRS}, K_{comb}^{SL-PRS}\right\}$$

combinations.

In the case of dedicated SL PRS resource pool, that PSCCH carries the SCI format 1-B associated with the SL PRS transmission.

. . .

8.2.4.1 Resource Allocation

In sidelink resource allocation mode 1:

for SL PRS transmission, dynamic grant, configured grant type 1, and configured grant type 2 are supported.

for a dedicated SL PRS resource pool, the UE shall perform the procedure described in clause 8.6 (excluding the case of PSSCH for retransmission of a transport block), with the following modifications:

"PSSCH for a transport block" is replaced by "SL PRS"

"PSSCH" is replaced by "SL PRS".

The total number of SL configured grants including type 1 and type 2 across all resource pools is not greater than 8.

8.2.4.1.1 Resource Allocation in Time Domain

The UE shall transmit the SL PRS in the same slot as the associated PSCCH.

For a dedicated SL PRS resource pool, the minimum resource allocation unit in the time domain is a SL PRS resource in a slot.

The UE shall transmit the SL PRS in consecutive symbols within the slot.

A UE does not transmit multiple SL PRS resources in the same slot.

For a shared SL PRS resource pool, the UE transmits the SL PRS in PSSCH symbols according to clause 8.1.2.1, with the following restrictions:

the number of contiguous symbols for SL PRS transmission, $L_{SL-PRS}$, shall correspond to one of the SL PRS resources in parameter SL-PRS-ResourceSharedSL-PRS-RP.

the UE shall not transmit SL PRS in symbols where associated PSCCH is transmitted.

the UE shall not transmit SL PRS and PSSCH DMRS in the same symbol.

the UE shall not transmit SL PRS and SL CSI-RS in the same symbol.

the UE shall transmit SL PRS on contiguous symbols either in between or after symbols where PSSCH DMRS is transmitted.

the UE shall transmit SL PRS only after the last symbol with second stage SCI.

For a given value of $L_{SL-PRS}$, SL PRS resource is mapped to the last consecutive $L_{SL-PRS}$ SL symbols in the slot that meet all the other restrictions For a dedicated SL PRS resource pool, the UE transmits SL PRS subject to the following restrictions:

the UE shall not transmit SL PRS and associated PSCCH in the same symbol;

the number of contiguous symbols and the starting symbol for SL PRS transmission shall correspond to one of the SL PRS resources in parameter SL-PRS-ResourceDedicatedSL-PRS-RP.

In sidelink resource allocation mode 1 for a shared SL PRS resource pool, the time domain behaviour for sidelink dynamic grants and sidelink configured grants for SL PRS follows the behaviour in clause 8.1.2.1.

In sidelink resource allocation mode 1 for a dedicated SL PRS resource pool, the time domain behaviour for sidelink dynamic grants and sidelink configured grants for SL PRS follows the behaviour in clause 8.1.2.1, with the following modifications:

"DCI format 3_0" is replaced by "DCI format 3_2".

"PSSCH" is replaced by "SL PRS".

8.2.4.1.2 Resource Allocation in Frequency Domain

For a shared SL PRS resource pool, the frequency domain resource assignment of a SL PRS resource is the same as PSSCH in the same slot.

For a dedicated SL PRS resource pool, the frequency domain resource assignment of a SL PRS resource is same as frequency resources of the resource pool provided by the higher layer parameter sl-RB-Number.

8.2.4.2 UE Procedure for Determining the Subset of Resources to be Reported to Higher Layers in SL PRS Resource Selection in a Dedicated SL PRS Resource Pool in Sidelink Resource Allocation Mode 2

In resource allocation mode 2 in a dedicated SL PRS resource pool, the higher layer can request the UE to determine a subset of resources from which the higher layer will select resources for SL PRS/PSCCH transmission. To trigger this procedure, in slot n, the higher layer provides the following parameters for this SL PRS/PSCCH transmission:

the resource pool from which the resources are to be reported;

L1 priority, $prio_{TX}$;

the remaining SL PRS delay budget;

Set of SL-PRS resource ID(s);

optionally, the resource reservation interval, $P_{rsvp\_TX}$, in units of msec.

. . .

The UE shall perform this procedure according to clause 8.1.4, with the following modifications:

"packet delay budget" is replaced by "SL PRS delay budget", partial sensing is not applicable in a dedicated SL PRS resource pool, "candidate single-slot resource" is replaced by "candidate SL PRS resource", a candidate SL PRS resource for transmission $R_{x,y}$ is defined as the SL PRS resource with index x within the Set of SL-PRS resource ID(s) provided by the higher layer and in slot $$t_y'^{SL},$$

"SCI format 1-A" is replaced by "SCI format 1-B", in step 5, the second condition is modified as follows: for any periodicity value allowed by the higher layer parameter sl-PRS-ResourceReservePeriodList and any SL PRS resource ID in the set of SL PRS resource ID(s) provided by the higher layer, and a hypothetical SCI format 1-B received in slot $$t_m'^{SL}$$

with 'Resource reservation period' field set to that periodicity value and indicating that SL-PRS resource ID, condition c in step 6 would be met, In condition b of step 6, the RSRP measurement is the PSCCH-RSRP over the DM-RS resource elements of the PSCCH;

In condition c of step 6 "determines according to clause 8.1.5 the set of resource blocks and slots" is replaced by "determines according to clause 8.2.4.2A the set of SL PRS resources and slots".

. . .

8.3 UE Procedure for Receiving the Physical Sidelink Shared Channel

. . .

For sidelink resource allocation mode 2, a UE upon detection of SCI format 1-A on PSCCH can decode PSSCH according to the detected SCI formats 2-A, 2-B, 2-C and 2-D, and associated PSSCH resource configuration configured by higher layers. The UE is not required to decode more than one PSCCH at each PSCCH resource candidate.

. . .

8.4.4 SL PRS Reception Procedure

The UE may be configured to measure and report one or more of the SL RSTD, SL Rx-Tx time difference, SL RTOA, SL PRS-RSRPP, for the first detected path and up to 8 additional detected paths, and SL PRS-RSRP measurements. The UE may be configured to measure and report one or more of the SL AoA, SL PRS-RSRPP for the first path and up to 2 additional detected paths, and SL PRS-RSRP measurement.

The UE may report an ARP ID associated with the reported measurements. The UE may provide the ARP location information via ARP-LocationInfo.

The UE uses the same ARP for both the transmission and reception of sidelink positioning reference signals while performing an SL Rx-Tx time difference measurement.

The UE may include SL PRS resource ID(s) when it reports one or more of the SL RSTD, SL Rx-Tx time difference, SL RTOA, SL AoA, SL PRS-RSRP, and SL PRS-RSRPP measurements.

For the SL RSTD, SL Rx-Tx time difference, SL RTOA, SL AoA, SL PRS-RSRP, and SL PRS-RSRPP measurements, the UE reports an associated SL PRS reception timestamp via higher layer parameter sl-TimeStamp. For SL Rx-Tx time difference, the UE may report an associated SL PRS transmission timestamp via higher layer parameter tx-TimeInfo and the UE may be configured to report a SL PRS transmission timestamp via associatedSL-PRS-Tx-TimeStampRequest. The timestamp includes the SFN, slot number, and optionally nr-PhysCellID, nr-ARFCN, nr-CellGlobalID, or the timestamp includes DFN, slot number, and optionally syncSourceType.

Quotation [1] End

In [2] 3GPP TS 38.212 V18.4.0 (2024 September) 3GPP, SL related control information is specified:

Quotation [2] Start 8.3 Sidelink Control Information on PSCCH

SCI carried on PSCCH is a 1st-stage SCI, which transports sidelink scheduling information.

8.3.1 1st-Stage SCI Formats

. . .

8.3.1.1 SCI Format 1-A

SCI format 1-A is used for the scheduling of PSSCH and 2nd-stage-SCI on PSSCH

The following information is transmitted by means of the SCI format 1-A:

- Priority—3 bits as specified in clause 5.4.3.3 of [12, TS 23.287] and clause 5.22.1.3.1 of [8, TS 38.321]. Value '000' of Priority field corresponds to priority value '1', value '001' of Priority field corresponds to priority value '2', and so on.
- Frequency resource assignment—number of bits determined by the following:
  . . .
- Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214].

Resource reservation period—$\lceil \log_2 N_{rsv\_period} \rceil$ bits as defined in clause 16.4 of [5, TS 38.213], where $N_{rsv\_period}$ is the number of entries in the higher layer parameter sl-ResourceReservePeriodList, if higher layer parameter sl-MultiReserveResource is configured; 0 bit otherwise.

- DMRS pattern—$\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.
- 2nd-stage SCI format—2 bits as defined in Table 8.3.1.1-1.
  . . .
- Modulation and coding scheme-5 bits as defined in clause 8.1.3 of [6, TS 38.214].
  . . .

TABLE 8.3.1.1-1

2nd-stage SCI formats

| Value of 2nd-stage SCI format field | 2nd-stage SCI format |
|---|---|
| 00 | SCI format 2-A |
| 01 | SCI format 2-B; or reserved if higher layer parameter sl-TransmissionStructureForPSCCHandPSSCH in SL-BWP-Config is configured |
| 10 | SCI format 2-C; or reserved if higher layer parameter sl-TransmissionStructureForPSCCHandPSSCH in SL-BWP-Config is configured and the COT sharing flag field is set to '1' |
| 11 | SCI format 2-D; or reserved if higher layer parameter sl-TransmissionStructureForPSCCHandPSSCH in SL-BWP-Config is configured |

. . .

8.3.1.2 SCI Format 1-B

SCI format 1-B is used for the scheduling of SL PRS for a dedicated SL PRS resource pool.

The following information is transmitted by means of the SCI format 1-B:

- Priority—3 bits as specified in clause 5.7 of [12, TS 23.586] and clause 5.22 of [8, TS 38.321]. Value '000' of Priority field corresponds to priority value '1', value '001' of Priority field corresponds to priority value '2', and so on.
- Source ID—12 or 24 bits determined by higher layer parameter sl-SRC-ID-LenDedicatedSL-PRS-RP, as defined in clause 16.4A of [5, TS 38.213].
- Destination ID—24 bits as defined in clause 16.4A of [5, TS 38.213].
- Cast type indicator—2 bits as defined in Table 8.3.1.2-1 and in clause 16.4A of [5, TS 38.213].
- Resource reservation period—$\lceil \log_2 N_{rsv\_period} \rceil$ bits as defined in clause 16.4A of [5, TS 38.213], where $N_{rsv\_period}$ is the number of entries in the higher layer parameter sl-PRS-ResourceReservePeriodList, if higher layer parameter sl-PRS-ResourceReservePeriodList is configured; 0 bit otherwise.
- Time resource assignment—5 bits when the value of the higher layer parameter sl-MaxNumPerReserveDedicatedSL-PRS-RP is configured to 2; otherwise 9 bits when the value of the higher layer parameter sl-MaxNumPerReserveDedicatedSL-PRS-RP is configured to 3, as defined in clause 8.2.4.2A of [6, TS 38.214]
- Resource ID indication—$\lceil \log_2 N_{SL\text{-}PRS} \rceil$ bits when the value of the higher layer parameter sl-MaxNumPerReserveDedicatedSL-PRS-RP is configured to 2; otherwise $\lceil 2 \log_2 N_{SL\text{-}PRS} \lceil$ bits when the value of the higher layer parameter sl-MaxNumPerReserveDedicatedSL-PRS-RP is configured to 3. The value $N_{SL\text{-}PRS}$ is the total number of SL PRS resources within a slot in a dedicated SL PRS resource pool and provided by the higher layer parameter sl-PRS-ResourcesDedicatedSL-PRS-RP.
- SL PRS request—1 bit as defined in clause 8.4.4 of [6, TS 38.214] when the higher layer parameter sl-SCI-basedSL-PRS-TxTriggerSCI1-B is provided; 0 bit otherwise.
- Reserved—$N_{reserved}$ bits as configured by higher layer parameter sl-NumReservedBitsSCI1B-DedicatedSL-PRS-RP, with value set to zero.
  . . .

8.4 Sidelink Control Information on PSSCH

SCI carried on PSSCH is a 2nd-stage SCI, which transports sidelink scheduling information, and/or inter-UE coordination related information.

8.4.1 2nd-Stage SCI Formats

. . .

8.4.1.1 SCI Format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

- HARQ process number—4 bits.
- New data indicator—1 bit.
- Redundancy version—2 bits as defined in Table 7.3.1.1.1-2.
- Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Cast type indicator—2 bits as defined in Table 8.4.1.1-1 and in clause 8.1 of [6, TS 38.214].

CSI request—1 bit as defined in clause 8.2.1 of [6, TS 38.214] and in clause 8.1 of [6, TS 38.214].

. . .

TABLE 8.4.1.1-1

Cast type indicator or COT sharing cast type

| Value of Cast type indicator or COT sharing cast type | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK; or reserved, if higher layer parameter sl-TransmissionStructureForPSCCHandPSSCH in SL-BWP-Config is configured |

8.4.1.2 SCI Format 2-B

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits.

New data indicator—1 bit.

Redundancy version—2 bits as defined in Table 7.3.1.1.1-2.

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Zone ID—12 bits as defined in clause 5.8.11 of [9, TS 38.331].

Communication range requirement-4 bits determined by higher layer parameter sl-ZoneConfigMCR-Index.

. . .

8.4.1.4 SCI Format 2-D

SCI format 2-D is used for the decoding of PSSCH and the scheduling of SL PRS for a shared SL PRS resource pool.

The following information is transmitted by means of the SCI format 2-D:

SL PRS resource ID—$\lceil \log_2 N_{SL\text{-}PRS} \rceil$ bits, where the value $N_{SL\text{-}PRS}$ is the total number of SL PRS resource IDs within a slot in a shared SL PRS resource pool and provided by the higher layer parameter sl-PRS-ResourcesSharedSL-PRS-RP.

SL PRS request-1 bit as defined in clause 8.4.4 of [6, TS 38.214] when the higher layer parameter sl-SCI-based-SL-PRS-Tx-Trigger-SCI2-D is provided; 0 bit otherwise.

Embedded SCI format-2 bits. This field indicates the embedded SCI format as defined in Table 8.4.1.4-1.

Embedded SCI format payload-number of bits determined according to Table 8.4.1.4-1. This field is set to the associated payload of the embedded SCI format indicated by the 'Embedded SCI format' field as defined in Table 8.4.1.4-1.

TABLE 8.4.1.4-1

Embedded SCI format and payload

| Value of the Embedded SCI format field | Embedded SCI format | Embedded SCI format payload |
|---|---|---|
| 00 | SCI format 2-A | Set to all fields included in SCI format 2-A. Padding bits, if necessary, are appended to the 'Embedded SCI format payload' field untill the bitwidth equals the larger payload size of SCI format 2-A and SCI format 2-B. |
| 01 | SCI format 2-B | Set to all fields included in SCI format 2-B. Padding bits, if necessary, are appended to the 'Embedded SCI format payload' field untill the bitwidth equals the larger payload size of SCI format 2-A and SCI format 2-B. |
| 10 | Reserved | Reserved |
| 11 | Reserved | Reserved |

. . .

8.4.5 Multiplexing of Coded $2^{nd}$-Stage SCI Bits to PSSCH

The coded $2^{nd}$-stage SCI bits are multiplexed onto PSSCH according to the procedures in Clause 8.2.1.

Quotation [2] End

In [3] 3GPP TS 38.331 V18.4.0 (2024 December) 3GPP, SL-PRS related configuration in RRC layer are specified:

Quotation [3] Start 6.3.5 Sidelink Information Elements

. . .

SL-PSSCH-TxConfigList

The IE SL-PSSCH-TxConfigList indicates PSSCH transmission parameters. When lower layers select parameters from the range indicated in IE SL-PSSCH-TxConfigList, the UE considers both configurations in IE SL-PSSCH-TxConfigList and the CBR-dependent configurations represented in IE SL-CBR-PriorityTxConfigList. Only one IE SL-PSSCH-TxConfig is provided per SL-TypeTxSync.

SL-PSSCH-TxConfigList information element

```
-- ASN1START
-- TAG-SL-PSSCH-TXCONFIGLIST-START
SL-PSSCH-TxConfigList-r16 ::=      SEQUENCE (SIZE (1..maxPSSCH-TxConfig-r16)) OF SL-PSSCH-TxConfig-r16
SL-PSSCH-TxConfig-r16 ::=          SEQUENCE {
  sl-TypeTxSync-r16                  SL-TypeTxSync-r16                  OPTIONAL,
-- Need R
  sl-ThresUE-Speed-r16               ENUMERATED {kmph60, kmph80, kmph100, kmph120,
                                       kmph140, kmph160, kmph180, kmph200},
  sl-ParametersAboveThres-r16        SL-PSSCH-TxParameters-r16,
```

-continued

SL-PSSCH-TxConfigList information element

```
   sl-ParametersBelowThres-r16          SL-PSSCH-TxParameters-r16,
   ...,
   [[
   sl-ParametersAboveThres-v1650        SL-MinMaxMCS-List-r16            OPTIONAL,
-- Need R
   sl-ParametersBelowThres-v1650        SL-MinMaxMCS-List-r16            OPTIONAL
-- Need R
   ]]
}
SL-PSSCH-TxParameters-r16 ::=        SEQUENCE {
   sl-MinMCS-PSSCH-r16                  INTEGER (0..27),
   sl-MaxMCS-PSSCH-r16                  INTEGER (0..31),
   sl-MinSubChannelNumPSSCH-r16         INTEGER (1..27),
   sl-MaxSubchannelNumPSSCH-r16         INTEGER (1..27),
   sl-MaxTxTransNumPSSCH-r16            INTEGER (1..32),
   sl-MaxTxPower-r16                    SL-TxPower-r16                   OPTIONAL
-- Cond CBR
}
-- TAG-SL-PSSCH-TXCONFIGLIST-STOP
-- ASN1STOP
```

| SL-PSSCH-TxConfigList field descriptions |
|---|
| sl-MaxTxTransNumPSSCH<br>Indicates the maximum transmission number (including new transmission and retransmission) for PSSCH.<br>...<br>... |

SL-PRS-ResourcePool

The IE SL-PRS-ResourcePool specifies the configuration information for NR sidelink PRS dedicated resource pool.

SL-PRS-ResourcePool information element

```
-- ASN1START
-- TAG-SL-PRS-RESOURCEPOOL-START
SL-PRS-ResourcePool-r18 ::=                              SEQUENCE {
   sl-PRS-PSCCH-Config-r18                                  SetupRelease { SL-PSCCH-ConfigDedicatedSL-PRS-RP-
r18}      OPTIONAL,   -- Need M
   sl-StartRB-SubchannelDedicatedSL-PRS-RP-r18              INTEGER (0..265)
OPTIONAL,   -- Need M
   sl-FilterCoefficient-r18                                 FilterCoefficient
OPTIONAL,   -- Need M
   sl-ThreshS-RSSI-PRS-CBR-r18                              INTEGER (0..45)
OPTIONAL,   -- Need M
   sl-RB-Number-r18                                         INTEGER (10..275)
OPTIONAL,   -- Need M
   sl-TimeResource-r18                                      BIT STRING (SIZE (10..160))
OPTIONAL,   -- Need M
   sl-PosAllowedResourceSelectionConfig-r18                 ENUMERATED {c1, c2, c3}
OPTIONAL,   -- Need M
   sl-PRS-ResourceReservePeriodList-r18                     SEQUENCE (SIZE (1..16)) OF SL-
ReservationPeriodAllowedDedicatedSL-PRS-RP-r18
OPTIONAL,
   sl-PRS-ResourcesDedicatedSL-PRS-RP-r18                   SEQUENCE (SIZE (1..12)) OF SL-PRS-
ResourceDedicatedSL-PRS-RP-r18 OPTIONAL,   -- Need M
   sl-PRS-PowerControl-r18                                  SL-PRS-PowerControl-r18
OPTIONAL,   -- Need M
   sl-SensingWindowDedicatedSL-PRS-RP-r18                   ENUMERATED {ms100, ms1100}
OPTIONAL,   -- Need M
   sl-TxPercentageDedicatedSL-PRS-RP-List-r18               SEQUENCE (SIZE (8)) OF SL-TxPercentageDedicatedSL-
PRS-RP-Config-r18 OPTIONAL, -- Need M
   sl-SCI-basedSL-PRS-TxTriggerSCI1-B-r18                   BOOLEAN
OPTIONAL,   -- Need M
   sl-NumSubchannelDedicatedSL-PRS-RP-r18                   INTEGER (1..27)
OPTIONAL,   -- Need M
   sl-SubchannelSizeDedicatedSL-PRS-RP-r18                  ENUMERATED {n10, n12, n15, n20, n25, n50, n75, n100}
OPTIONAL,   -- Need M
   sl-MaxNumPerReserveDedicatedSL-PRS-RP-r18                ENUMERATED {n2, n3}
OPTIONAL,   -- Need M
   sl-NumReservedBitsSCI1B-DedicatedSL-PRS-RP-r18 INTEGER (0..20)
```

-continued

SL-PRS-ResourcePool information element

```
OPTIONAL,   -- Need R
   sl-SRC-ID-LenDedicatedSL-PRS-RP-r18                ENUMERATED {n12, n24}
OPTIONAL,   -- Need M
   sl-CBR-PriorityTxConfigDedicatedSL-PRS-RP-List-r18          SEQUENCE (SIZE (1..8)) OF SL-
PriorityTxConfigIndexDedicatedSL-PRS-RP-r18
OPTIONAL,   -- Need M
   sl-TimeWindowSizeCBR-DedicatedSL-PRS-RP-r18          ENUMERATED {ms100, slot100}
OPTIONAL,   -- Need M
   sl-TimeWindowSizeCR-DedicatedSL-PRS-RP-r18           ENUMERATED {ms1000, slot1000}
OPTIONAL,   -- Need M
   sl-CBR-CommonTxDedicatedSL-PRS-RP-List-r18           SL-CBR-CommonTxDedicatedSL-PRS-RP-List-r18
OPTIONAL,   -- Need M
   sl-PriorityThreshold-UL-URLLC-r18                    INTEGER (1..9)
OPTIONAL,   -- Need M
   sl-PriorityThreshold-r18                             INTEGER (1..9)
OPTIONAL,   -- Need M
   sl-SelectionWindowListDedicatedSL-PRS-RP-r18         SEQUENCE (SIZE (8)) OF SL-
SelectionWindowConfigDedicated-SL-PRS-RP-r18
OPTIONAL,   -- Need M
   sl-Thres-RSRP-ListDedicatedSL-PRS-RP-r18             SEQUENCE (SIZE (64)) OF SL-PRS-ThresRSRP-r18
OPTIONAL,   -- Need M
   sl-PreemptionEnableDedicatedSL-PRS-RP-r18            ENUMERATED {enabled, pl1, pl2, pl3, pl4, pl5, pl6,
pl7, pl8}   OPTIONAL   -- Need R
}
...
SL-ReservationPeriodAllowedDedicatedSL-PRS-RP-r18 ::= CHOICE {
   sl-ResourceReservePeriod1-r18                     ENUMERATED {ms0, ms100, ms160, ms200, ms300, ms320,
ms400, ms500, ms600, ms640,
                                                              ms700, ms800, ms900, ms1000, ms1280,
ms2560, ms5120, ms10240},
   sl-ResourceReservePeriod2-r18                     INTEGER (1..99)
}
SL-PRS-ResourceDedicatedSL-PRS-RP-r18::=            SEQUENCE {
   sl-PRS-ResourceID-r18                                INTEGER (0..11)
OPTIONAL,   -- Need M
   sl-NumberOfSymbols-r18                               INTEGER (1..9)
OPTIONAL,   -- Need M
   sl-CombSize-r18                                      ENUMERATED{n2, n4, n6}
OPTIONAL,   -- Need R
   sl-PRS-starting-symbol-r18                           INTEGER (4..12)
OPTIONAL,   -- Need M
   sl-PRS-comb-offset-r18                               INTEGER(1..5)
OPTIONAL    -- Need M
}
...
SL-TxPercentageDedicatedSL-PRS-RP-Config-r18::= SEQUENCE {
   sl-TxPercentageDedicatedSL-PRS-RP-r18                   INTEGER (1..8)
OPTIONAL,   -- Need M
   sl-Priority-DedicatedSL-PRS-RP                          ENUMERATED {p20, p35, p50}
OPTIONAL    -- Need M
}
SL-PriorityTxConfigIndexDedicatedSL-PRS-RP-r18 ::= SEQUENCE {
   sl-PriorityThresholdDedicatedSL-PRS-RP-r18                INTEGER (1..8)
OPTIONAL,   -- Need M
   sl-DefaultTxConfigIndexDedicatedSL-PRS-RP-r18             INTEGER (0..maxCBR-LevelDedSL-PRS-1-r18)
OPTIONAL,   -- Need M
   sl-CBR-ConfigIndexDedicatedSL-PRS-RP-r18                  INTEGER (0..maxCBR-ConfigDedSL-PRS-1-r18)
OPTIONAL,   -- Need M
   sl-PRS-TxConfigIndexList-r18                              SEQUENCE (SIZE (1.. maxCBR-LevelDedSL-PRS-1-
r18)) OF SL-PRS-TxConfigIndex-r18
OPTIONAL    -- Need M
}
SL-PRS-TxConfigIndex-r18 ::=   INTEGER (0.. maxNrofSL-PRS-TxConfig-r18)
SL-SelectionWindowConfigDedicated-SL-PRS-RP-r18::= SEQUENCE {
   sl-PRS-Priority-r18                                       INTEGER (1..8),
   sl-PRS-SelectionWindow-r18                                ENUMERATED {n1, n5, n10, n20}
}
SL-PRS-ThresRSRP-r18 ::=      INTEGER (0..66)
-- TAG-SL-PRS-RESOURCEPOOL-STOP
-- ASN1STOP
```

| SL-PRS-ResourcePool field descriptions |
|---|
| sl-CBR-ConfigIndexDedicatedSL-PRS-RP<br>Indicates the CBR ranges to be used by an index to the entry of the CBR range configuration in sl-CBR-RangeDedicatedSL-PRS-RP-List. |
| sl-CBR-PriorityTxConfigDedicatedSL-PRS-RP-List<br>Indicates the mapping between SL-PRS transmission parameter (such as transmission power, etc.) sets by using the indexes of the configurations<br>in sl-CBR-SL-PRS-TxConfigList, CBR ranges by using the indexes to the entry of the CBR range configurations in sl-CBR-SL-PRS-RangeDedicatedSL-PRS-RP-List, and priority ranges. It also indicates the default SL-PRS transmission parameters to be used when CBR measurement results are not available. |
| sl-DefaultTxConfigIndexDedicatedSL-PRS-RP<br>Indicates the SL PRS transmission parameters to be used by the UEs which do not have available CBR measurement results, by means of an index to the corresponding entry in sl-PRS-TxConfigIndexList. Value 0 indicates the first entry in sl-PRS-TxConfigIndexList. The field is ignored if the UE has available CBR measurement results. |
| ... |
| sl-MaxNumPerReserveDedicatedSL-PRS-RP<br>Indicates the maximum number of SL PRS reservations that can be indicated by an SCI. |
| ... |
| sl-PosAllowedResourceSelectionConfig<br>Indicates allowed resource allocation method configured per resource pool.<br>C1: only sensing allowed<br>c2: only random resource selection allowed<br>c3: sensing and random resource selection allowed |
| ... |
| sl-PRS-ResourceReservePeriodList<br>Indicates set of possible resource reservation period in the unit of ms allowed in the resource pool. Up to 16 values can be configured per resource pool. The value ms0 is always configured. |
| sl-PRS-ResourcesDedicatedSL-PRS-RP<br>Indicates SL PRS resources in a slot of dedicated SL PRS resource pool as defined in TS 38.211 [16]. |
| ... |
| ... |

SL-ResourcePool

The IE SL-ResourcePool specifies the configuration information for NR sidelink communication resource pool.

SL-ResourcePool information element

```
-- ASN1START
-- TAG-SL-RESOURCEPOOL-START
SL-ResourcePool-r16 ::=                    SEQUENCE {
  sl-PSCCH-Config-r16                        SetupRelease { SL-PSCCH-Config-r16 }
OPTIONAL,   -- Need M
  sl-PSSCH-Config-r16                        SetupRelease { SL-PSSCH-Config-r16 }
OPTIONAL,   -- Need M
  sl-PSFCH-Config-r16                        SetupRelease { SL-PSFCH-Config-r16 }
OPTIONAL,   -- Need M
  ...
  sl-UE-SelectedConfigRP-r16                 SL-UE-SelectedConfigRP-r16
OPTIONAL,   -- Need M
  ...
  sl-PRS-ResourcesSharedSL-PRS-RP-r18 SEQUENCE (SIZE (1..17)) OF SL-PRS-ResourceSharedSL-PRS-RP-r18
OPTIONAL,   -- Need M
  numSym-SL-PRS-2ndStageSCI-r18              INTEGER (1..4)
OPTIONAL,   -- Need M
  sl-SCI-basedSL-PRS-TxTriggerSCI2-D-r18         BOOLEAN
OPTIONAL    -- Need M
  ]]
}
...
SL-UE-SelectedConfigRP-r16 ::=               SEQUENCE {
  sl-CBR-PriorityTxConfigList-r16                SL-CBR-PriorityTxConfigList-r16
OPTIONAL,   -- Need M
  sl-Thres-RSRP-List-r16                         SL-Thres-RSRP-List-r16
OPTIONAL,   -- Need M
  sl-MultiReserveResource-r16                    ENUMERATED {enabled}
OPTIONAL,   -- Need M
  sl-MaxNumPerReserve-r16                        ENUMERATED {n2, n3}
OPTIONAL,   -- Need M
  sl-SensingWindow-r16                           ENUMERATED {ms100, ms1100}
OPTIONAL,   -- Need M
  sl-SelectionWindowList-r16                     SL-SelectionWindowList-r16
OPTIONAL,   -- Need M
  sl-ResourceReservePeriodList-r16               SEQUENCE (SIZE (1..16)) OF SL-ResourceReservePeriod-r16
OPTIONAL,   -- Need M
  sl-RS-ForSensing-r16                           ENUMERATED {pscch, pssch},
  ...,
  [[
  sl-CBR-PriorityTxConfigList-v1650              SL-CBR-PriorityTxConfigList-v1650
OPTIONAL    -- Need M
  ]],
 [[
 sl-NRPSSCH-EUTRA-ThresRSRP-List-r18          SL-Thres-RSRP-List-r16
OPTIONAL,   -- Need S
 sl-NRPSFCH-EUTRA-ThresRSRP-List-r18          SL-Thres-RSRP-List-r16
OPTIONAL    -- Need S
 ]]
}
SL-ResourceReservePeriod-r16 ::=             CHOICE {
  sl-ResourceReservePeriod1-r16                  ENUMERATED {ms0, ms100, ms200, ms300, ms400, ms500, ms600,
ms700, ms800, ms900, ms1000},
  sl-ResourceReservePeriod2-r16                  INTEGER (1..99)
}
...
SL-PRS-ResourceSharedSL-PRS-RP-r18::=        SEQUENCE {
  sl-PRS-ResourceID-r18                        INTEGER (0..16),
  mNumberOfSymbols-r18                         INTEGER (1..9),
  sl-PRS-CombSizeN-AndReOffset-r18         CHOICE {
    n2-r18                                     INTEGER (0..1),
    n4-r18                                     INTEGER (0..3),
    dummy1                                     INTEGER (0..5),
    ...
  }
OPTIONAL      -- Need M
}
-- TAG-SL-RESOURCEPOOL-STOP
-- ASN1STOP
```

| SL-ResourcePool field descriptions |
|---|
| ... |
| sl-PRS-ResourcesSharedSL-PRS-RP<br>Indicates SL PRS resources in a slot of shared SL PRS resource pool as defined in TS 38.211 [16]. The UE can use the resource pool to transmit or receive SL-PRS only if this field is present. |
| ... |
| ... |

| SL-UE-SelectedConfigRP field descriptions |
|---|
| sl-CBR-PriorityTxConfigList<br>Indicates the mapping between PSSCH transmission parameter (such as MCS, PRB number, retransmission number, CR limit) sets by using the indexes of the configurations in sl-CBR-PSSCH-TxConfigList, CBR ranges by using the indexes to the entry of the CBR range configurations in sl-CBR-RangeConfigList, and priority ranges. It also indicates the default PSSCH transmission parameters to be used when CBR measurement results are not available, and MCS range for the MCS tables used in the resource pool. The field sl-CBR-PriorityTxConfigList-v1650 is present only when sl-CBR-PriorityTxConfigList-r16 is configured. |
| sl-MaxNumPerReserve<br>Indicates the maximum number of reserved PSCCH/PSSCH resources that can be indicated by an SCI. |
| sl-MultiReserveResource<br>Indicates if it is allowed to reserve a sidelink resource for an initial transmission of a TB by an SCI associated with a different TB, based on sensing and resource selection procedure. |
| ... |
| ... |

SL-UE-SelectedConfig

IE SL-UE-SelectedConfig specifies sidelink communication/positioning configurations used for UE autonomous resource selection.

SL-UE-SelectedConfig information element

```
-- ASN1START
-- TAG-SL-UE-SELECTEDCONFIG-START
SL-UE-SelectedConfig-r16 ::=                SEQUENCE {
  sl-PSSCH-TxConfigList-r16                   SL-PSSCH-TxConfigList-r16
OPTIONAL,   -- Cond SIB12
  sl-ProbResourceKeep-r16                     ENUMERATED {v0, v0dot2, v0dot4, v0dot6, v0dot8}
OPTIONAL,   -- Need R
  sl-ReselectAfter-r16                        ENUMERATED {n1, n2, n3, n4, n5, n6, n7, n8, n9}
OPTIONAL,   -- Need R
  sl-CBR-CommonTxConfigList-r16               SL-CBR-CommonTxConfigList-r16
OPTIONAL,   -- Need R
  ul-PrioritizationThres-r16                  INTEGER (1..16)
OPTIONAL,   -- Need R
  sl-PrioritizationThres-r16                  INTEGER (1..8)
OPTIONAL,   -- Need R
  ...,
  [[
  sl-CBR-CommonTxDedicatedSL-PRS-RP-List-r18     SL-CBR-CommonTxDedicatedSL-PRS-RP-List-r18
OPTIONAL -- Cond notSIB12
  ]]
}
-- TAG-SL-UE-SELECTEDCONFIG-STOP
-- ASN1STOP
```

| SL-UE-SelectedConfig field descriptions |
|---|
| sl-PrioritizationThres<br>Indicates the SL priority threshold, which is used to determine whether SL TX is prioritized over UL TX, as specified in TS 38.321 [3]. Network does not configure the sl-PrioritizationThres and the ul-PrioritizationThres to the UE separately. |
| sl-ProbResourceKeep<br>Indicates the probability with which the UE keeps the current resource when the resource reselection counter reaches zero for sensing based UE autonomous resource selection (see TS 38.321 [3]). |
| sl-PSSCH-TxConfigList<br>Indicates PSSCH TX parameters such as MCS, sub-channel number, retransmission number, associated to different UE absolute speeds and different synchronization reference types for UE autonomous resource selection. |

-continued

| SL-UE-SelectedConfig field descriptions |
|---|
| sl-ReselectAfter<br>Indicates the number of consecutive skipped transmissions before triggering resource reselection for sidelink communication (see TS 38.321 [3]).<br>ul-PrioritizationThres<br>Indicates the UL priority threshold, which is used to determine whether SL TX is prioritized over UL TX, as specified in TS 38.321 [3]. Network does not configure the sl-PrioritizationThres and the ul-PrioritizationThres to the UE separately. |

Quotation [3] End

In [4] 3GPP TS 38.321 V18.4.0 (2024 December) 3GPP, SL-PRS related procedures in MAC layer are specified:

Quotation [4] Start 3.1 Definitions

For the purposes of the present document, the terms and definitions given in TR 21.905 [1] and the following apply. A term defined in the present document takes precedence over the definition of the same term, if any, in TR 21.905 [1].

. . .

NR sidelink communication: AS functionality enabling at least V2X Communication as defined in TS 23.287 and ProSe communication (including ProSe non-Relay, UE-to-Network Relay and UE-to-UE Relay communication (including ProSe UE-to-UE Relay communication with integrated discovery)) as defined in TS 23.304 [26], between two or more nearby UEs, using NR technology but not traversing any network node.

NR sidelink discovery: AS functionality enabling ProSe non-Relay discovery, ProSe UE-to-Network Relay discovery and ProSe UE-to-UE Relay discovery for Proximity based Services as defined in TS 23.304 [26], between two or more nearby UEs, using NR technology but not traversing any network node.

NR sidelink transmission: Any NR Sidelink-based transmission, including transmission for NR sidelink discovery, transmission for NR sidelink communication, transmission for Ranging/Sidelink Positioning, and transmission for A2X communication.

. . .

Ranging/Sidelink Positioning: AS functionality enabling ranging-based services and sidelink positioning as specified in TS 23.586 [30].

. . .

Serving Cell: A PCell, a PSCell, or an SCell in TS 38.331 [5].

Shared SL-PRS resource pool: A sidelink resource pool which can be used for the transmission of both SL-PRS and PSSCH Sidelink transmission information: Sidelink transmission information included in an SCI for an SL-SCH transmission or SL-PRS transmission with or without SL-SCH transmission on Shared SL-PRS resource pool as specified in clause 8.3 and 8.4 of TS 38.212 [9] consists of Sidelink HARQ information including NDI, RV, Sidelink process ID, HARQ feedback enabled/disabled indicator, Sidelink identification information including cast type indicator, Source Layer-1 ID and Destination Layer-1 ID, and Sidelink other information including CSI request, SL-PRS request, SL-PRS resource ID, a priority, a communication range requirement and Zone ID and COT sharing information.

SL-PRS delay budget: Delay budget before which the SL-PRS is expected to be transmitted by the Tx UE.

SL-PRS transmission information on Dedicated SL-PRS resource pool: SL-PRS transmission information on Dedicated SL-PRS resource pool is included in an SCI for an SL-PRS transmission on Dedicated SL-PRS resource pool, as specified in TS 38.212 [9], consisting of

- SL-PRS identification information, including cast type indicator, source ID and destination ID;
- SL-PRS transmission other information, including SL-PRS priority, SL-PRS request, SL-PRS resource ID and resource reservation period.

. . .

5.22 SL-SCH Data Transfer and SL-PRS Transmission 5.22.1 SL-SCH Data and SL-PRS Transmission 5.22.1.1 SL Grant Reception and SCI Transmission Sidelink grant is received dynamically on the PDCCH, configured semi-persistently by RRC or autonomously selected by the MAC entity. The MAC entity may have a sidelink grant on an active SL BWP to determine a set of PSCCH duration(s) in which transmission of SCI occurs and a set of PSSCH duration(s) in which transmission of SL-SCH associated with the SCI occurs. The MAC entity may have a sidelink grant on the Shared SL-PRS resource pool of an active BWP to determine a set of PSCCH durations(s) in which transmission of SCI occurs and a set of SL-PRS transmission occasion(s) and PSSCH duration(s) in which transmission of SL-PRS and SL-SCH associated with the SCI occur. The MAC entity may have a sidelink grant on the Dedicated SL-PRS resource pool of an active BWP to determine a set of PSCCH duration(s) in which transmission of SCI occurs and a set of SL-PRS transmission occasion(s) in which transmission of SL-PRS associated to the SCI occurs. A sidelink grant addressed to SL-CS-RNTI with NDI=1 is considered as a dynamic sidelink grant. A sidelink grant addressed to SL-PRS-CS-RNTI with Activation/Release indication=1 as in clause 7.3.1.4.3 in TS 38.212 [9] is considered as a dynamic sidelink grant.

. . .

If the MAC entity has been configured with Sidelink resource allocation mode 2 to transmit or Sidelink resource allocation scheme 2 using pool(s) of resources in one carrier as indicated in TS 38.331 [5] or TS 36.331 based on full sensing, or partial sensing, or random selection or any combination(s); Or if the MAC entity has been configured with Sidelink resource allocation mode 2 to transmit using pool(s) of resources in multiple carriers as indicated in TS 38.331 [5] based on full sensing, or partial sensing, or random selection or any combination(s), the MAC entity shall for each Sidelink process:

NOTE 0A: For SL-PRS transmission by Sidelink resource allocation scheme 2 on Dedicated SL-PRS resource pool, partial sensing is not supported.

NOTE 1: If the MAC entity is configured with Sidelink resource allocation mode 2 or Sidelink resource allocation scheme 2 to transmit using a pool of resources in one carrier as indicated in TS 38.331 [5] or TS 36.331 [21]; Or if the MAC entity is configured with Sidelink resource allocation mode 2 transmit using pools of resources in multiple carriers as indicated in TS 38.331 [5], the MAC entity can create a selected sidelink grant on the pool of resources based on random selection, or partial sensing, or full sensing only after releasing configured sidelink grant(s), if any.

. . .

1> if the MAC entity has selected to create a selected sidelink grant corresponding to transmissions of multiple MAC PDUs, and SL data is available in a logical channel; or 1> if the MAC entity has selected to create a selected sidelink grant corresponding to transmission(s) of multiple SL-PRS(s), which have been triggered by the upper layer or by the reception of a SCI from a peer UE:

NOTE 2B1: The multiplicity/singularity of SL-PRS transmission and the reservation period for multiple SL-PRS transmission is determined by the UE's own upper layers by implementation within the service layer requirement for the Ranging/Sidelink positioning.

. . .

3> randomly select, with equal probability, an integer value in the interval [5, 15] for the resource reservation $$\left[5\times\left\lceil\frac{100}{\max(20, P_{rsvp\_TX})}\right\rceil, 15\times\left\lceil\frac{100}{\max(20, P_{rsvp\_TX})}\right\rceil\right]$$

interval higher than or equal to 100 ms or in the interval for the resource reservation interval lower than 100 ms and set SL_RESOURCE_RESELECTION_COUNTER to the selected value;

3> if the selected resource pool is not Dedicated SL-PRS resource pool:

4> select one of the allowed values configured by RRC in sl-ResourceReservePeriodList and set the resource reservation interval, $P_{rsvp\_TX}$, with the selected value;

4> select the number of HARQ retransmissions from the allowed numbers, if configured by RRC, in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) and pending SL-PRS transmission(s), if available, allowed on the carrier and the CBR measured by lower layers according to clause 5.1.27 of TS 38.215 if CBR measurement results are available or the corresponding sl-DefaultTxConfigIndex configured by RRC if CBR measurement results are not available or the corresponding sl-DefaultCBR-PartialSensing configured by RRC if partial sensing is selected and CBR measurement results are not available, or the corresponding sl-DefaultCBR-RandomSelection configured by RRC if random selection is selected and CBR measurement results are not available in case the sl-TxPoolExceptional is not used;

NOTE 3A0: The priority of SL-PRS is provided by the UE's own upper layers by implementation within the service layer requirement of the Ranging/Sidelink Positioning.

NOTE 3Aa0: When transmission is performed on Shared SL-PRS resource pool, the selected number of HARQ retransmissions also corresponds to the number of SL-PRS transmissions.

4> select an amount of frequency resources within the range, if configured by RRC, between sl-MinSubChannelNumPSSCH and sl-MaxSubchannelNumPSSCH included in sl-PSSCH-TxConfigList and, if configured by RRC, overlapped between sl-MinSubChannelNumPSSCH and sl-MaxSubchannelNumPSSCH indicated in sl-CBR-PriorityTxConfigList for the highest priority of the logical channel(s) and pending SL-PRS transmission(s), if available, allowed on the carrier and the CBR measured by lower layers according to clause 5.1.27 of TS 38.215 if CBR measurement results are available or the corresponding sl-DefaultTxConfigIndex configured by RRC if CBR measurement results are not available or the corresponding sl-DefaultCBR-PartialSensing configured by RRC if partial sensing is selected and CBR measurement results are not available, or the corresponding sl-DefaultCBR-RandomSelection configured by RRC if random selection is selected and CBR measurement results are not available in case the sl-TxPoolExceptional is not used;

3> else if the selected resource pool is Dedicated SL-PRS resource pool:

4> select one of the allowed values configured by RRC in sl-PRS-ResourceReservePeriodList and set the resource reservation interval, $P_{rsvp\_TX}$, with the selected value;

4> select the number of SL-PRS retransmissions from the allowed numbers, if configured by RRC, in sl-PRS-MaxNum-Transmissions included in sl-CBR-SL-PRS-TxConfigList.

3> if sl-InterUE-CoordinationScheme1 enabling reception/transmission of preferred resource set and non-preferred resource set is not configured by RRC:

. . .

5> else if the selected resource pool is not Dedicated SL-PRS resource pool:

6> randomly select the time and frequency resources for one transmission opportunity, or for more than one opportunities (if MAC entity decides a number of consecutive slots for Multi-consecutive slots transmission other than SL-PRS larger than 1), from the resources indicated by the physical layer as specified in clause 8.1.4 of TS 38.214 [7] which occur within the SL DRX Active time, if configured, as specified in clause 5.28.2 of the destination UE selected for indicating to the physical layer the SL DRX Active time above, according to the amount of selected frequency resources, the remaining PDB of SL data available in the logical channel(s), and the remaining SL-PRS delay budget of the SL-PRS transmission(s), if available, allowed on the carrier.

5> else if the selected resource pool is Dedicated SL-PRS resource pool:

6> randomly select the time and frequency resources for one transmission opportunity from the resources indicated by physical layer as clause 8.2.4 of TS 38.214 [7], according to the remaining SL-PRS delay budget of the SL-PRS transmission(s).

. . .

3> use the randomly selected resource(s) to select a set of periodic resources spaced by the resource reservation interval for transmissions of PSCCH, PSSCH and SL-PRS corresponding to the number of transmission opportunities of MAC PDUs or SL-PRSs determined in TS 38.214 [7].

3> if one or more SL-PRS retransmissions are selected and the selected resource pool is Dedicated SL-PRS resource pool:

4> randomly select the time and frequency resources for one or more transmission opportunities from the available resources, according to the selected number of retransmissions and the remaining SL-PRS delay budget and that a retransmission resource can be indicated by the time resource assignment of a prior SCI according to clause 8.3.1.1 of TS 38.212 [9];

4> use the randomly selected resource to select a set of periodic resources spaced by the resource reservation interval for transmissions of PSCCH and SL-PRS corresponding to the number of retransmission opportunities of SL-PRS;

4> consider the first set of transmission opportunities as the initial transmission opportunities and the other set(s) of transmission opportunities as the retransmission opportunities;

4> consider the sets of initial transmission opportunities and retransmission opportunities as the selected sidelink grant.

. . .

3> else if one or more HARQ retransmissions are selected and the selected resource pool is not Dedicated SL-PRS resource pool, and the number of selected transmission opportunities is less than the total number of transmissions (including initial transmission and retransmission) if MAC entity decides a number of consecutive slots for Multi-consecutive slots transmission other than SL-PRS larger than 1:

. . .

7> randomly select the time and frequency resources for one or more transmission opportunities from the available resources which occur within the SL DRX Active time, if configured, as specified in clause 5.28.2 of the destination UE selected for indicating to the physical layer the SL DRX Active time above, and the pool(s) in which all RB sets with Sidelink consistent LBT failure detected and not cancelled and the resources of which the lowest sub-channel includes intra cell guard band PRBs if sl-transmissionStructureForPSCCHand-PSSCH is set to 'contiguousRB' are excluded, if configured, according to the amount of selected frequency resources, the selected number of HARQ retransmissions, the remaining PDB of SL data available in the logical channel(s), and the remaining SL-PRS delay budget of the SL-PRS transmission(s), if available, allowed on the carrier by ensuring the minimum time gap between any two selected resources in case that PSFCH is configured for this pool of resources and that a retransmission resource can be indicated by the time resource assignment of a prior SCI according to clause 8.3.1.1 of TS 38.212 [9].

. . .

3> else:

4> if there are resources for more than one transmission opportunities in each period of the set of periodic resources selected:

5> consider the transmission opportunity which comes first in time as the initial transmission opportunity and other transmission opportunities as the retransmission opportunities.

4> consider the set as the selected sidelink grant.

3> use the selected sidelink grant to determine the set of PSCCH durations and the set of PSSCH durations and the set of SL-PRS transmission occasion(s), if available, according to TS 38.214 [7] if the selected resource pool is not Dedicated SL-PRS resource pool or to determine the set of PSCCH durations and SL-PRS transmission occasion(s) if the selected resource pool is Dedicated SL-PRS resource pool according to TS 38.214 [7].

2> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by RRC in sl-ProbResourceKeep:

3> clear the selected sidelink grant, if available;

3> randomly select, with equal probability, an integer value in the interval [5, 15] for the resource reservation interval higher than or equal to 100 ms or in the interval $$\left[5\times\left\lceil\frac{100}{\max(20, P_{rsvp\_TX})}\right\rceil, 15\times\left\lceil\frac{100}{\max(20, P_{rsvp\_TX})}\right\rceil\right]$$

for the resource reservation interval lower than 100 ms and set SL_RESOURCE_RESELECTION_COUNTER to the selected value;

3> reuse the previously selected sidelink grant for the number of transmissions of the MAC PDUs or SL-PRS(s) determined in TS 38.214 [7] with the resource reservation interval to determine the set of PSCCH durations, the set of PSSCH durations, and the pending SL-PRS transmission(s), if available, according to TS 38.214 [7].

. . .

. . .

The MAC entity shall for each PSCCH duration on Dedicated SL-PRS resource pool:

1> if the MAC entity is not configured with multiple SL-PRS transmissions with Sidelink resource allocation scheme 2; or 1> if the MAC entity is configured with Sidelink resource allocation scheme 1:

2> set the resource reservation period to 0.

1> else if the MAC entity is configured with multiple SL-PRS transmission with Sidelink resource allocation scheme 2:

2> set the resource reservation period to the selected value.

1> if the configured sidelink grant has been activated and this PSSCH duration corresponds to the first PSSCH transmission opportunity within this sl-PeriodCG of the configured sidelink grant:

2> set the SL-PRS Process ID to the SL-PRS Process ID associated with this PSSCH duration and, if available, all subsequent SL-PRS transmission occasion(s) occurring in this sl-PeriodCG for the configured sidelink grant;

2> determine that this SL-PRS transmission occasion is used for initial transmission.

1> process the sidelink grant according to clause 5.22.1.3.4 with the corresponding SL-PRS transmission information.

. . .

5.22.1.2 TX Resource (Re-)Selection Check

If the TX resource (re-)selection check procedure is triggered on the selected pool of resources for a Sidelink process according to clause 5.22.1.1, the MAC entity shall for the Sidelink process:

1> if PSCCH duration(s) and $2^{nd}$ stage SCI on PSSCH for all transmissions of a MAC PDU of any selected sidelink grant(s) are not in SL DRX Active time as specified in clause 5.28.3 of the destination that has data to be sent; or 1> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by RRC in sl-ProbResourceKeep; or 1> if the pool of resources is configured or reconfigured by RRC; or 1> if there is no selected sidelink grant on the selected pool of resources; or

1> . . .

2> if multiple carrier frequencies are configured:

3> trigger the TX carrier (re-)selection procedure as specified in clause 5.22.1.11.

NOTE 3a: It is up to UE implementation to avoid triggering the TX carrier (re-)selection procedure again if it has just performed TX carrier (re-)selection procedure.

2> clear the selected sidelink grant associated to the Sidelink process, if available;

2> trigger the TX resource (re-)selection.

. . .

5.22.1.3 Sidelink HARQ Operation and SL-PRS Transmission 5.22.1.3.1 Sidelink HARQ Entity The MAC entity is configured by upper layers to transmit using pool(s) of resources on one or more carriers as indicated in clause 5.8.8 of TS 38.331 [5]. For each carrier, the MAC entity includes at most one Sidelink HARQ entity for transmission on SL-SCH, which maintains a number of parallel Sidelink processes.

The maximum number of transmitting Sidelink processes associated with the Sidelink HARQ Entity is 16. A sidelink process may be configured for transmissions of multiple MAC PDUs. For transmissions of multiple MAC PDUs with Sidelink resource allocation mode 2, the maximum number of transmitting Sidelink processes associated with the Sidelink HARQ Entity is 4.

A delivered sidelink grant and its associated Sidelink transmission information are associated with a Sidelink process. Each Sidelink process supports one TB.

NOTE: For SL-PRS transmission on Dedicated SL-PRS resource pool, the maximum number of SL-PRS the UE should support is left to UE implementation.

For each sidelink grant, the Sidelink HARQ Entity shall:

1> if the MAC entity determines that the sidelink grant is used for initial transmission as specified in clause 5.22.1.1; or 1> if the sidelink grant is a configured sidelink grant and no MAC PDU has been obtained in an sl-PeriodCG of the configured sidelink grant; or 1> if the sidelink grant is a dynamic sidelink grant or selected sidelink grant and no MAC PDU has been obtained in the previous sidelink grant when PSCCH duration(s) and $2^{nd}$ stage SCI on PSSCH of the previous sidelink grant is not in SL DRX Active time as specified in clause 5.28.3 of any destination that has data to be sent:

NOTE 1: Void.

2> (re-)associate a Sidelink process to this grant, and for the associated Sidelink process:

2> if all PSCCH duration(s) and PSSCH duration(s) for initial transmission of a MAC PDU of the dynamic sidelink grant or the configured sidelink grant is not in SL DRX Active time as specified in clause 5.28.3 of the destination that has data to be sent:

3> ignore the sidelink grant.

NOTE 1A: The Sidelink HARQ Entity will associate the selected sidelink grant to the Sidelink process determined by the MAC entity.

2> else:

3> obtain the MAC PDU and SL-PRS, if any, to transmit from the Multiplexing and assembly entity, if any;

3> if a MAC PDU to transmit has been obtained:

4> if a HARQ Process ID has been set for the sidelink grant:

5> (re-)associate the HARQ Process ID corresponding to the sidelink grant to the Sidelink process.

NOTE 1a: There is one-to-one mapping between a HARQ Process ID and a Sidelink process in the MAC entity configured with Sidelink resource allocation mode 1.

4> determines Sidelink transmission information of the TB for the source and destination pair of the MAC PDU as follows:

5> set the Source Layer-1 ID to the 8 LSB of the Source Layer-2 ID of the MAC PDU;

5> set the Destination Layer-1 ID to the 16 LSB of the Destination Layer-2 ID of the MAC PDU;

5> (re-)associate the Sidelink process to a Sidelink process ID;

NOTE 1b: How UE determine Sidelink process ID in SCI is left to UE implementation for NR sidelink.

5> consider the NDI to have been toggled compared to the value of the previous transmission corresponding to the Sidelink identification information and the Sidelink process ID of the MAC PDU and set the NDI to the toggled value;

NOTE 2: The initial value of the NDI set to the very first transmission for the associated Sidelink process is left to UE implementation.

NOTE 3: Void.

5> if the MAC PDU is for NR sidelink discovery:

6> set the cast type indicator to broadcast.

5> else:

6> if the MAC PDU includes only Sidelink MAC CE(s):

7> if the MAC PDU includes only Sidelink Inter-UE Coordination Information MAC CE indicating non-preferred resource set and triggered by a condition other than the explicit request:

8> set the cast type indicator to one of broadcast, groupcast and unicast.

7> else:

8> set the cast type indicator to unicast.

6> else:

7> set the cast type indicator to one of broadcast, groupcast and unicast as indicated by upper layers.

5> if HARQ feedback has been enabled for the MAC PDU according to clause 5.22.1.4.2;

6> set the HARQ feedback enabled/disabled indicator to enabled.

5> else:

6> set the HARQ feedback enabled/disabled indicator to disabled.

5> set the priority to the value of the highest priority of the logical channel(s), if any, and MAC CE(s), if included, in the MAC PDU and SL-PRS, if any;

NOTE 3A: . . .

5> if HARQ feedback is enabled for groupcast:

6> if both a group size and a member ID are provided by upper layers and the group size is not greater than the number of candidate PSFCH resources in a slot associated with this sidelink grant:

7> select either positive-negative acknowledgement or negative-only acknowledgement.

NOTE 4: Selection of positive-negative acknowledgement or negative-only acknowledgement is up to UE implementation.

6> else:

7> select negative-only acknowledgement.

NOTE 5: UE operating in SL unlicensed does not use negative-only acknowledgement for groupcast HARQ feedback.

6> if negative-only acknowledgement is selected, UE's location information is available, and sl-TransRange has been configured for a logical channel in the MAC PDU, and sl-ZoneConfig is configured as specified in TS 38.331 [5]:

7> set the communication range requirement to the value of the longest communication range of the logical channel(s) in the MAC PDU;

7> determine the value of sl-ZoneLength corresponding to the communication range requirement and set Zone_id to the value of Zone_id calculated using the determined value of sl-ZoneLength as specified in TS 38.331 [5].

5> set the Redundancy version to the selected value.

5> if the upper layers triggers the SL-PRS transmission of the peer UE identified by the Destination layer-2 ID:

6> set the SL-PRS request to request.

5> set the SL-PRS resource ID, if SL-PRS is available, within Sidelink transmission information.

NOTE 6: The SL-PRS resource ID(s) for initial transmission and retransmission(s) are determined by the UE's own upper layers by implementation.

4> deliver the MAC PDU, the SL-PRS, if available, the sidelink grant and the Sidelink transmission information of the TB and/or the SL-PRS to the associated Sidelink process;

4> instruct the associated Sidelink process to trigger a new transmission.

3> else:

4> flush the HARQ buffer of the associated Sidelink process.

1> else (i.e. retransmission):

2> if the HARQ Process ID corresponding to the sidelink grant received on PDCCH, the configured sidelink grant or the selected sidelink grant is associated to a Sidelink process of which HARQ buffer is empty; or 2> if the HARQ Process ID corresponding to the sidelink grant received on PDCCH is not associated to any Sidelink process; or 2> if PSCCH duration(s) and PSSCH duration(s) for one or more retransmissions of a MAC PDU of the dynamic sidelink grant or the configured sidelink grant is not in SL DRX Active time as specified in clause 5.28.3 of the destination that has data to be sent:

3> ignore the sidelink grant.

2> else:

3> identify the Sidelink process associated with this grant, and for the associated Sidelink process:

4> set the SL-PRS resource ID, if SL-PRS is available, within Sidelink transmission information;

4> deliver the sidelink grant and the Sidelink transmission information of the MAC PDU and the SL-PRS, if available, to the associated Sidelink process;

4> instruct the associated Sidelink process to trigger a retransmission.

5.22.1.3.1a Sidelink Process not Associated with Dedicated SL-PRS Resource Pool

The Sidelink process is associated with a HARQ buffer.

New transmissions and retransmissions are performed on the resource indicated in the sidelink grant as specified in clause 5.22.1.1 and with the MCS selected as specified in clause 8.1.3.1 of TS 38.214 [7] and clause 5.22.1.1.

If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.

Priority of a MAC PDU and SL-PRS, if available, is determined by the highest priority of the logical channel(s), MAC CE(s) in the MAC PDU or SL-PRS.

If the Sidelink HARQ Entity requests a new transmission, the Sidelink process shall:

1> store the MAC PDU in the associated HARQ buffer;

1> store the sidelink grant received from the Sidelink HARQ Entity;

1> generate a transmission as described below.

If the Sidelink HARQ Entity requests a retransmission, the Sidelink process shall:

1> store the sidelink grant received from the Sidelink HARQ Entity;

1> generate a transmission as described below.

To generate a transmission, the Sidelink process shall:

1> if there is no uplink transmission; or

1> if the MAC entity is able to simultaneously perform uplink transmission(s) and sidelink transmission at the time of the transmission; or 1> if the other MAC entity and the MAC entity are able to simultaneously perform uplink transmission(s) and sidelink transmission at the time of the transmission respectively; or 1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:

2> instruct the physical layer to transmit SCI according to the stored sidelink grant with the associated Sidelink transmission information;

2> instruct the physical layer to generate a transmission according to the stored sidelink grant;

2> if HARQ feedback has been enabled for the MAC PDU according to clause 5.22.1.4.2:

3> instruct the physical layer to monitor PSFCH for the transmission and perform PSFCH reception as specified in clause 5.22.1.3.2.

2> if sl-PUCCH-Config is configured by RRC for the stored sidelink grant:

3> determine transmission of an acknowledgement on the PUCCH as specified in clause 5.22.1.3.2.

1> if this transmission corresponds to the last transmission of the MAC PDU and SL-PRS, if available:

2> decrement SL_RESOURCE_RESELECTION_COUNTER by 1, if available.

NOTE 1: If the number of HARQ retransmissions selected by the MAC entity has been reached, or if a positive acknowledgement to a transmission of the MAC PDU has been received, or if a negative-only acknowledgement was enabled in the SCI and no negative acknowledgement was received for the transmission of the MAC PDU, the MAC entity determines this transmission corresponds to the last transmission of the MAC PDU for Sidelink resource allocation mode 2. How to determine the last transmission in other cases is up to UE implementation.

1> if sl-MaxTransNum corresponding to the highest priority of the logical channel(s) in the MAC PDU has been configured in sl-CG-MaxTransNumList for the sidelink grant by RRC and the number of transmissions of the MAC PDU has been reached to sl-MaxTransNum; or 1> if a positive acknowledgement to this transmission of the MAC PDU was received according to clause 5.22.1.3.2, except a positive acknowledgement to Multi-consecutive slots transmission (i.e., multiple TBs case) of the MAC PDU and there is remaining slot(s) for this MAC PDU; or 1> if negative-only acknowledgement was enabled in the SCI and no negative acknowledgement was received for this transmission of the MAC PDU according to clause 5.22.1.3.2:

2> flush the HARQ buffer of the associated Sidelink process.

. . .

5.22.1.3.4 Processing of Sidelink Grant on Dedicated SL-PRS Resource Pool

For each sidelink grant, the MAC entity shall:

1> if the MAC entity determines that the sidelink grant is used for initial transmission as specified in clause 5.22.1.1; or 1> if the sidelink grant is a configured sidelink grant and no MAC PDU has been obtained in an sl-PeriodCG of the configured sidelink grant:

2> associate a Sidelink process to this sidelink grant;

2> set the Destination ID to the Destination layer-2 ID corresponding to the SL-PRS transmission;

2> if the length of the Source ID is configured to as 12 bit:

3> set the Source ID to the 12 LSB of the Source layer-2 ID corresponding to the SL-PRS transmission;

2> else if length of the Source ID is configured to as 24 bit:

3> set the Source ID to the Source layer-2 ID corresponding to the SL-PRS transmission;

2> set the cast type indicator to one of broadcast, groupcast and unicast as indicated by the upper layer;

2> set the SL-PRS priority as the value indicated by upper layer;

2> set the SL-PRS resource ID;

NOTE 1: The SL-PRS resource ID(s) for initial transmission and retransmission(s) are determined by the UE's own upper layers by implementation.

2> if the upper layer triggers SL-PRS transmission of the peer UE identified by the Destination layer-2 ID:

3> set the SL-PRS request to request;

2> deliver the SL-PRS transmission information to the Sidelink process;

2> instruct the associated Sidelink process to trigger a new transmission as defined in 5.22.1.3.5.

1> else (i.e., retransmission):

2> identify the Sidelink process associated with this grant;

2> if sl-PRS-MaxNumTransmissions is configured and the number of transmissions of the SL-PRS has not reached sl-PRS-MaxNumTransmissions:

3> set the SL-PRS resource ID;

3> deliver the SL-PRS transmission information to the Sidelink process;

3> instruct the associated Sidelink process to trigger a retransmission as defined in 5.22.1.3.5.

NOTE 2: For configured sidelink grant, the Sidelink process for retransmission is identified by the SL-PRS Process ID as specified in clause 5.22.1.1.

5.22.1.3.5 Sidelink Process Associated with Dedicated SL-PRS Resource Pool

If the Sidelink process is configured to perform transmissions of multiple SL-PRS with Sidelink resource allocation scheme 2, the process maintains a counter SL_RESOURCE_RESELECTION_COUNTER. For other configurations of the Sidelink process, this counter is not available. For each SL-PRS new transmission or retransmission, the MAC entity shall:

1> if there is no uplink transmission; or

1> if there is uplink transmission and the sidelink transmission is prioritized over uplink transmission:

2> instruct the physical layer to transmit SCI of the SL grant with the associated SL-PRS transmission information on Dedicated SL-PRS resource pool;

2> instruct the physical layer to generate the SL-PRS on Dedicated SL-PRS resource pool.

1> if this transmission corresponds to the last transmission of the SL-PRS transmission:

2> decrement SL_RESOURCE_RESELECTION_COUNTER by 1, if available.

The transmission of the SL-PRS is prioritized over uplink transmission(s) of the MAC entity or the other MAC entity if the following conditions are met:

1> if the MAC entity is not able to perform this sidelink transmission simultaneously with all uplink transmission(s) at the time of the transmission, and 1> if ul-PrioritizationThres is configured and if the value of the highest priority of logical channel(s) of all the NR uplink transmission(s) is not lower than ul-PrioritizationThres, and 1> if sl-PrioritizationThres is configured and if the value of SL-PRS priority is lower than sl-PrioritizationThres.

5.22.1.4 Multiplexing and Assembly 5.22.1.4.0 General

For PDU(s) associated with one SCI, MAC shall consider only logical channels with the same Source Layer-2 ID-Destination Layer-2 ID pair for one of unicast, groupcast and broadcast which is associated with the pair. Multiple transmissions for different Sidelink processes are allowed to be independently performed in different PSSCH durations.

NOTE: Sidelink data for discovery and sidelink data for non-discovery transmitted by a UE cannot be multiplexed into the same TB because they are always associated with different destination L2 IDs (see TS 23.304 [26]).

. . .

5.22.1.4.1.3 Allocation of Sidelink Resources

The MAC entity shall for each sidelink grant associated with Shared SL-PRS resource pool:

1> if there is SL-PRS pending for transmission for the selected destination:

2> derive Transport Block Size for a new transmission for SL-SCH assuming SL-PRS can be transmitted in the sidelink grant according to clause 8.1.3.2 in TS 38.214 [7];

2> if all the SL-SCH data within logical channel with higher priority than that of the SL-PRS can be allocated with resources:

3> determine that the pending SL-PRS can be transmitted in the sidelink grant.

2> else:

3> determine that the pending SL-PRRS cannot be transmitted in the sidelink grant;

3> derive the Transport Block Size for a new transmission for SL-SCH with no SL-PRS according to clause 8.1.3.2 in TS 38.214 [7].

The MAC entity shall for each SCI corresponding to a new transmission for SL-SCH:

1> allocate resources to the logical channels as follows:

2> logical channels selected in clause 5.22.1.4.1.2 for the SL grant with SBj>0 are allocated resources in a decreasing priority order. If the sPBR of a logical channel is set to infinity, the MAC entity shall allocate resources for all the data that is available for transmission on the logical channel before meeting the sPBR of the lower priority logical channel(s);

2> decrement SBj by the total size of MAC SDUs served to logical channel j above;

2> if any resources remain, all the logical channels selected in clause 5.22.1.4.1.2 are served in a strict decreasing priority order (regardless of the value of SBj) until either the data for that logical channel or the SL grant is exhausted, whichever comes first. Logical channels configured with equal priority should be served equally.

NOTE 1: The value of SBj can be negative.

. . .

The MAC entity shall not generate a MAC PDU for the HARQ entity if the following conditions are satisfied:

there is no Sidelink CSI Reporting MAC CE generated for this PSSCH transmission as specified in clause 5.22.1.7; and there is no Sidelink DRX Command MAC CE generated for this PSSCH transmission as specified in clause 5.22.1.8; and there is no Sidelink Inter-UE Coordination Request MAC CE generated for this PSSCH transmission as specified in clause 5.22.1.9; and there is no Sidelink Inter-UE Coordination Information MAC CE generated for this PSSCH transmission as specified in clause 5.22.1.10; and the MAC PDU includes zero MAC SDUs and the MAC PDU is not associated with SL-PRS transmission on Shared SL-PRS resource pool.

Logical channels shall be prioritised in accordance with the following order (highest priority listed first):

data from SCCH;

Sidelink CSI Reporting MAC CE;

Sidelink Inter-UE Coordination Request MAC CE and Sidelink Inter-UE Coordination Information MAC CE;

Sidelink DRX Command MAC CE;

data from any STCH or SL-PRS.

NOTE 2: The priority order between Sidelink Inter-UE Coordination Request MAC CE and Sidelink Inter-UE Coordination Information MAC CE is up to UE implementation.

5.22.1.4.2 Multiplexing of MAC Control Elements and MAC SDUs

The MAC entity shall multiplex MAC CEs and MAC SDUs in a MAC PDU according to clauses 5.22.1.4.1 and 6.1.6.

5.22.2 SL-SCH Data and SL-PRS Reception 5.22.2.1 SCI Reception

SCI indicates if there is a transmission on SL-SCH and provide the relevant HARQ information. SCI can also indicate if there is a SL-PRS transmission. An SCI for SL-SCH transmission with or without corresponding SL-PRS on Shared SL-PRS resource pool consists of two parts: the 1$^{st}$ stage SCI on PSCCH and the 2$^{nd}$ stage SCI on PSSCH as specified in clause 8.1 of TS 38.214 [7]. An SCI for SL-PRS transmission on Dedicated SL-PRS resource pool consists of a single part on PSCCH as specified in TS 38.212 [9].

The MAC entity shall:

1> for each PSCCH duration during which the MAC entity monitors PSCCH:

2> if a 1$^{st}$ stage SCI has been received on the PSCCH:

3> determine the set of PSSCH durations in which reception of a 2$^{nd}$ stage SCI and the transport block occur using the received part of the SCI;

3> if the 2$^{nd}$ stage SCI for this PSSCH duration has been received on the PSSCH:

4> store the SCI as a valid SCI for the PSSCH durations corresponding to transmission(s) of the transport block and SL-PRS, if available and the associated HARQ information and QoS information;

2> else if an SCI has been received on the PSCCH reception on Dedicated SL-PRS resource pool for SL-PRS transmission:

3> determine the SL-PRS transmission occasion corresponding to the SCI;

3> store the SCI as a valid SCI for the SL-PRS transmission and the corresponding SL-PRS transmission information on Dedicated SL-PRS resource pool.

1> for each PSSCH duration for which the MAC entity has a valid SCI:

2> deliver the SCI and the associated Sidelink transmission information to the Sidelink HARQ Entity.

1> for each SL-PRS transmission occasion for which MAC entity has a valid SCI:

2> perform SL-PRS reception according to the SL-PRS transmission information within the SCI as in clause 5.22.2.2.2 for SL-PRS received on Shared SL-PRS resource pool and as in clause 5.22.2.4 for SL-PRS received on Dedicated SL-PRS resource pool.

5.22.2.2 Sidelink HARQ Operation and SL-PRS Reception on Shared SL-PRS Resource Pool 5.22.2.2.1 Sidelink HARQ Entity There is at most one Sidelink HARQ Entity at the MAC entity for reception of the SL-SCH, which maintains a number of parallel Sidelink processes.

Each Sidelink process is associated with SCI in which the MAC entity is interested. This interest is determined by the Sidelink identification information of the SCI. The Sidelink HARQ Entity directs Sidelink transmission information and associated TBs received on the SL-SCH to the corresponding Sidelink processes.

The number of Receiving Sidelink processes associated with the Sidelink HARQ Entity is defined in TS 38.306 [5].

For each PSSCH duration, the Sidelink HARQ Entity shall:

1> for each SCI valid for this PSSCH duration:
  2> if the NDI has been toggled compared to the value of the previous received transmission corresponding to the Sidelink identification information and the Sidelink process ID of the SCI or this is the very first received transmission for the pair of the Sidelink identification information and the Sidelink process ID of the SCI:
    3> if there is a Sidelink process associated with the Sidelink identification information and the Sidelink process ID of the SCI:
      4> consider the Sidelink process as unoccupied;
      4> flush the soft buffer for the Sidelink process.
    3> allocate the TB received from the physical layer and the associated Sidelink identification information and Sidelink process ID to an unoccupied Sidelink process;
    3> associate the Sidelink process with the Sidelink identification information and the Sidelink process ID of this SCI and consider this transmission to be a new transmission.

NOTE 1: When a new TB arrives, the Sidelink HARQ Entity allocates the TB to any unoccupied Sidelink process. If there is no unoccupied Sidelink process in the Sidelink HARQ entity, how to manage receiving Sidelink processes is up to UE implementation.

NOTE 1a: If the NDI has not been toggled compared to the value of the previous received transmission corresponding to the Sidelink identification information and the Sidelink process ID of the SCI, and if there is no Sidelink process associated with the Sidelink identification information and the Sidelink process ID of the SCI, it is up to UE implementation to handle the corresponding TB.

1> for each Sidelink process:
  2> if the NDI has not been toggled compared to the value of the previous received transmission corresponding to the Sidelink identification information and the Sidelink process ID of the SCI for the Sidelink process according to its associated SCI:
    3> allocate the TB received from the physical layer to the Sidelink process and consider this transmission to be a retransmission.

NOTE 2: A single sidelink process can only be (re-) associated to a single combination of Sidelink identification information and Sidelink process ID at a time and a single combination of Sidelink identification information and Sidelink process ID can only be (re-) associated to a single sidelink process at a time.

5.22.2.2.2 Sidelink Process

For each PSSCH duration where a transmission takes place for the Sidelink process, one TB and the associated HARQ information is received from the Sidelink HARQ Entity.

For each received TB and SL-PRS, if available and associated Sidelink transmission information, the Sidelink process shall:

1> if this is a new transmission:
  2> attempt to decode the received data.
1> else if this is a retransmission:
  2> if the data for this TB has not yet been successfully decoded:
    3> instruct the physical layer to combine the received data with the data currently in the soft buffer for this TB and attempt to decode the combined data.
1> if the sidelink transmission information in the SCI indicates SL-PRS transmission:
  2> if the SL-PRS transmission is associated to unicast:
    3> if the DST field of the decoded MAC PDU subheader is equal to the 8 MSB of any of the Source Layer-2 ID(s) of the UE for which the 16 LSB are equal to the Destination ID in the corresponding SCI; and
    3> if the SRC field of the decoded MAC PDU subheader is equal to the 16 MSB of any of the Destination Layer-2 ID(s) of the UE for which the 8 LSB are equal to the Source ID in the corresponding SCI:
      4> instruct the physical layer to perform SL-PRS reception.
  2> else if the SL-PRS transmission is associated with groupcast or broadcast:
    3> if the DST field of the decoded MAC PDU subheader is equal to the 8 MSB of any of the Destination Layer-2 ID(s) of the UE for which the 16 LSB are equal to the Destination ID in the corresponding SCI:
      4> instruct the physical layer to perform SL-PRS reception.
1> if the data which the MAC entity attempted to decode was successfully decoded for this TB; or
1> if the data for this TB was successfully decoded before:
  2> if this is the first successful decoding of the data for this TB:
    3> if this TB is associated to unicast and the DST field of the decoded MAC PDU subheader is equal to the 8 MSB of any of the Source Layer-2 ID(s) of the UE for which the 16 LSB are equal to the Destination ID in the corresponding SCI:
      4> if the SRC field of the decoded MAC PDU subheader is equal to the 16 MSB of any of the Destination Layer-2 ID(s) of the UE for which the 8 LSB are equal to the Source ID in the corresponding SCI; or
      4> if this TB is corresponding to the logical channel with LCID equal to 0 or 1 and determined to be the first TB:
        5> deliver the decoded MAC PDU to the disassembly and demultiplexing entity.
    3> if this TB is associated to groupcast or broadcast:
      4> if the DST field of the decoded MAC PDU subheader is equal to the 8 MSB of any of the Destination Layer-2 ID(s) of the UE for which the 16 LSB are equal to the Destination ID in the corresponding SCI; or 4> if this TB is corresponding to the logical channel with LCID equal to 58, and the DST field of the decoded MAC PDU subheader is equal to the 8 MSB of any of the Source Layer-2 ID(s) of the UE for which the 16 LSB are equal to the Destination ID in the corresponding SCI:

5> deliver the decoded MAC PDU to the disassembly and demultiplexing entity.

NOTE: Whether the TB is the first TB can be determined based on the Source Layer-2 ID and Destination Layer-2 ID pair.

2> consider the Sidelink process as unoccupied.

1> else:

2> instruct the physical layer to replace the data in the soft buffer for this TB with the data which the MAC entity attempted to decode.

1> if HARQ feedback is enabled by the SCI:

2> if negative-only acknowledgement is indicated by the SCI according to clause 8.4.1 of TS 38.212 [9]:

3> if UE's location information is available and distance between UE's location and the central location of the nearest zone that is calculated based on the Zone id in the SCI and the value of sl-ZoneLength corresponding to the communication range requirement in the SCI as specified in TS 38.331 [5] is smaller or equal to the communication range requirement in the SCI; or 3> if none of Zone_id and communication range requirement is indicated by the SCI; or 3> if UE's location information is not available:

4> if the data which the MAC entity attempted to decode was not successfully decoded for this TB and the data for this TB was not successfully decoded before:

5> instruct the physical layer to generate a negative acknowledgement of the data in this TB.

2> if negative-positive acknowledgement or unicast is indicated by the SCI according to clause 8.4.1 of TS 38.212 [9]:

3> if the data which the MAC entity attempted to decode was successfully decoded for this TB or the data for this TB was successfully decoded before:

4> instruct the physical layer to generate a positive acknowledgement of the data in this TB.

3> else:

4> instruct the physical layer to generate a negative acknowledgement of the data in this TB.

5.22.2.3 Disassembly and Demultiplexing

The MAC entity shall disassemble and demultiplex a MAC PDU as defined in clause 6.1.6.

5.22.2.4 SL-PRS Reception on Dedicated SL-PRS Resource Pool

For each SL-PRS transmission occasion on Dedicated SL-PRS resource pool, the MAC entity shall:

1> if this SL-PRS transmission is associated to unicast:

2> if the destination ID in the corresponding SCI is equal to the UE's source ID; and if the field sl-SRC-ID-LenDedicatedSL-PRS-RP is configured with the value of 12 bit:

3> if source ID in the corresponding SCI is equal to the 12 LSB of the UE's destination layer-2 ID:

4> instruct the physical layer to perform SL-PRS reception on the SL-PRS transmission occasion.

2> else if the destination ID in the corresponding SCI is equal to the UE's source ID, and if the field sl-SRC-ID-LenDedicatedSL-PRS-RP is configured with the value of 24 bit:

3> if source ID in the corresponding SCI is equal to the UE's destination layer-2 ID:

4> instruct the physical layer to perform SL-PRS reception on the SL-PRS transmission occasion.

1> else if this SL-PRS transmission is associated to broadcast or groupcast:

2> if the destination ID in the corresponding SCI is equal to the UE's destination layer-2 ID 3> instruct the physical layer to perform SL-PRS reception on the SL-PRS transmission occasion.

Quotation [4] End

In [5] RAN1 Chair's Notes of 3GPP TSG RAN WG1 #116, there are some agreements on sidelink positioning:

Quotation [5] Start

Agreement

To the following question from RAN2 in R1-2400008, RAN1 to respond as below:

Question from RAN2:

On the maximum number of parallel SL-PRS transmission

What is the maximum total number of parallel SL-PRS transmission on SL-PRS shared/dedicated resource pool?

RAN1's response: While the interpretation intended by RAN2 for "parallel SL PRS transmission" is not fully clear, RAN1 understands that it is referring to the number of processes similar to the number of SL processes associated with a SL HARQ entity for SL communications. There is no concept of parallel SL PRS transmission processes defined/used in RAN1 and such a concept is expected to be transparent to RAN1 specifications. Accordingly, the maximum total number of parallel SL PRS transmission in a shared/dedicated SL PRS resource pool can be up to RAN2.

Agreement

To the following question from RAN2 in R1-2400008, RAN1 to respond as below:

Question from RAN2:

On the maximum number of parallel SL-PRS transmission

What is the maximum number of parallel SL-PRS transmission supported on a SL-PRS shared resource pool and SL-PRS dedicated resource pool, respectively?

RAN1's response: Following from the response to the first question, the maximum number of parallel SL PRS transmission in a shared/dedicated SL PRS resource pool respectively can be up to RAN2.

Agreement

To the following question from RAN2 in R1-2400008, RAN1 to respond as below:

Question from RAN2:

When SL-PRS is transmitted on a SL-PRS shared resource pool where PSFCH is configured, if the associated PSSCH transmission is positively acknowledged, should the UE continue to perform SL-PRS retransmission?

RAN1's response: Since there is no notion of Layer 1 feedback in response to SL PRS transmission, a positive acknowledgement for an associated PSSCH may not be interpreted to indicate successful reception of SL PRS (see RAN1 conclusion from RAN1 #113 below). Accordingly, a Tx UE may continue to perform SL PRS retransmissions if it has been provided with multiple resources for (re-)transmission by the MAC layer, subject to any restrictions on the maximum number of retransmissions.

| |
|---|
| Conclusion<br>Do not support ACK/NACK feedback for SL-PRS or lower-layer feedback-based retransmissions in Release 18. |

Agreement

The draft LS in R1-2401551 is endorsed (with the addition of the missing conclusion). Final LS in R1-2401552.

Quotation [5] End

In RAN1 #116, the Reply LS ([6] R1-2401552, "Reply LS on MAC agreements for SL Positioning"), is quoted as below:

Quotation [6] Start

RAN1 has discussed the questions in the RAN2 LS and would like to reply as below.

Question 1a (RAN2):

On the maximum number of parallel SL-PRS transmission.

What is the maximum total number of parallel SL-PRS transmission on SL-PRS shared/dedicated resource pool?

RAN1's response:

While the interpretation intended by RAN2 for "parallel SL PRS transmission" is not fully clear, RAN1 understands that it is referring to the number of processes similar to the number of SL processes associated with a SL HARQ entity for SL communications. There is no concept of parallel SL PRS transmission processes defined/used in RAN1 and such a concept is expected to be transparent to RAN1 specifications. Accordingly, the maximum total number of parallel SL PRS transmission in a shared/dedicated SL PRS resource pool can be up to RAN2.

Question 1b (RAN2):

On the maximum number of parallel SL-PRS transmission

What is the maximum number of parallel SL-PRS transmission supported on a SL-PRS shared resource pool and SL-PRS dedicated resource pool, respectively?

RAN1's response:

Following from the response to the first question, the maximum number of parallel SL PRS transmission in a shared/dedicated SL PRS resource pool respectively can be up to RAN2.

Question 2 (RAN2):

When SL-PRS is transmitted on a SL-PRS shared resource pool where PSFCH is configured, if the associated PSSCH transmission is positively acknowledged, should the UE continue to perform SL-PRS retransmission?

RAN1's response:

Since there is no notion of Layer 1 feedback in response to SL PRS transmission, a positive acknowledgement for an associated PSSCH may not be interpreted to indicate successful reception of SL PRS (see RAN1 conclusion from RAN1 #113 below). Accordingly, a Tx UE may continue to perform SL PRS retransmissions if it has been provided with multiple resources for (re-)transmission by the MAC layer, subject to any restrictions on the maximum number of retransmissions.

| |
|---|
| Conclusion<br>Do not support ACK/NACK feedback for SL-PRS or lower-layer feedback-based retransmissions in Release 18. |

Quotation [6] End

For New Radio (NR) Release-16/17 sidelink design, sidelink slots can be utilized for Physical Sidelink Control Channel (PSCCH)/Physical Sidelink Shared Channel (PSSCH)/Physical Sidelink Feedback Channel (PSFCH) transmission/reception. Moreover, the concept of sidelink resource pool for sidelink communication is utilized for PSCCH/PSSCH and/or/PSFCH transmission/reception. A sidelink (communication) resource pool will comprise a set of sidelink slots (except at least slots for Physical Sidelink Broadcast Channel (PSBCH)) and a set of frequency resources. Different sidelink (communication) resource pools may be Time Division Multiplexed (TDMed) and/or Frequency Division Multiplexed (FDMed). More specifically, a PSCCH in one sidelink (communication) resource pool can only schedule PSSCH resource(s) in the same one sidelink (communication) resource pool. A PSCCH in one sidelink (communication) resource pool is not able to schedule PSSCH resource(s) in another/other sidelink (communication) resource pool. For a PSCCH/PSSCH, an associated PSFCH is in the same sidelink (communication) resource pool, instead of in different sidelink (communication) resource pools.

One sidelink (communication) resource pool will comprise multiple sub-channels in frequency domain, wherein a sub-channel comprises multiple contiguous Physical Resource Blocks (PRBs) in frequency domain. One PRB comprises multiple Resource Elements (REs), e.g., one PRB consists of 12 REs. Configuration of the sidelink resource pool will indicate the number of PRBs of each sub-channel in the corresponding sidelink resource pool. Sub-channel based resource allocation in frequency domain is supported for PSSCH. For a PSSCH resource scheduled by a PSCCH in the same sidelink slot, a fixed relationship between the PSCCH and the PSSCH resource is specified, which means that the PSCCH will be located in the lowest (index of) sub-channel of the scheduled PSSCH resource. As for a scheduled PSSCH resource in different slot(s), the starting frequency position of the scheduled PSSCH resource will be scheduled/indicated by Sidelink Control Information (SCI), instead of a fixed relationship.

In current NR Release-16/17 sidelink design, one SCI could indicate at most three PSSCH resources, for a same sidelink data packet, via a Frequency resource assignment and/or a Time resource assignment in the SCI. The SCI may comprise a 1st stage SCI and a 2nd stage SCI. The 1st stage SCI may be transmitted via PSCCH. The 2nd stage SCI may be transmitted via multiplexed with the scheduled PSSCH resource in the same sidelink slot, e.g., the first PSSCH resource. In other words, the SCI can schedule at most two PSSCH resources in later sidelink slots, e.g., the second PSSCH resource and/or the third PSSCH resource. The at most three PSSCH resources are in different slots in a sidelink (communication) resource pool. The at most three PSSCH resources are within 32 consecutive slots in a sidelink resource pool. The at most three PSSCH resources scheduled by the SCI are utilized/associated with a same sidelink data packet, e.g., a same Transport Block (TB) or a same Medium Access Control (MAC) Protocol Data Unit (PDU). Note that standalone PSCCH/SCI is not supported in NR sidelink, which means that for each PSSCH transmission in a slot, there will be corresponding PSCCH/SCI transmissions in the same slot, and vice versa.

Figure 5:
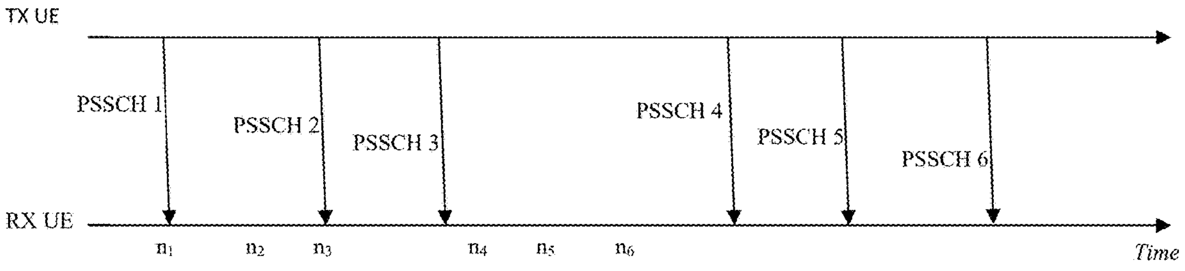
FIG. 5 is an example diagram showing multiple PSSCH transmissions for a same sidelink data packet, wherein PSSCH 1 is an initial/new PSSCH transmission and PSSCH 2~6 are PSSCH retransmissions, in accordance with embodiments of the present invention.

Furthermore, a Transmission (TX) User Equipment (UE) may transmit the same sidelink data packet via multiple PSSCH transmissions, e.g., the PSSCH 1 (the initial/new PSSCH transmission) and PSSCH 2~6 (PSSCH retransmission) in FIG. 5. The TX UE may transmit SCI 1 in slot $n_1$ for indicating/scheduling PSSCH 1~3. The TX UE may transmit SCI 2 in slot $n_2$ for indicating/scheduling PSSCH 2~4. The TX UE may transmit SCI 3 in slot $n_3$ for indicating/scheduling PSSCH 3~5. The TX UE may transmit SCI 4 in slot $n_4$ for indicating/scheduling PSSCH 4~6. The TX UE may transmit SCI 5 in slot $n_5$ for indicating/scheduling PSSCH 5~6. The TX UE may transmit SCI 6 in slot no for indicating/scheduling PSSCH 6. For the same sidelink data packet, the TX UE may indicate/set the SCI 1~6 with/as the same Hybrid Automatic Repeat Request (HARQ) process number, the same New Data Indicator (NDI) value, the same (Layer-1) source Identification/Identity (ID), the same (Layer-1) destination ID, and the same cast type.

Moreover, resource reservation for another/different TB by an SCI could be (pre-)configured with enabled or not enabled or not configured in a sidelink (communication) resource pool. When a sidelink (communication) resource pool is configured with enabled such resource reservation, the sidelink (communication) resource pool is configured with a set of reservation period values. The possible reservation period could be 0, 1:99, 100, 200, 300, 400, 500, 600, 700, 800, 900, 1000 ms. A resource reservation period field in an SCI in the sidelink (communication) resource pool could indicate which reservation period value for (future) resource reservation. The size/number of the set of reservation period values could be from 1 to 16.

In current NR Release-16/17 sidelink design, there are two sidelink resource allocation modes defined for NR sidelink communication:

- mode 1 is that a base station/network node can schedule sidelink resource(s) to be used by a UE for sidelink transmission(s);
- mode 2 is that a UE determines (i.e. a base station/network node does not schedule) sidelink transmission resource(s) within sidelink resources configured by the base station/network node or pre-configured sidelink resources.

For UE (autonomous) selection mode, e.g., NR sidelink resource allocation mode 2, since a transmission resource is not scheduled via a network node, the UE may require performing sensing before selecting one or more resources for PSSCH transmission(s) (e.g., sensing-based transmission), in order to avoid resource collision and interference from or to other UEs (especially UEs using NR sidelink). Full sensing is supported from NR Rel-16 sidelink, while partial sensing is supported from NR Rel-17 sidelink. Based on the result of a sensing procedure, the UE can determine a valid/identified resource set. The valid/identified resource set may be reported to higher layers (of the UE). The UE may (randomly) select one or multiple valid/identified resources from the valid/identified resource set to perform sidelink transmission(s) from the UE. The sidelink transmission(s) from the UE may be PSCCH and/or PSSCH transmissions. As specified in TS 38.321 section 5.22.1.1 ([4] 3GPP TS 38.321 V18.4.0 (2024 December) 3GPP), the TX UE may be configured with maximum transmission number sl-MaxTxTransNumPSSCH, which may be derived based on priority and Channel Busy Ratio (CBR). The TX UE will select a number of HARQ retransmissions from allowed numbers given the restriction of maximum transmission number sl-MaxTxTransNumPSSCH. As in the instance of FIG. 5, the TX UE may (randomly) select 6 valid/identified resources to perform PSSCH 1~6 transmissions for transmitting the same sidelink data packet, wherein the maximum transmission number may be 8.

For network scheduling mode, e.g., NR sidelink resource allocation mode 1, dynamic grant, configured grant Type 1 and configured grant Type 2 are supported in [1] 3GPP TS 38.214 V18.44.0 (2024 September) 3GPP. Regarding dynamic grant, the network node may transmit a Sidelink (SL) grant, e.g., Downlink Control Information (DCI) format 3_0 scrambled by SL-Radio Network Temporary Identifier (RNTI), on Uu interface for scheduling at most three PSSCH resources (for a same sidelink data packet) to a TX UE. The sidelink grant also comprises "resource pool index" for indicating one sidelink (communication) resource pool, wherein the scheduled at most three PSCCH/PSSCH resources are within the indicated one sidelink (communication) resource pool. The TX UE may perform PSCCH and PSSCH transmissions on PC5 interface, in response to the received sidelink grant, for a sidelink data packet. As shown in the instance of FIG. 5, the TX UE may receive a first sidelink grant indicating three resources for performing PSSCH 1~3 transmissions for transmitting the same sidelink data packet. The TX UE may receive a second sidelink grant indicating another three resources for performing PSSCH 4~6 transmissions for transmitting the same sidelink data packet. The network may provide the second sidelink grant if the TX UE indicates need of retransmission resources. The network may indicate/set the same SL HARQ process number and the same NDI value in the first sidelink grant and the second sidelink grant, so the TX UE can know that the first sidelink grant and the second sidelink grant are utilized for the same sidelink data packet.

The Uu interface means the wireless interface for communication between a network and a UE. The PC5 interface means the wireless interface for communication (directly) between UEs/devices.

Moreover, decoding of sidelink data packets in a Reception (RX) UE can support HARQ combining from received multiple PSSCH transmissions. The sidelink data packet can be SL HARQ feedback enabled or disabled. If the sidelink data packet is SL HARQ feedback enabled, the RX UE may transmit Negative Acknowledgement (NACK) on PSFCH to the TX UE if the RX UE does not yet decode the sidelink data packet successfully. The RX UE may transmit Acknowledgement (ACK) (including not transmitting feedback in NACK-only feedback mode) on PSFCH to the TX UE if the RX UE decodes the sidelink data packet successfully. When the TX UE receives/detects NACK, the TX UE may perform PSSCH retransmission for transmitting the same sidelink data packet, via the selected SL resources, if any, in NR sidelink resource allocation mode 2 or via scheduled/configured SL resources by SL grant, if any, in NR sidelink resource allocation mode 1. Note that in NR sidelink resource allocation mode 2, if the TX UE utilizes all selected SL resources for performing PSSCH retransmissions for the sidelink data packet and if the TX UE still receives/detects NACK, the TX UE may not be able to perform other PSSCH retransmissions for transmitting the same sidelink data packet. When the TX UE receives/detects ACK, the TX UE may stop performing PSSCH retransmissions even if there are un-utilized selected or scheduled/configured SL resources for the sidelink data packet.

In NR Release 18, a new reference signal for SL positioning/ranging, noted as Sidelink Positioning Reference Signal (SL-PRS), is introduced. SL-PRS measurements may be utilized for positioning/ranging solutions, such as SL Round Trip Time (RTT), SL-Angle of Arrival (AoA), SL-Time Difference Of Arrival (TDOA), SL-Angle of Departure (AoD). For supporting time-based positioning methods, larger bandwidth for SL-PRS may be required for higher accuracy positioning. It is quite possible that the required bandwidth for SL-PRS may be 10 MHz, 20 MHz, or even more, especially in higher frequency bands.

With regard to the SL-PRS resources/transmissions, there are two kinds of sidelink resource pools: dedicated SL-PRS resource pool and Shared SL-PRS resource pool (shared with sidelink communication).

They may be denoted as SL-PRS dedicated resource pool and SL-PRS shared resource pool.

In dedicated SL-PRS resource pool, there are no PSSCH/PSFCH resources. The TX UE may transmit a PSCCH carrying SCI format 1-B for scheduling/allocating an SL-PRS resource/transmission within the same slot.

In shared SL-PRS resource pool, SL-PRS transmission(s) can be multiplexed with PSSCH resources in a Time Division Multiplexing (TDM) manner (symbol-level division in a slot). The TX UE may transmit a PSCCH carrying SCI format 1-A and also transmit a $2^{nd}$-stage SCI, e.g., SCI format 2-D, for scheduling/allocating both an SL-PRS resource/transmission and a PSSCH transmission within the same slot. When PSSCH and SL-PRS are multiplexed in the same slot, they will share the same source ID, destination ID, cast type fields.

For SL-PRS resource allocation, scheme/mode 1 and scheme/mode 2 are introduced.

- Scheme/mode 1: Network-centric operation SL-PRS resource allocation (e.g., similar to a legacy NR Mode 1 for PSSCH).
  - The network node (e.g., Next Generation Node B (gNB), Location Management Function (LMF), gNB & LMF) allocates resources for SL-PRS.
- Scheme/mode 2: TX UE autonomous SL-PRS resource allocation (e.g., similar to legacy NR Mode 2 for PSSCH).
  - At least one of the UE(s) participating in the sidelink positioning operation allocates resources for SL-PRS.

According to the RAN1 #113 agreement described in [6] R1-2401552, it does not support ACK/NACK feedback for SL-PRS or lower-layer feedback-based retransmissions in Release 18. It means that HARQ feedback and HARQ combining are not supported for SL-PRS. More specifically, the TX UE may perform one or multiple SL-PRS transmissions. The RX UE may receive the one or multiple SL-PRS transmissions without HARQ combining them (RX UE may perform measurement separately on the one or multiple SL-PRS transmissions).

In [5] RAN1 Chair's Notes of 3GPP TSG RAN WG1 #116, there is agreement on SL-PRS retransmissions. When SL-PRS is transmitted on an SL-PRS shared resource pool, and if the associated PSSCH transmission is positively acknowledged, the Tx UE may continue to perform SL-PRS retransmissions if it has been provided with multiple resources for (re-)transmission by the MAC layer, subject to any restrictions on the maximum number of retransmissions.

According to the current MAC standard ([4] 3GPP TS 38.321 V18.4.0 (2024 December) 3GPP), when a UE performs resource selection for transmissions of multiple MAC PDUs and/or multiple SL-PRS(s) in an SL resource pool, the UE may maintain a counter (e.g., SL_RESOURCE_RESELECTION_COUNTER). More specifically, the UE selects one or more SL resources, wherein the one or more SL resources are reserved periodically (e.g., with one reservation period).

When the resource selection is performed not in a dedicated SL-PRS resource pool (e.g., shared SL-PRS resource pool or SL resource pool without supporting SL-PRS transmission), the UE may utilize the one or more SL resources for transmitting one MAC PDU and SL-PRS, if available, per period. When the UE performs the last transmission of the one MAC PDU and the SL-PRS, if available, the counter will be decremented by 1.

When the resource selection is performed in a dedicated SL-PRS resource pool, the UE may utilize the one or more SL resources for SL-PRS transmission(s) per period. When the UE performs the last transmission of the SL-PRS transmission(s), the counter will be decremented by 1.

When the counter was equal to 1, the UE may randomly select a value. If the value is larger than a threshold (e.g., sl-ProbResourceKeep), the UE will trigger resource (re) selection when the counter is equal to zero. If the value is less than or equal to the threshold (e.g., sl-ProbResourceKeep), the UE will reuse the previously selected one or more SL resources and reset (value of) the counter. In other words, the counter is utilized for determining/control/manage how many periods the UE can use the selected one or more SL resources.

For a dedicated SL-PRS resource pool, there is no definition/determination on "the last transmission of the SL-PRS transmission". If it follows a similar principle, it is possible to define that for one SL-PRS transmission, if the number of SL-PRS (re) transmissions selected by the MAC entity has been reached, the UE (e.g., MAC entity of the UE) determines this one SL-PRS transmission corresponds to the last transmission of SL-PRS transmission. Thus, the counter will be decremented by 1 accordingly.

For a shared SL-PRS resource pool, the current MAC standard ([4] 3GPP TS 38.321 V18.4.0 (2024 December) 3GPP) specifies that if a selected number of HARQ retransmissions has been reached, or if a positive acknowledgement to a transmission of the MAC PDU has been received, or if a negative-only acknowledgement was enabled in the SCI and no negative acknowledgement was received for the transmission of the MAC PDU, the UE (e.g., MAC entity of the UE) will determine this transmission corresponds to the last transmission of the MAC PDU. However, there is still no definition on "the last transmission of the SL-PRS transmission". One possible way is to determine "the last transmission of the SL-PRS transmission" in the shared SL-PRS resource pool as similar definition/determination as the last transmission of SL-PRS in the dedicated SL-PRS resource pool. However, it is still not clear how to determine "the last transmission of the MAC PDU and SL-PRS, if available," as specified in current MAC standard [4] 3GPP TS 38.321 V18.4.0 (2024 December) 3GPP. For instance, if SL-PRS is available to multiplex with PSSCH(s) for transmitting MAC PDU, whether the last transmission of the MAC PDU and SL-PRS should satisfy both the last transmission of MAC PDU and the last transmission of SL-PRS. Note that the selected number of HARQ retransmissions also corresponds to the number of SL-PRS transmissions, as specified in the current MAC standard [4] 3GPP TS 38.321 V18.4.0 (2024 December) 3GPP.

In one direction that the last transmission of the MAC PDU and SL-PRS means any of the last transmission of MAC PDU and the last transmission of SL-PRS, it is possible that the counter will be decremented twice in one period, wherein one corresponds to the last transmission of the MAC PDU and the other one corresponds to the last transmission of the SL-PRS. Besides, when the last transmission of MAC PDU is positively acknowledged or no negative acknowledgement if negative-only acknowledgement was enabled, the UE may continue to perform SL-PRS retransmissions on remaining SL resources. In this case, the UE may need to also perform transmission of the MAC PDU or a new MAC PDU for performing the SL-PRS retransmissions on the remaining SL resources. Then, the UE may receive more positively acknowledged or no negative acknowledgement, such that the counter will be decremented multiple times in one period. These cases seem unreasonable to shorten the resource reservation abnormally.

In another direction that the last transmission of the MAC PDU and SL-PRS should satisfy both the last transmission of MAC PDU and the last transmission of SL-PRS. If SL-PRS multiplexing starts from a PSSCH retransmission of the MAC PDU, i.e., not the initial PSSCH transmission, it may not be possible to satisfy both the last transmission of MAC PDU and the last transmission of SL-PRS. If SL-PRS multiplexing can be skipped or not performed in some PSSCH retransmissions, it may induce some complexity to satisfy both the last transmission of MAC PDU and the last transmission of SL-PRS. Moreover, when the last transmission of MAC PDU is positively acknowledged or no negative acknowledgement if negative-only acknowledgement was enabled, the UE may continue to perform SL-PRS retransmissions on remaining SL resources since last transmission of SL-PRS may be yet satisfied. Then, it may not be feasible to satisfy both, and the counter will not decrement.

To deal with the issues, various concepts, mechanisms, methods, aspects, and/or embodiments are provided below.

Concept A

Assuming the TX UE is configured with an SL resource pool enabled/supporting SL-PRS transmission.

The SL resource pool may be a shared SL-PRS resource pool. The SL resource pool may be utilized for PSSCH and/or SL-PRS transmissions. The TX UE may perform first resource selection for transmissions of multiple MAC PDUs and/or multiple SL-PRSs. The TX UE may determine/select a first number of HARQ retransmission from allowed numbers given restriction of a maximum transmission number, e.g., a maximum transmission number configured/indicated by sl-MaxTxTransNumPSSCH. The selected first number of HARQ retransmissions may correspond to the first number of SL-PRS (re) transmissions, The TX UE may select one or more first SL resources, e.g., at least according to the selected first number (of HARQ retransmissions). The UE may set/maintain a first counter with a first selected/determined counter value. Preferably in certain embodiments, the first counter may be SL_RESOURCE_RESELECTION_COUNTER. The first counter may be associated with the first resource selection or with the one or more selected first SL resources.

Preferably in certain embodiments, the UE may perform one PSSCH transmission for transmitting a MAC PDU and/or one SL-PRS transmission on one SL resource, among the one or more first SL resources, in the shared SL-PRS resource pool. The UE may multiplex the SL-PRS transmission with the one PSSCH transmission for transmitting the MAC PDU on the one SL resource in the shared SL-PRS resource pool.

Preferably in certain embodiments, the UE may utilize the one or more first SL resources (in a period) for performing/transmitting a MAC PDU and/or SL-PRS (re) transmission (s). Preferably in certain embodiments, the UE may utilize the one or more first SL resources in a period for performing PSSCH for a MAC PDU and/or SL-PRS (re) transmission(s) for a (pending) SL-PRS.

Preferably in certain embodiments, the UE may utilize the one or more first SL resources in multiple periods for performing/transmitting multiple MAC PDUs and/or SL-PRS (re) transmission(s). Preferably in certain embodiments, the UE may utilize the one or more first SL resources in multiple periods for performing multiple PSSCHs for multiple MAC PDUs and/or multiple SL-PRS (re) transmission(s) for multiple (pending) SL-PRSs.

Preferably in certain embodiments, (in/for one period), the UE may determine/select the first number of HARQ retransmissions. Preferably in certain embodiments, the first number of HARQ retransmissions may be also applied to SL-PRS (re) transmissions.

Preferably or alternatively in certain embodiments, (in/for one period), the UE may determine/select the first number of HARQ retransmissions and SL-PRS (re) transmissions.

Preferably in certain embodiments, (the value of) the first number may be equal to the total number of the one or more first SL resources. Alternatively in certain embodiments, the total number of the one or more first SL resources may be equal to (the value of) the first number plus one. Preferably in certain embodiments, the UE may select the one or more first SL resources based on the first number of HARQ retransmissions (and SL-PRS retransmissions). Preferably in certain embodiments, (the value of) the first number may be larger than or equal to zero. Alternatively in certain embodiments, (the value of) the first number may be larger than or equal to one.

In one embodiment, for/in the shared SL-PRS resource pool, determination of last transmission may consider or be based on a PSSCH or MAC PDU transmission, no matter if last transmission is multiplexed with SL-PRS transmission or not. For/in the shared SL-PRS resource pool, determination of last transmission may consider or be based on a PSSCH or MAC PDU transmission, regardless of whether the last transmission is multiplexed with SL-PRS transmission or not. For/in the shared SL-PRS resource pool, the determination of last transmission may not consider or be based on an SL-PRS transmission. Preferably in certain embodiments, regardless of whether the PSSCH transmission is multiplexed with SL-PRS transmission or not, the UE decrements the first counter by 1 if the PSSCH transmission corresponds to the last transmission of the MAC PDU.

Preferably in certain embodiments, when/if the UE performs a first PSSCH transmission (of the MAC PDU) with a multiplexing SL-PRS transmission such that a first number of HARQ retransmissions has been reached, the UE may consider/determine the first PSSCH corresponds to the last transmission of the MAC PDU.

Preferably in certain embodiments, when/if the UE performs a first PSSCH transmission (of the MAC PDU) with a multiplexing SL-PRS transmission and the UE receives positive acknowledgement to the first PSSCH transmission of the MAC PDU, the UE may consider/determine the first PSSCH transmission corresponds to the last transmission of the MAC PDU.

Preferably in certain embodiments, when/if the UE performs a first PSSCH transmission (of the MAC PDU) with multiplexing SL-PRS transmission and the UE receives no negative acknowledgement to the first PSSCH transmission of the MAC PDU if negative-only acknowledgement was enabled, the UE may consider/determine the first PSSCH transmission corresponds to the last transmission of the MAC PDU.

Preferably in certain embodiments, based on one or more embodiments, some options for text proposals 1~3 (with changes and edits shown with double curly brackets to show deletions, i.e., {{ . . . }}, and double carets to show additions/insertions, i.e., ^^ . . . ^^) may be provided as below.

Text Proposal 1

5.22.1.3.1a Sidelink Process not Associated with Dedicated SL-PRS Resource Pool

The Sidelink process is associated with a HARQ buffer.

New transmissions and retransmissions are performed on the resource indicated in the sidelink grant as specified in clause 5.22.1.1 and with the MCS selected as specified in clause 8.1.3.1 of TS 38.214 and clause 5.22.1.1.

If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.

Priority of a MAC PDU and SL-PRS, if available, is determined by the highest priority of the logical channel(s), MAC CE(s) in the MAC PDU or SL-PRS.

If the Sidelink HARQ Entity requests a new transmission, the Sidelink process shall:

1> store the MAC PDU in the associated HARQ buffer;

1> store the sidelink grant received from the Sidelink HARQ Entity;

1> generate a transmission as described below.

If the Sidelink HARQ Entity requests a retransmission, the Sidelink process shall:

1> store the sidelink grant received from the Sidelink HARQ Entity;

1> generate a transmission as described below.

To generate a transmission, the Sidelink process shall:

1> if there is no uplink transmission; or

1> if the MAC entity is able to simultaneously perform uplink transmission(s) and sidelink transmission at the time of the transmission; or 1> if the other MAC entity and the MAC entity are able to simultaneously perform uplink transmission(s) and sidelink transmission at the time of the transmission respectively; or 1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:

2> instruct the physical layer to transmit SCI according to the stored sidelink grant with the associated Sidelink transmission information;

2> instruct the physical layer to generate a transmission according to the stored sidelink grant;

2> if HARQ feedback has been enabled for the MAC PDU according to clause 5.22.1.4.2:

3> instruct the physical layer to monitor PSFCH for the transmission and perform PSFCH reception as specified in clause 5.22.1.3.2.

2> if sl-PUCCH-Config is configured by RRC for the stored sidelink grant:

3> determine transmission of an acknowledgement on the PUCCH as specified in clause 5.22.1.3.2.

1> if this transmission corresponds to the last transmission of the MAC PDU {{and SL-PRS, if available}}:

2> decrement SL_RESOURCE_RESELECTION_COUNTER by 1, if available.

NOTE 1: If the number of HARQ retransmissions selected by the MAC entity has been reached, or if a positive acknowledgement to a transmission of the MAC PDU has been received, or if a negative-only acknowledgement was enabled in the SCI and no negative acknowledgement was received for the transmission of the MAC PDU, the MAC entity determines this transmission corresponds to the last transmission of the MAC PDU for Sidelink resource allocation mode 2. How to determine the last transmission in other cases is up to UE implementation.

1> if sl-MaxTransNum corresponding to the highest priority of the logical channel(s) in the MAC PDU has been configured in sl-CG-MaxTransNumList for the sidelink grant by RRC and the number of transmissions of the MAC PDU has been reached to sl-MaxTransNum; or End of Text Proposal 1

Text Proposal 2

5.22.1.3.1a Sidelink Process not Associated with Dedicated SL-PRS Resource Pool

The Sidelink process is associated with a HARQ buffer.

New transmissions and retransmissions are performed on the resource indicated in the sidelink grant as specified in clause 5.22.1.1 and with the MCS selected as specified in clause 8.1.3.1 of TS 38.214 and clause 5.22.1.1.

If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.

Priority of a MAC PDU and SL-PRS, if available, is determined by the highest priority of the logical channel(s), MAC CE(s) in the MAC PDU or SL-PRS.

If the Sidelink HARQ Entity requests a new transmission, the Sidelink process shall:

1> store the MAC PDU in the associated HARQ buffer;

1> store the sidelink grant received from the Sidelink HARQ Entity;

1> generate a transmission as described below.

If the Sidelink HARQ Entity requests a retransmission, the Sidelink process shall:

1> store the sidelink grant received from the Sidelink HARQ Entity;

1> generate a transmission as described below.

To generate a transmission, the Sidelink process shall:

1> if there is no uplink transmission; or

1> if the MAC entity is able to simultaneously perform uplink transmission(s) and sidelink transmission at the time of the transmission; or 1> if the other MAC entity and the MAC entity are able to simultaneously perform uplink transmission(s) and sidelink transmission at the time of the transmission respectively; or 1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:

2> instruct the physical layer to transmit SCI according to the stored sidelink grant with the associated Sidelink transmission information;

2> instruct the physical layer to generate a transmission according to the stored sidelink grant;

2> if HARQ feedback has been enabled for the MAC PDU according to clause 5.22.1.4.2:

3> instruct the physical layer to monitor PSFCH for the transmission and perform PSFCH reception as specified in clause 5.22.1.3.2.

2> if sl-PUCCH-Config is configured by RRC for the stored sidelink grant:

3> determine transmission of an acknowledgement on the PUCCH as specified in clause 5.22.1.3.2.

1> if this transmission corresponds to the last transmission of the MAC PDU {{and}} ^^with^^ SL-PRS, if available:

2> decrement SL_RESOURCE_RESELECTION_COUNTER by 1, if available.

NOTE 1: If the number of HARQ retransmissions selected by the MAC entity has been reached, or if a positive acknowledgement to a transmission of the MAC PDU has been received, or if a negative-only acknowledgement was enabled in the SCI and no negative acknowledgement was received for the transmission of the MAC PDU, the MAC entity determines this transmission corresponds to the last transmission of the MAC PDU ^^with SL-PRS, if available,^^ for Sidelink resource allocation mode 2. How to determine the last transmission in other cases is up to UE implementation.

1> if sl-MaxTransNum corresponding to the highest priority of the logical channel(s) in the MAC PDU has been configured in sl-CG-MaxTransNumList for the sidelink grant by RRC and the number of transmissions of the MAC PDU has been reached to sl-MaxTransNum; or End of Text Proposal 2

Text Proposal 3

5.22.1.3.1a Sidelink Process not Associated with Dedicated SL-PRS Resource Pool

The Sidelink process is associated with a HARQ buffer.

New transmissions and retransmissions are performed on the resource indicated in the sidelink grant as specified in clause 5.22.1.1 and with the MCS selected as specified in clause 8.1.3.1 of TS 38.214 and clause 5.22.1.1.

If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.

Priority of a MAC PDU and SL-PRS, if available, is determined by the highest priority of the logical channel(s), MAC CE(s) in the MAC PDU or SL-PRS.

If the Sidelink HARQ Entity requests a new transmission, the Sidelink process shall:

1> store the MAC PDU in the associated HARQ buffer;

1> store the sidelink grant received from the Sidelink HARQ Entity;

1> generate a transmission as described below.

If the Sidelink HARQ Entity requests a retransmission, the Sidelink process shall:

1> store the sidelink grant received from the Sidelink HARQ Entity;

1> generate a transmission as described below.

To generate a transmission, the Sidelink process shall:

1> if there is no uplink transmission; or

1> if the MAC entity is able to simultaneously perform uplink transmission(s) and sidelink transmission at the time of the transmission; or 1> if the other MAC entity and the MAC entity are able to simultaneously perform uplink transmission(s) and sidelink transmission at the time of the transmission respectively; or 1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:

2> instruct the physical layer to transmit SCI according to the stored sidelink grant with the associated Sidelink transmission information;

2> instruct the physical layer to generate a transmission according to the stored sidelink grant;

2> if HARQ feedback has been enabled for the MAC PDU according to clause 5.22.1.4.2:

3> instruct the physical layer to monitor PSFCH for the transmission and perform PSFCH reception as specified in clause 5.22.1.3.2.

2> if sl-PUCCH-Config is configured by RRC for the stored sidelink grant:

3> determine transmission of an acknowledgement on the PUCCH as specified in clause 5.22.1.3.2.

1> if this transmission corresponds to the last transmission of the MAC PDU and SL-PRS, if available:

2> decrement SL_RESOURCE_RESELECTION_COUNTER by 1, if available.

NOTE 1: If the number of HARQ retransmissions selected by the MAC entity has been reached, or if a positive acknowledgement to a transmission of the MAC PDU has been received, or if a negative-only acknowledgement was enabled in the SCI and no negative acknowledgement was received for the transmission of the MAC PDU, the MAC entity determines this transmission corresponds to the last transmission of the MAC PDU ^^and SL-PRS, if available,^^ for Sidelink resource allocation mode 2. How to determine the last transmission in other cases is up to UE implementation.

1> if sl-MaxTransNum corresponding to the highest priority of the logical channel(s) in the MAC PDU has been configured in sl-CG-MaxTransNumList for the sidelink grant by RRC and the number of transmissions of the MAC PDU has been reached to sl-MaxTransNum; or End of Text Proposal 3

In one embodiment, for/in the shared SL-PRS resource pool, determination of last transmission may consider or be based on either one of PSSCH transmission and SL-PRS transmission. For/in the shared SL-PRS resource pool, the determination of last transmission may consider or be based on either one of MAC PDU transmission and SL-PRS transmission.

Preferably in certain embodiments, when/if the UE performs a first PSSCH transmission (of the MAC PDU) with or without multiplexing SL-PRS transmission such that first number of HARQ retransmissions has been reached, the UE may consider/determine the first PSSCH corresponds to the last transmission of the MAC PDU and SL-PRS, if available.

Preferably in certain embodiments, when/if the UE performs the first PSSCH transmission (of the MAC PDU) with or without multiplexing SL-PRS transmission and the UE receives positive acknowledgement to the first PSSCH transmission of the MAC PDU, the UE may consider/determine the first PSSCH transmission corresponds to the last transmission of the MAC PDU and SL-PRS, if available.

Preferably in certain embodiments, when/if the UE performs the first PSSCH transmission (of the MAC PDU) with or without multiplexing SL-PRS transmission and the UE receives no negative acknowledgement to the first PSSCH transmission of the MAC PDU if negative-only acknowledgement was enabled, the UE may consider/determine the first PSSCH transmission corresponds to the last transmission of the MAC PDU and SL-PRS, if available.

Preferably in certain embodiments, when/if the UE performs the first PSSCH transmission (of the MAC PDU) with multiplexing SL-PRS transmission such that first number of SL-PRS (re) transmissions has been reached, the UE may consider/determine the first PSSCH transmission with multiplexing SL-PRS transmission corresponds to the last transmission of the MAC PDU and SL-PRS, if available.

Preferably in certain embodiments, (in one period, or for one MAC PDU and/or one pending SL-PRS), if either the first PSSCH transmission or the SL-PRS transmission corresponds to the last transmission, the first counter is decremented by 1. The UE may restrict/determine to decrement the first counter by at most 1 in one period. The UE may restrict/determine to decrement the first counter by at most 1 for the/one MAC PDU and SL-PRS, if available.

Preferably in certain embodiments, based on the embodiment, some options for text proposals 4~5 (with changes and edits shown with double curly brackets to show deletions, i.e., {{ . . . }}, and double carets to show additions/insertions, i.e., ^^ . . . ^^) may be provided as below.

Text Proposal 4

5.22.1.3.1a Sidelink Process not Associated with Dedicated SL-PRS Resource Pool

The Sidelink process is associated with a HARQ buffer.

New transmissions and retransmissions are performed on the resource indicated in the sidelink grant as specified in clause 5.22.1.1 and with the MCS selected as specified in clause 8.1.3.1 of TS 38.214 and clause 5.22.1.1.

If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.

Priority of a MAC PDU and SL-PRS, if available, is determined by the highest priority of the logical channel(s), MAC CE(s) in the MAC PDU or SL-PRS.

If the Sidelink HARQ Entity requests a new transmission, the Sidelink process shall:

1> store the MAC PDU in the associated HARQ buffer;

1> store the sidelink grant received from the Sidelink HARQ Entity;

1> generate a transmission as described below.

If the Sidelink HARQ Entity requests a retransmission, the Sidelink process shall:

1> store the sidelink grant received from the Sidelink HARQ Entity;

1> generate a transmission as described below.

To generate a transmission, the Sidelink process shall:

1> if there is no uplink transmission; or

1> if the MAC entity is able to simultaneously perform uplink transmission(s) and sidelink transmission at the time of the transmission; or 1> if the other MAC entity and the MAC entity are able to simultaneously perform uplink transmission(s) and sidelink transmission at the time of the transmission respectively; or 1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:

2> instruct the physical layer to transmit SCI according to the stored sidelink grant with the associated Sidelink transmission information;

2> instruct the physical layer to generate a transmission according to the stored sidelink grant;

2> if HARQ feedback has been enabled for the MAC PDU according to clause 5.22.1.4.2:

3> instruct the physical layer to monitor PSFCH for the transmission and perform PSFCH reception as specified in clause 5.22.1.3.2.

2> if sl-PUCCH-Config is configured by RRC for the stored sidelink grant:

3> determine transmission of an acknowledgement on the PUCCH as specified in clause 5.22.1.3.2.

1> if this transmission corresponds to the last transmission of the MAC PDU and SL-PRS, if available:

2> decrement SL_RESOURCE_RESELECTION_COUNTER by 1, if available.

NOTE 1: If the number of HARQ retransmissions selected by the MAC entity has been reached, ^^ or the number of SL-PRS transmissions selected by the MAC entity has been reached,^^ or if a positive acknowledgement to a transmission of the MAC PDU has been received, or if a negative-only acknowledgement was enabled in the SCI and no negative acknowledgement was received for the transmission of the MAC PDU, the MAC entity determines this transmission corresponds to the last transmission of the MAC PDU ^^and SL-PRS, if available,^^ for Sidelink resource allocation mode 2. How to determine the last transmission in other cases is up to UE implementation. ^^Decrement SL_RESOURCE_RESELECTION_COUNTER by at most 1 for the MAC PDU and SL-PRS, if available.^^

1> if sl-MaxTransNum corresponding to the highest priority of the logical channel(s) in the MAC PDU has been configured in sl-CG-MaxTransNumList for the sidelink grant by RRC and the number of transmissions of the MAC PDU has been reached to sl-MaxTransNum; or End of Text Proposal 4

Text Proposal 5

5.22.1.3.1a Sidelink Process not Associated with Dedicated SL-PRS Resource Pool

The Sidelink process is associated with a HARQ buffer.

New transmissions and retransmissions are performed on the resource indicated in the sidelink grant as specified in clause 5.22.1.1 and with the MCS selected as specified in clause 8.1.3.1 of TS 38.214 and clause 5.22.1.1.

If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.

Priority of a MAC PDU and SL-PRS, if available, is determined by the highest priority of the logical channel(s), MAC CE(s) in the MAC PDU or SL-PRS.

If the Sidelink HARQ Entity requests a new transmission, the Sidelink process shall:

1> store the MAC PDU in the associated HARQ buffer;

1> store the sidelink grant received from the Sidelink HARQ Entity;

1> generate a transmission as described below.

If the Sidelink HARQ Entity requests a retransmission, the Sidelink process shall:

1> store the sidelink grant received from the Sidelink HARQ Entity;

1> generate a transmission as described below.

To generate a transmission, the Sidelink process shall:

1> if there is no uplink transmission; or

1> if the MAC entity is able to simultaneously perform uplink transmission(s) and sidelink transmission at the time of the transmission; or 1> if the other MAC entity and the MAC entity are able to simultaneously perform uplink transmission(s) and sidelink transmission at the time of the transmission respectively; or 1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:

2> instruct the physical layer to transmit SCI according to the stored sidelink grant with the associated Sidelink transmission information;

2> instruct the physical layer to generate a transmission according to the stored sidelink grant;

2> if HARQ feedback has been enabled for the MAC PDU according to clause 5.22.1.4.2:

3> instruct the physical layer to monitor PSFCH for the transmission and perform PSFCH reception as specified in clause 5.22.1.3.2.

2> if sl-PUCCH-Config is configured by RRC for the stored sidelink grant:

3> determine transmission of an acknowledgement on the PUCCH as specified in clause 5.22.1.3.2.

1> if this transmission corresponds to the last transmission of ^^either^^ the MAC PDU {{and}} ^^or^^ SL-PRS, if available:

2> decrement SL_RESOURCE_RESELECTION_COUNTER by 1, if available.

NOTE 1: If the number of HARQ retransmissions selected by the MAC entity has been reached, or if a positive acknowledgement to a transmission of the MAC PDU has been received, or if a negative-only acknowledgement was enabled in the SCI and no negative acknowledgement was received for the transmission of the MAC PDU, the MAC entity determines this transmission corresponds to the last transmission of the MAC PDU for Sidelink resource allocation mode 2. How to determine the last transmission in other cases is up to UE implementation. ^^Decrement SL_RESOURCE_RESELECTION_COUNTER by at most 1 for the MAC PDU and SL-PRS, if available.^^

1> if sl-MaxTransNum corresponding to the highest priority of the logical channel(s) in the MAC PDU has been configured in sl-CG-MaxTransNumList for the sidelink grant by RRC and the number of transmissions of the MAC PDU has been reached to sl-MaxTransNum; or End of Text Proposal 5

Various examples and embodiments of the present invention are described below. For the methods, alternatives, concepts, examples, and embodiments detailed above and herein, the following aspects and embodiments are possible.

Note that any of the above and herein disclosed methods, alternatives, concepts, examples, and/or embodiments may be combined or applied simultaneously, in whole or in part.

Preferably in certain embodiments, the SL-PRS may be sidelink positioning reference signal (SL PRS).

Preferably in certain embodiments, the SL-PRS is not SL Channel State Information Reference Signal (CSI-RS).

Preferably in certain embodiments, the SL-PRS may be represented/replaced as a sidelink reference signal.

Preferably in certain embodiments, the sidelink reference signal may be applied/utilized for (absolute and/or relative) positioning and/or ranging.

Preferably in certain embodiments, the sidelink reference signal may be applied/utilized for any of time-based positioning/ranging methods and/or angle-based positioning/ranging methods. Preferably in certain embodiments, the sidelink reference signal may be applied/utilized for any of TDoA, RTT-based positioning/ranging, AoA, AoD, or carrier phase measurement based positioning Preferably in certain embodiments, the sidelink reference signal may be SL beam management RS. Preferably in certain embodiments, the sidelink reference signal may be SL CSI-RS (for beam management), which is not combined within a PSSCH (bandwidth) in frequency domain. Preferably in certain embodiments, the sidelink reference signal may require large bandwidth. Preferably in certain embodiments, the sidelink reference signal may be utilized for (High-Resolution) localization, sensing, or imaging. Preferably in certain embodiments, the sidelink reference signal may be utilized for beam management (e.g., in Frequency Range 2 (FR2))

Preferably in certain embodiments, any of the above concepts, methods, alternatives, and embodiments for SL-PRS may be applied for other reference signals (e.g., reference signal designed/introduced in future 5G or 6G or etc.).

Preferably in certain embodiments, any of the above concepts, methods, alternatives, and embodiments for SL-PRS may be applied for SL CSI-RS (for beam management).

Preferably in certain embodiments, any of the above concepts, methods, alternatives, and embodiments for SL-PRS may be applied for reference signals for (High-Resolution) localization (e.g., reference signal designed/introduced in future 5G or 6G or etc.).

Preferably in certain embodiments, any of the above concepts, methods, alternatives, and embodiments for SL-PRS may be applied for reference signals for (High-Resolution) sensing (e.g., reference signal designed/introduced in future 5G or 6G or etc.).

Preferably in certain embodiments, any of the above concepts, methods, alternatives, and embodiments for SL-PRS may be applied for reference signals for (High-resolution) imaging (e.g., reference signal designed/introduced in future 5G or 6G or etc.).

Preferably in certain embodiments, the shared SL-PRS resource pool is utilized/configured for PSSCH transmission/reception and/or SL-PRS transmission/reception. Preferably in certain embodiments, the shared SL-PRS resource pool may be a sidelink resource pool for PSSCH transmission/reception and enabled/configured/supported for SL-PRS transmission/reception/measurement.

Preferably in certain embodiments, the sidelink communication resource pool may be a sidelink resource pool for PSSCH transmission/reception and not enabled/configured/supported for SL-PRS transmission/reception/measurement.

Preferably in certain embodiments, the dedicated SL-PRS resource pool may be a sidelink resource pool comprising/providing at least SL-PRS resources and/or sidelink control resources. Preferably in certain embodiments, the dedicated SL-PRS resource pool does not comprise sidelink data resources (i.e., does not comprise PSSCH resources). Preferably in certain embodiments, the dedicated SL-PRS resource pool for SL-PRS does not comprise sidelink feedback resources.

Preferably in certain embodiments, the sidelink data packet may comprise or mean a (sidelink) TB or a (sidelink) MAC PDU. The (sidelink) MAC PDU may comprise a MAC subheader, MAC CE(s) if available, and/or sidelink data from sidelink logical channel(s) if available.

Preferably in certain embodiments, PSSCH may mean sidelink data transmission.

Preferably in certain embodiments, PSFCH may mean sidelink feedback transmission.

Preferably in certain embodiments, PSCCH may mean sidelink control transmission.

Preferably in certain embodiments, the SCI/PSCCH associated with SL-PRS may include/comprise information for scheduling/indicating/allocating SL-PRS resources.

Preferably in certain embodiments, sidelink control information in shared SL-PRS resource pool or sidelink communication resource pool may be transmitted/delivered via 1st stage SCI and 2nd stage SCI. Preferably in certain embodiments, the sidelink control information in shared SL-PRS resource pool or sidelink communication resource pool may be delivered at least in PSCCH. Preferably in certain embodiments, the sidelink control information in shared SL-PRS resource pool or sidelink communication resource pool may comprise 1st stage SCI. Preferably in certain embodiments, the 1st stage SCI may be transmitted via PSCCH. Preferably in certain embodiments, the sidelink control information in shared SL-PRS resource pool or sidelink communication resource pool may comprise 2nd stage SCI. Preferably in certain embodiments, the 2nd stage SCI may be transmitted via multiplexing with PSSCH. Preferably in certain embodiments, the SCI format 1 or SCI format 1-X is 1st stage SCI. Preferably in certain embodiments, the SCI format 2-A or 2-B or 2-C or 2-D or 2-X is a 2nd stage SCI.

Preferably in certain embodiments, the SCI format 2-A, 2-B, 2-C does not comprise SL-PRS resource-related information/fields.

Preferably in certain embodiments, the SCI format 2-D comprises SL-PRS resource-related information/fields.

Preferably in certain embodiments, for transmitting PSSCH in a slot or subslot, the TX UE needs to transmit SCI in the slot or the subslot for scheduling the PSSCH.

Preferably in certain embodiments, for transmitting SL-PRS in a slot or subslot, the TX UE needs to transmit SCI in the slot or the subslot for scheduling the SL-PRS.

Preferably in certain embodiments, the slot may mean a sidelink slot. Preferably in certain embodiments, the slot may be represented/replaced as a TTI.

Preferably in certain embodiments, the sidelink slot may mean slot for sidelink. Preferably in certain embodiments, a TTI may be a subframe (for sidelink) or slot (for sidelink) or sub-slot (for sidelink). Preferably in certain embodiments, a TTI comprises multiple symbols, e.g., 12 or 14 symbols. Preferably in certain embodiments, a TTI may be a slot (fully/partially) comprising sidelink symbols. Preferably in certain embodiments, a TTI may mean a transmission time interval for a sidelink (data) transmission. Preferably in certain embodiments, a sidelink slot or a slot for sidelink may contain all Orthogonal Frequency Division Multiplexing (OFDM) symbols available for sidelink transmission. Preferably in certain embodiments, a sidelink slot or a slot for sidelink may contain a consecutive number of symbols available for sidelink transmission. Preferably in certain embodiments, a sidelink slot or a slot for sidelink means that a slot is included/comprised in a sidelink resource pool.

Preferably in certain embodiments, the symbol may mean a symbol indicated/configured for sidelink.

Preferably in certain embodiments, the slot may mean/comprise a sidelink slot associated with the (sidelink) resource pool. Preferably in certain embodiments, the slot may not mean/comprise a sidelink slot associated with other/another (sidelink) resource pool.

Preferably in certain embodiments, a sub-channel is a unit for sidelink resource allocation/scheduling (for PSSCH). Preferably in certain embodiments, a sub-channel may comprise multiple contiguous PRBs in frequency domain. Preferably in certain embodiments, the number of PRBs for each sub-channel may be (pre-)configured for a sidelink resource pool. Preferably in certain embodiments, a sidelink resource pool (pre-)configuration may indicate/configure the number of PRBs for each sub-channel. Preferably in certain embodiments, the number of PRBs for each sub-channel may be any of 10, 12, 15, 20, 25, 50, 75, 100. Preferably in certain embodiments, a sub-channel may be represented as a unit for sidelink resource allocation/scheduling. Preferably in certain embodiments, a sub-channel may mean a set of consecutive PRBs in frequency domain. Preferably in certain embodiments, a sub-channel may mean a set of consecutive resource elements in frequency domain.

Preferably in certain embodiments, the first UE may have/maintain/establish multiple sidelink links/connections on PC5 interface. For different sidelink links/connections, the first UE may perform sidelink transmission/reception to/from different paired UE(s).

Preferably in certain embodiments, the first UE may have/maintain/establish a first sidelink link/connection and a second sidelink link/connection. The paired UE of the first sidelink link/connection may be different from the paired UE of the second sidelink link/connection. Preferably in certain embodiments, the sidelink logical channel(s) associated with (the paired UE of) the first sidelink link/connection are separate/independent from the sidelink logical channel(s) associated with (the paired UE of) the second sidelink link/connection.

Preferably in certain embodiments, the UE may be/mean/comprise/replace a device.

Preferably in certain embodiments, the sidelink transmission/reception may be UE-to-UE transmission/reception. Preferably in certain embodiments, the sidelink transmission/reception may be device-to-device transmission/reception. Preferably in certain embodiments, the sidelink transmission/reception may be Vehicle-to-Everything (V2X) transmission/reception. Preferably in certain embodiments, the sidelink transmission/reception may be Pedestrian-to-Everything (P2X) transmission/reception. Preferably in certain embodiments, the sidelink transmission/reception may be on PC5 interface.

Preferably in certain embodiments, the PC5 interface may be wireless interface for communication between device and device. Preferably in certain embodiments, the PC5 interface may be a wireless interface for communication between devices. Preferably in certain embodiments, the PC5 interface may be a wireless interface for communication between UEs. Preferably in certain embodiments, the PC5 interface may be a wireless interface for V2X or P2X communication. Preferably in certain embodiments, the Uu interface may be a wireless interface for communication between network node and device. Preferably in certain embodiments, the Uu interface may be a wireless interface for communication between network node and UE.

Preferably in certain embodiments, the first UE may be a first device. Preferably in certain embodiments, the first UE may be a vehicle UE. Preferably in certain embodiments, the first UE may be a V2X UE.

Preferably in certain embodiments, the second UE may be a second device. Preferably in certain embodiments, the second UE may be a vehicle UE. Preferably in certain embodiments, the second device may be a V2X UE.

Preferably in certain embodiments, the first UE and the second device are different devices.

Various examples and embodiments of the present invention are described below. For the methods, alternatives, concepts, examples, and embodiments detailed above and herein, the following aspects and embodiments are possible.

Note that any of the above and herein disclosed methods, alternatives, concepts, examples, and/or embodiments may be combined or applied simultaneously, in whole or in part.

Figure 6:
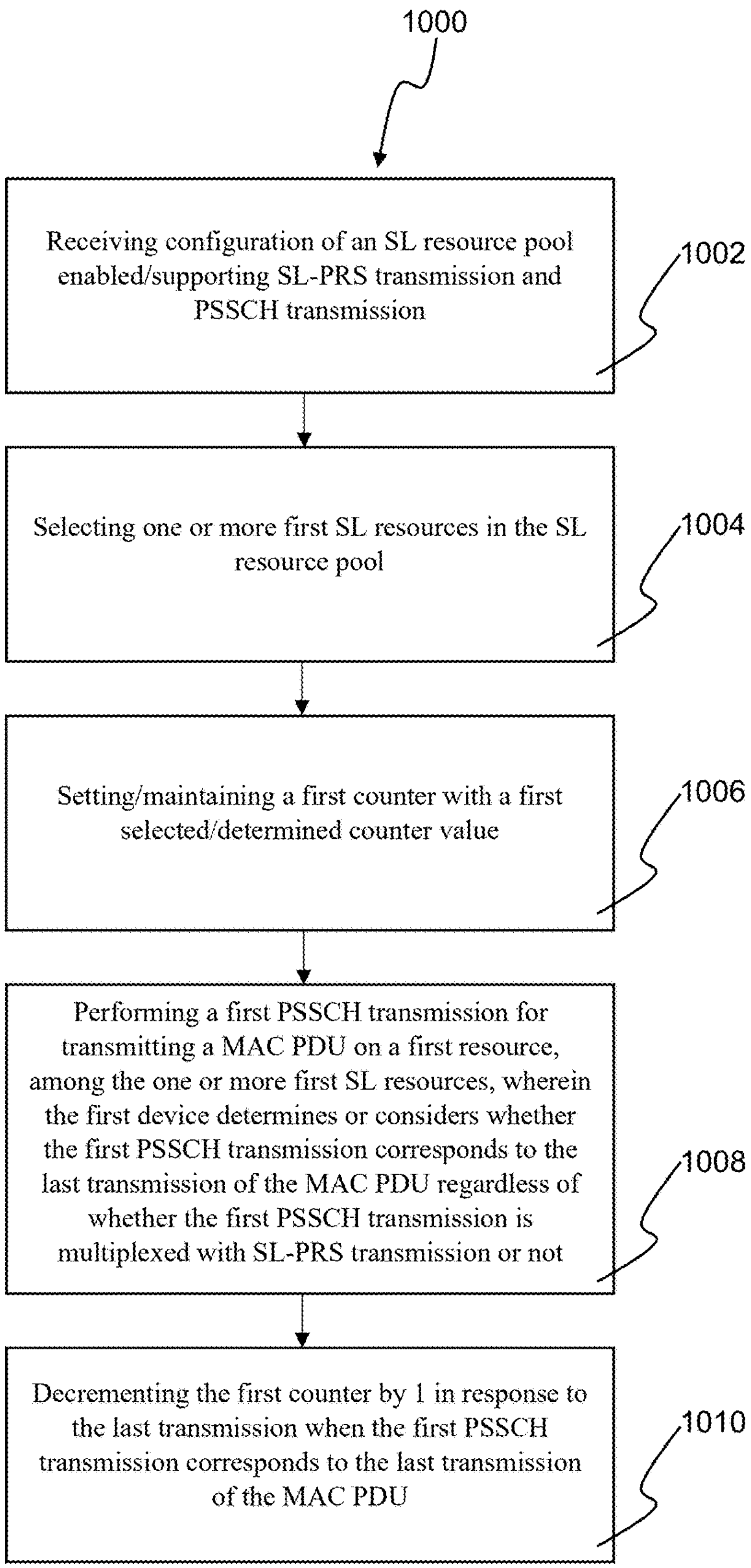
FIG. 6 is a flow diagram of a method of a first device in a wireless communication system comprising receiving configuration of an SL resource pool enabled/supporting SL-PRS transmission and PSSCH transmission, selecting one or more first SL resources in the SL resource pool, setting/maintaining a first counter with a first selected/determined counter value, performing a first PSSCH transmission for transmitting a MAC PDU on a first resource, among the one or more first SL resources, and decrementing the first counter by 1 in response to the last transmission when the first PSSCH transmission corresponds to the last transmission of the MAC PDU, in accordance with embodiments of the present invention.

Referring to FIG. 6, with this and other concepts, systems, and methods of the present invention, a method 1000 for a first device in a wireless communication system comprises receiving configuration of an SL resource pool enabled/supporting SL-PRS transmission and PSSCH transmission (step 1002), selecting one or more first SL resources in the SL resource pool (step 1004), setting/maintaining a first counter with a first selected/determined counter value (step 1006), performing a first PSSCH transmission for transmitting a MAC PDU on a first resource, among the one or more first SL resources, wherein the first device determines or considers whether the first PSSCH transmission corresponds to the last transmission of the MAC PDU regardless of whether the first PSSCH transmission is multiplexed with SL-PRS transmission or not (1008), and decrementing the first counter by 1 in response to the last transmission when the first PSSCH transmission corresponds to the last transmission of the MAC PDU (step 1010).

In various embodiments, the first device determines/selects a first number of HARQ retransmissions, and when the first device performs the first PSSCH transmission such that the first number of HARQ retransmissions of the MAC PDU has been reached, the first device determines or considers the first PSSCH transmission corresponding to the last transmission of the MAC PDU regardless of whether the first PSSCH transmission is multiplexed with SL-PRS transmission or not.

In various embodiments, when the first device receives positive acknowledgement to the first PSSCH transmission or the MAC PDU, the first device determines or considers the first PSSCH transmission corresponding to the last transmission of the MAC PDU regardless of whether the first PSSCH transmission is multiplexed with SL-PRS transmission or not.

In various embodiments, when the first device receives no negative acknowledgement to the first PSSCH transmission or the MAC PDU if negative-only acknowledgement was enabled, the first device determines or considers the first PSSCH transmission corresponding to the last transmission of the MAC PDU regardless of whether the first PSSCH transmission is multiplexed with SL-PRS transmission or not.

In various embodiments, the first PSSCH transmission is multiplexed with SL-PRS transmission, or the first PSSCH transmission is not multiplexed with SL-PRS transmission.

In various embodiments, the determination/considering of the last transmission does not consider or is not based on SL-PRS transmission, even if the first PSSCH transmission is multiplexed with SL-PRS transmission.

In various embodiments, the last transmission of the MAC PDU is/means/corresponds to the last transmission of the MAC PDU and SL-PRS, if available, or the last transmission of the MAC PDU is/means/corresponds to the last transmission of the MAC PDU with SL-PRS, if available.

Referring back to FIGS. 3 and 4, in one or more embodiments from the perspective of a first device in a wireless communication system, the device 300 includes a program code 312 stored in memory 310 of the transmitter. The CPU 308 could execute program code 312 to: (i) receive configuration of an SL resource pool enabled/supporting SL-PRS transmission and PSSCH transmission; (ii) select one or more first SL resources in the SL resource pool; (iii) set/maintain a first counter with a first selected/determined counter value; (iv) perform a first PSSCH transmission for transmitting a MAC PDU on a first resource, among the one or more first SL resources, wherein the first device determines or considers whether the first PSSCH transmission corresponds to the last transmission of the MAC PDU regardless of whether the first PSSCH transmission is multiplexed with SL-PRS transmission or not; and (v) decrement the first counter by 1 in response to the last transmission when the first PSSCH transmission corresponds to the last transmission of the MAC PDU. Moreover, the CPU 308 can execute the program code 312 to perform all of the described actions, steps, and methods described above, below, or otherwise herein.

Figure 7:
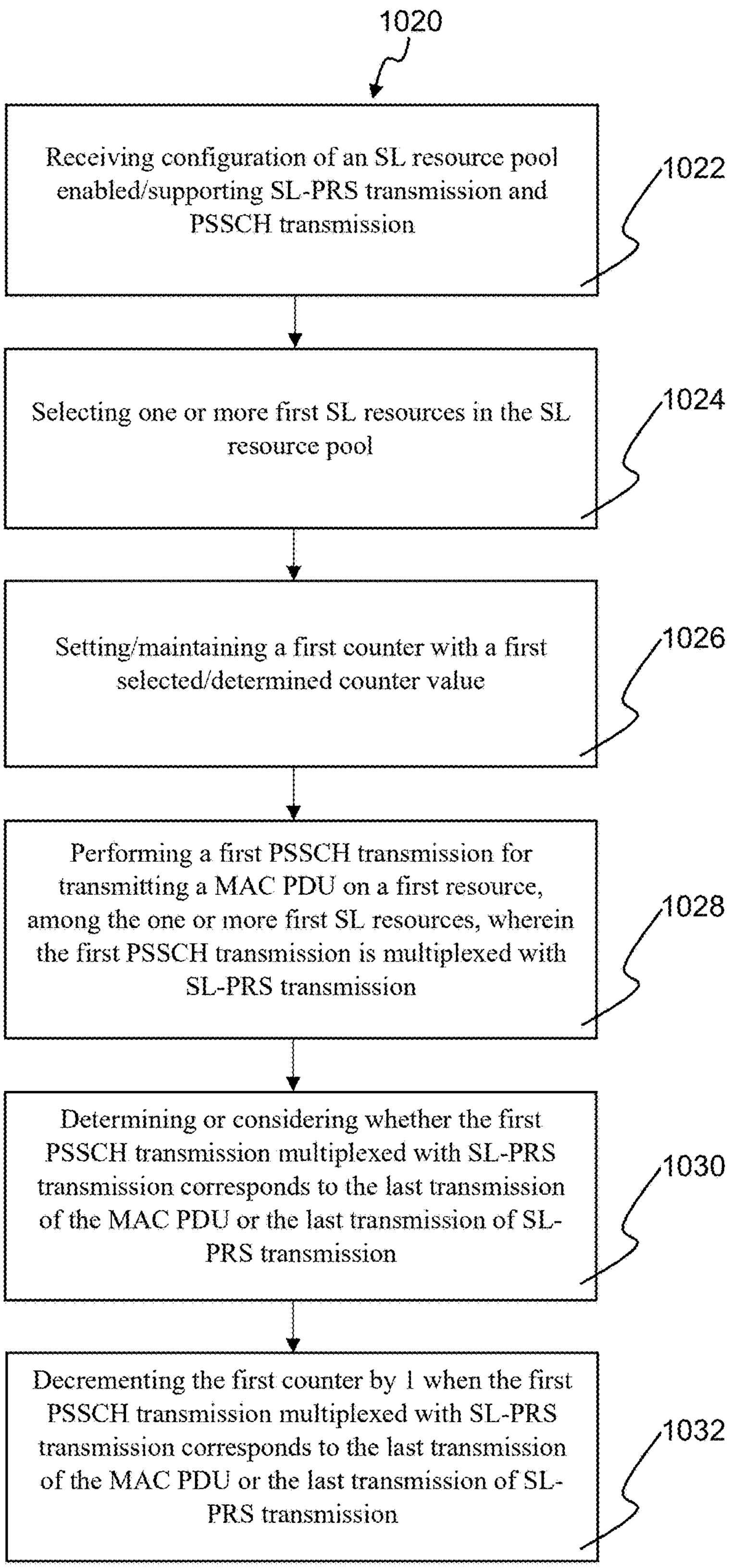
FIG. 7 is a flow diagram of a method of a first device in a wireless communication system comprising receiving configuration of an SL resource pool enabled/supporting SL-PRS transmission and PSSCH transmission, selecting one or more first SL resources in the SL resource pool, setting/maintaining a first counter with a first selected/determined counter value, performing a first PSSCH transmission for transmitting a MAC PDU on a first resource, among the one or more first SL resources, determining or considering whether the first PSSCH transmission multiplexed with SL-PRS transmission corresponds to the last transmission of the MAC PDU or the last transmission of SL-PRS transmission, and decrementing the first counter by 1 when the first PSSCH transmission multiplexed with SL-PRS transmission corresponds to the last transmission of the MAC PDU or the last transmission of SL-PRS transmission, in accordance with embodiments of the present invention.

Referring to FIG. 7, with this and other concepts, systems, and methods of the present invention, a method 1020 for a first device in a wireless communication system comprises receiving configuration of an SL resource pool enabled/supporting SL-PRS transmission and PSSCH transmission (step 1022), selecting one or more first SL resources in the SL resource pool (step 1024), setting/maintaining a first counter with a first selected/determined counter value (step 1026), performing a first PSSCH transmission for transmitting a MAC PDU on a first resource, among the one or more first SL resources, wherein the first PSSCH transmission is multiplexed with SL-PRS transmission (step 1028), determining or considering whether the first PSSCH transmission multiplexed with SL-PRS transmission corresponds to the last transmission of the MAC PDU or the last transmission of SL-PRS transmission (step 1030), and decrementing the first counter by 1 when the first PSSCH transmission multiplexed with SL-PRS transmission corresponds to the last transmission of the MAC PDU or the last transmission of SL-PRS transmission (step 1032).

In various embodiments, the first device restricts/determines to decrement the first counter by at most 1 in one period or for one MAC PDU.

In various embodiments, the first device determines/selects a first number of HARQ retransmissions, and when the first device performs the first PSSCH transmission multiplexed with SL-PRS transmission such that the first number of HARQ retransmissions of the MAC PDU has been reached, the first device determines or considers the first PSSCH transmission multiplexed with SL-PRS transmission corresponding to the last transmission of the MAC PDU.

In various embodiments, the first device determines/selects a first number of SL-PRS transmissions, and when the first device performs the first PSSCH transmission multiplexed with SL-PRS transmission such that the first number of SL-PRS transmissions has been reached, the first device determines or considers the first PSSCH transmission multiplexed with SL-PRS transmission corresponding to the last transmission of the SL-PRS.

In various embodiments, when the first device receives positive acknowledgement to the first PSSCH transmission or the MAC PDU, the first device determines or considers the first PSSCH transmission multiplexed with SL-PRS transmission corresponding to the last transmission of the MAC PDU.

In various embodiments, when the first device receives no negative acknowledgement to the first PSSCH transmission or the MAC PDU if negative-only acknowledgement was enabled, the first device determines or considers the first PSSCH transmission multiplexed with SL-PRS transmission corresponding to the last transmission of the MAC PDU.

In various embodiments, the determination/considering of the last transmission considers or is based on SL-PRS transmission, when the first PSSCH transmission is multiplexed with SL-PRS transmission.

In various embodiments, the last transmission of the MAC PDU is/means/corresponds to the last transmission of the MAC PDU and SL-PRS, if available, or the last transmission of the SL-PRS is/means/corresponds to the last transmission of the MAC PDU and SL-PRS, if available.

In various embodiments, the SL resource pool is shared SL-PRS resource pool, the first number is/means sl-MaxTxTransNumPSSCH or a maximum transmission number of PSSCH, the first counter or the second selected/determined counter value is/means SL_RESOURCE_RESELECTION_COUNTER.

Referring back to FIGS. 3 and 4, in one or more embodiments from the perspective of a first device in a wireless communication system, the device 300 includes a program code 312 stored in memory 310 of the transmitter. The CPU 308 could execute program code 312 to: (i) receive configuration of an SL resource pool enabled/supporting SL-PRS transmission and PSSCH transmission; (ii) select one or more first SL resources in the SL resource pool; (iii) set/maintain a first counter with a first selected/determined counter value; (iv) perform a first PSSCH transmission for transmitting a MAC PDU on a first resource, among the one or more first SL resources, wherein the first PSSCH transmission is multiplexed with SL-PRS transmission; (v) determine or consider whether the first PSSCH transmission multiplexed with SL-PRS transmission corresponds to the last transmission of the MAC PDU or the last transmission of SL-PRS transmission; and (vi) decrement the first counter by 1 when the first PSSCH transmission multiplexed with SL-PRS transmission corresponds to the last transmission of the MAC PDU or the last transmission of SL-PRS transmission. Moreover, the CPU 308 can execute the program code 312 to perform all of the described actions, steps, and methods described above, below, or otherwise herein.

Figure 8:
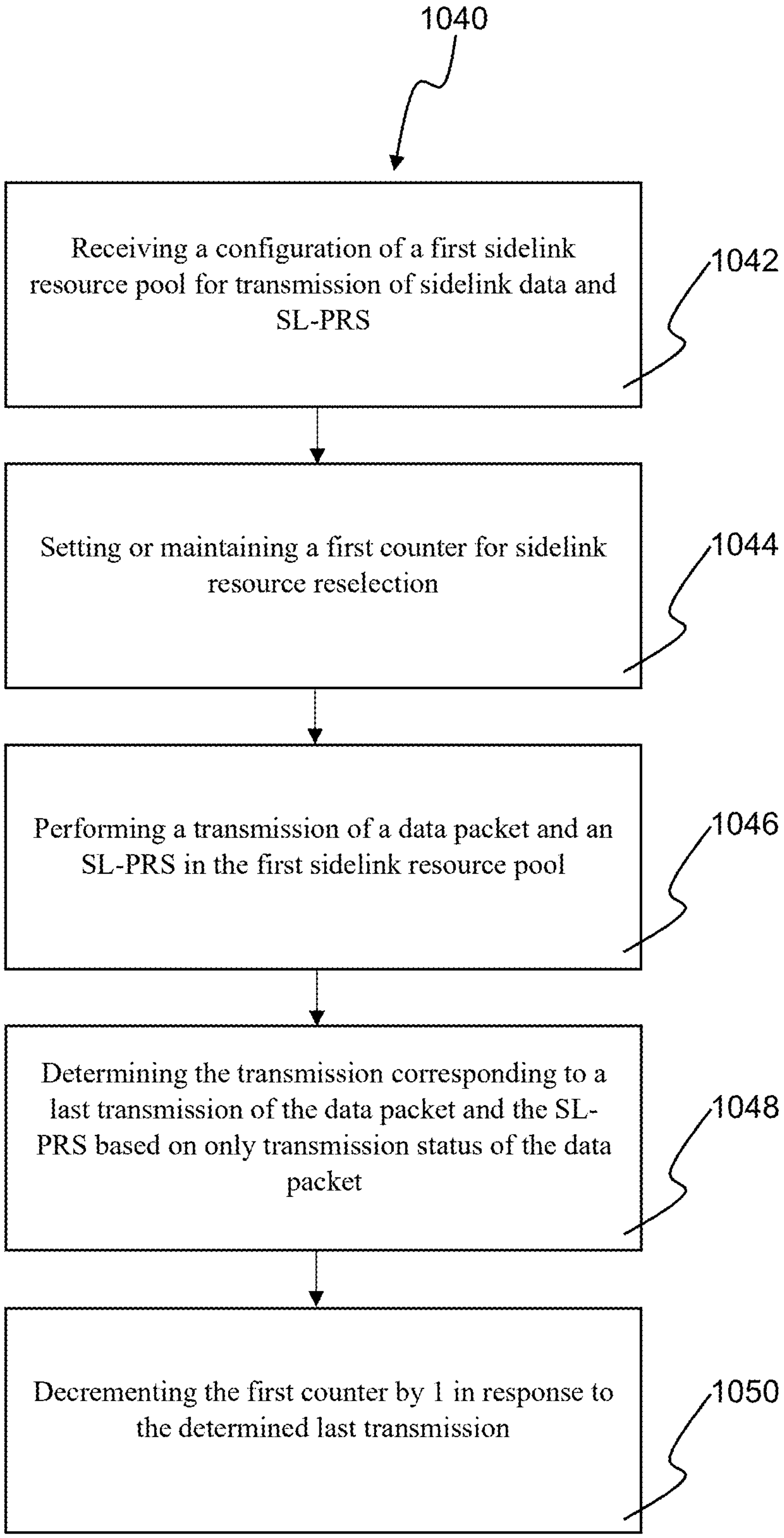
FIG. 8 is a flow diagram of a method of a first device in a wireless communication system comprising receiving a configuration of a first sidelink resource pool for transmission of sidelink data and SL-PRS, setting or maintaining a first counter for sidelink resource reselection, performing a transmission of a data packet and an SL-PRS in the first sidelink resource pool, determining the transmission corresponding to a last transmission of the data packet and the SL-PRS based on only transmission status of the data packet, and decrementing the first counter by 1 in response to the determined last transmission, in accordance with embodiments of the present invention.

Referring to FIG. 8, with this and other concepts, systems, and methods of the present invention, a method 1040 for a first device in a wireless communication system comprises receiving a configuration of a first sidelink resource pool for transmission of sidelink data and SL-PRS (step 1042), setting or maintaining a first counter for sidelink resource reselection (step 1044), performing a transmission of a data packet and an SL-PRS in the first sidelink resource pool (step 1046), determining the transmission corresponding to a last transmission of the data packet and the SL-PRS based on only transmission status of the data packet (step 1048), and decrementing the first counter by 1 in response to the determined last transmission (step 1050).

In various embodiments, the last transmission of the data packet and the SL-PRS are determined not based on transmission status of the SL-PRS.

In various embodiments, the transmission of the data packet and the SL-PRS comprise a transmission of the data packet multiplexed with a transmission of the SL-PRS, and/or the transmission of the data packet and the SL-PRS comprise the transmission of the data packet and the transmission of the SL-PRS in a same sidelink TTI and/or in same frequency domain resources.

In various embodiments, the transmission status of the data packet comprises at least whether a first number of HARQ retransmissions of the data packet has been reached, and/or if the first device performs the transmission such that the first number of HARQ retransmissions of the data packet has been reached, the first device determines the transmission corresponding to the last transmission of the data packet and the SL-PRS.

In various embodiments, the transmission status of the data packet comprises at least whether the first device receives positive acknowledgement for the transmission of the data packet, and/or if the first device receives positive acknowledgement for the transmission of the data packet, the first device determines the transmission corresponding to the last transmission of the data packet and the SL-PRS.

In various embodiments, the transmission status of the data packet comprises at least whether the first device receives no negative acknowledgement for the transmission of the data packet if negative-only acknowledgement was enabled for the data packet, and/or if the first device receives no negative acknowledgement for the transmission of the data packet and if negative-only acknowledgement was enabled for the data packet, the first device determines the transmission corresponding to the last transmission of the data packet and the SL-PRS.

In various embodiments, the data packet is a MAC PDU or a transport block, the transmission of the data packet is a sidelink data transmission comprising the data packet, and/or the sidelink data transmission is a PSSCH transmission.

In various embodiments, the method further comprises selecting or reserving one or more first sidelink resources in the first sidelink resource pool; performing the transmission of the data packet and the SL-PRS on a first sidelink resource, among the one or more first sidelink resources; and at least when (a counter value of) the first counter is zero, clearing (reservation of) the one or more first sidelink resources and re-selecting one or more sidelink resources in the first sidelink resource pool.

In various embodiments, the method further comprises receiving a configuration of a second sidelink resource pool dedicated for transmission of SL-PRS; setting or maintaining a second counter for sidelink resource reselection; performing another transmission of an SL-PRS in the second sidelink resource pool; determining the another transmission corresponding to a last transmission of the SL-PRS based on only transmission status of the SL-PRS, wherein the transmission status of the SL-PRS comprises at least whether a second number of SL-PRS transmissions has been reached; and decrementing the second counter by 1 in response to the determined last transmission.

Referring back to FIGS. 3 and 4, in one or more embodiments from the perspective of a first device in a wireless communication system, the device 300 includes a program code 312 stored in memory 310 of the transmitter. The CPU 308 could execute program code 312 to: (i) receive a configuration of a first sidelink resource pool for transmission of sidelink data and SL-PRS; (ii) set or maintain a first counter for sidelink resource reselection; (iii) perform a transmission of a data packet and an SL-PRS in the first sidelink resource pool; (iv) determine the transmission corresponding to a last transmission of the data packet and the SL-PRS based on only transmission status of the data packet; and (v) decrement the first counter by 1 in response to the determined last transmission. Moreover, the CPU 308 can execute the program code 312 to perform all of the described actions, steps, and methods described above, below, or otherwise herein.

Figure 9:
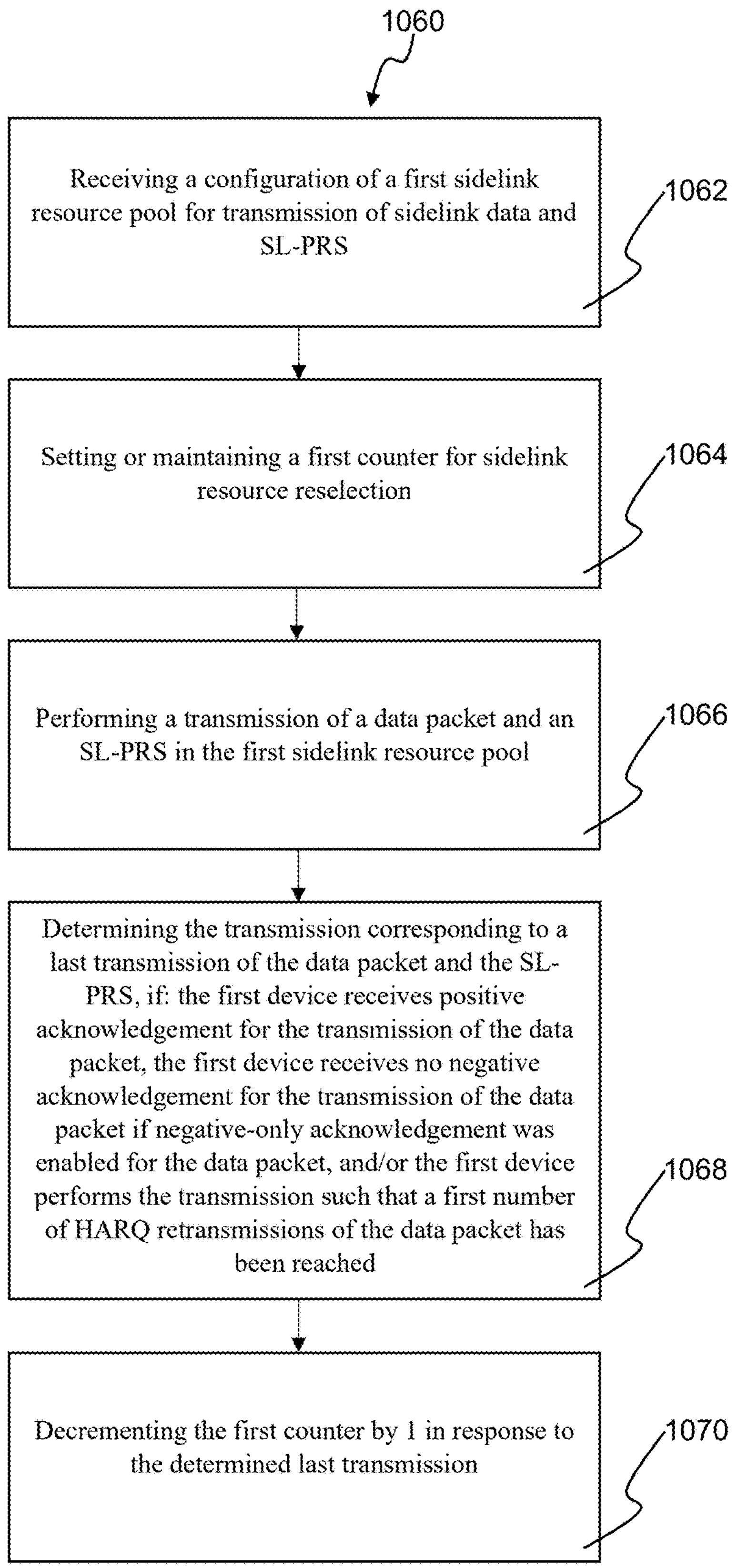
FIG. 9 is a flow diagram of a method of a first device in a wireless communication system comprising receiving a configuration of a first sidelink resource pool for transmission of sidelink data and SL-PRS, setting or maintaining a first counter for sidelink resource reselection, performing a transmission of a data packet and an SL-PRS in the first sidelink resource pool, determining the transmission corresponding to a last transmission of the data packet and the SL-PRS, if: the first device receives positive acknowledgement for the transmission of the data packet, the first device receives no negative acknowledgement for the transmission of the data packet if negative-only acknowledgement was enabled for the data packet, and/or the first device performs the transmission such that a first number of HARQ retransmissions of the data packet has been reached, and decrementing the first counter by 1 in response to the determined last transmission, in accordance with embodiments of the present invention.

Referring to FIG. 9, with this and other concepts, systems, and methods of the present invention, a method 1060 for a first device in a wireless communication system comprises receiving a configuration of a first sidelink resource pool for transmission of sidelink data and SL-PRS (step 1062), setting or maintaining a first counter for sidelink resource reselection (step 1064), performing a transmission of a data packet and an SL-PRS in the first sidelink resource pool (step 1066), determining the transmission corresponding to a last transmission of the data packet and the SL-PRS, if: the first device receives positive acknowledgement for the transmission of the data packet, the first device receives no negative acknowledgement for the transmission of the data packet if negative-only acknowledgement was enabled for the data packet, and/or the first device performs the transmission such that a first number of HARQ retransmissions of the data packet has been reached (step 1068), and decrementing the first counter by 1 in response to the determined last transmission (step 1070).

In various embodiments, the last transmission of the data packet and the SL-PRS are determined not based on transmission status of the SL-PRS.

In various embodiments, the transmission of the data packet and the SL-PRS comprise a transmission of the data packet multiplexed with a transmission of the SL-PRS, and/or the transmission of the data packet and the SL-PRS comprise the transmission of the data packet and the transmission of the SL-PRS in a same sidelink TTI and/or in same frequency domain resources.

In various embodiments, the data packet is a MAC PDU or a transport block, the transmission of the data packet is a sidelink data transmission comprising the data packet, and/or the sidelink data transmission is a PSSCH transmission In various embodiments, the method further comprises selecting or reserving one or more first sidelink resources in the first sidelink resource pool; performing the transmission of the data packet and the SL-PRS on a first sidelink resource, among the one or more first sidelink resources; and at least when (a counter value of) the first counter is zero, clearing (reservation of) the one or more first sidelink resources and re-selecting one or more sidelink resources in the first sidelink resource pool.

In various embodiments, the method further comprises receiving a configuration of a second sidelink resource pool dedicated for transmission of SL-PRS; setting or maintaining a second counter for sidelink resource reselection; performing another transmission of an SL-PRS in the second sidelink resource pool; determining the another transmission corresponding to a last transmission of the SL-PRS, if the first device performs the another transmission such that a second number of SL-PRS transmissions has been reached; and decrementing the second counter by 1 in response to the determined last transmission.

Referring back to FIGS. 3 and 4, in one or more embodiments from the perspective of a first device in a wireless communication system, the device 300 includes a program code 312 stored in memory 310 of the transmitter. The CPU 308 could execute program code 312 to: (i) receive a configuration of a first sidelink resource pool for transmission of sidelink data and SL-PRS; (ii) set or maintain a first counter for sidelink resource reselection; (iii) perform a transmission of a data packet and an SL-PRS in the first sidelink resource pool; (iv) determine the transmission corresponding to a last transmission of the data packet and the SL-PRS, if: the first device receives positive acknowledgement for the transmission of the data packet, the first device receives no negative acknowledgement for the transmission of the data packet if negative-only acknowledgement was enabled for the data packet, and/or the first device performs the transmission such that a first number of HARQ retransmissions of the data packet has been reached; and (v) decrement the first counter by 1 in response to the determined last transmission. Moreover, the CPU 308 can execute the program code 312 to perform all of the described actions, steps, and methods described above, below, or otherwise herein.

Figure 10:
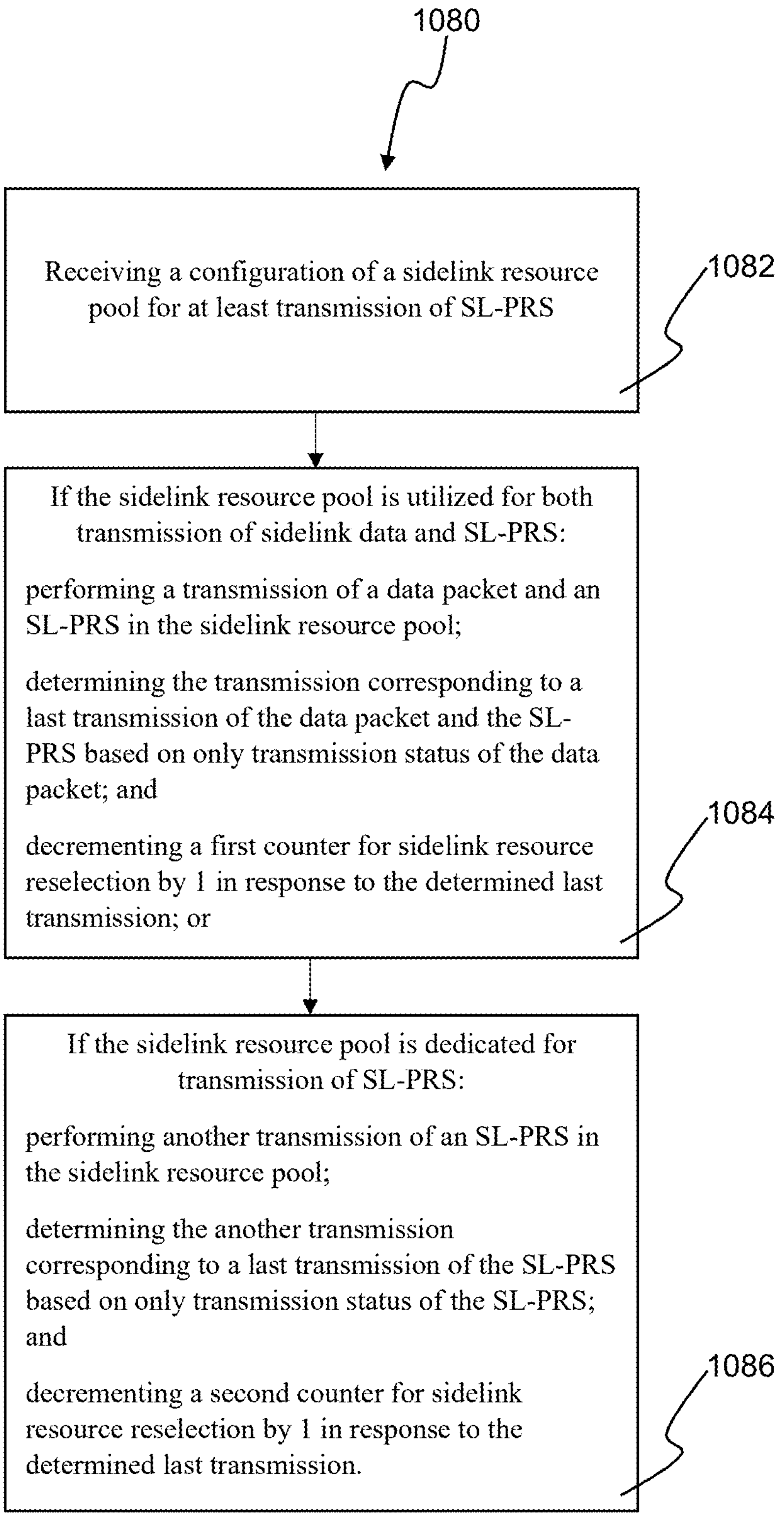
FIG. 10 is a flow diagram of a method of a first device in a wireless communication system comprising receiving a configuration of a sidelink resource pool for at least transmission of SL-PRS; if the sidelink resource pool is utilized for both transmission of sidelink data and SL-PRS: performing a transmission of a data packet and an SL-PRS in the sidelink resource pool, determining the transmission corresponding to a last transmission of the data packet and the SL-PRS based on only transmission status of the data packet; and decrementing a first counter for sidelink resource reselection by 1 in response to the determined last transmission; or if the sidelink resource pool is dedicated for transmission of SL-PRS: performing another transmission of an SL-PRS in the sidelink resource pool, determining the another transmission corresponding to a last transmission of the SL-PRS based on only transmission status of the SL-PRS, and decrementing a second counter for sidelink resource reselection by 1 in response to the determined last transmission, in accordance with embodiments of the present invention.

Referring to FIG. 10, with this and other concepts, systems, and methods of the present invention, a method 1080 for a first device in a wireless communication system comprises receiving a configuration of a sidelink resource pool for at least transmission of SL-PRS (step 1082); if the sidelink resource pool is utilized for both transmission of sidelink data and SL-PRS: performing a transmission of a data packet and an SL-PRS in the sidelink resource pool, determining the transmission corresponding to a last transmission of the data packet and the SL-PRS based on only transmission status of the data packet; and decrementing a first counter for sidelink resource reselection by 1 in response to the determined last transmission (step 1084); or if the sidelink resource pool is dedicated for transmission of SL-PRS: performing another transmission of an SL-PRS in the sidelink resource pool, determining the another transmission corresponding to a last transmission of the SL-PRS based on only transmission status of the SL-PRS, and decrementing a second counter for sidelink resource reselection by 1 in response to the determined last transmission (step 1086).

In various embodiments, the transmission status of the data packet comprises at least whether a first number of HARQ retransmissions of the data packet has been reached, if the first device performs the transmission such that the first number of HARQ retransmissions of the data packet has been reached, the first device determines the transmission corresponding to the last transmission of the data packet and the SL-PRS, the transmission status of the SL-PRS comprises at least whether a second number of SL-PRS transmissions has been reached, and/or if the first device performs the another transmission such that the second number of SL-PRS transmissions has been reached, the first device determines the another transmission corresponding to the last transmission of the SL-PRS.

In various embodiments, the transmission status of the data packet comprises at least whether the first device receives positive acknowledgement for the transmission of the data packet, if the first device receives positive acknowledgement for the transmission of the data packet, the first device determines the transmission corresponding to the last transmission of the data packet and the SL-PRS, the transmission status of the data packet comprises at least whether the first device receives no negative acknowledgement for the transmission of the data packet if negative-only acknowledgement was enabled for the data packet, and/or if the first device receives no negative acknowledgement for the transmission of the data packet and if negative-only acknowledgement was enabled for the data packet, the first device determines the transmission corresponding to the last transmission of the data packet and the SL-PRS.

In various embodiments, the method further comprises if the sidelink resource pool is utilized for both transmission of sidelink data and SL-PRS: selecting or reserving one or more first sidelink resources in the sidelink resource pool; performing the transmission of the data packet and the SL-PRS on a first sidelink resource, among the one or more first sidelink resources; and at least when (a counter value of) the first counter is zero, clearing (reservation of) the one or more first sidelink resources and re-selecting one or more sidelink resources in the sidelink resource pool; or if the sidelink resource pool is dedicated for transmission of SL-PRS: selecting or reserving one or more second sidelink resources in the sidelink resource pool; performing the another transmission of the SL-PRS on a second sidelink resource, among the one or more second sidelink resources; and at least when (a counter value of) the second counter is zero, clearing (reservation of) the one or more second sidelink resources and re-selecting sidelink resources in the sidelink resource pool.

In various embodiments, the transmission of the data packet and the SL-PRS comprises a transmission of the data packet multiplexed with a transmission of the SL-PRS, the transmission of the data packet and the SL-PRS comprise the transmission of the data packet and the transmission of the SL-PRS in a same sidelink TTI and/or in same frequency domain resources, the data packet is a MAC PDU or a transport block, the transmission of the data packet is a sidelink data transmission comprising the data packet, and/or the sidelink data transmission is a PSSCH transmission.

Referring back to FIGS. 3 and 4, in one or more embodiments from the perspective of a first device in a wireless communication system, the device 300 includes a program code 312 stored in memory 310 of the transmitter. The CPU 308 could execute program code 312 to: (i) receive a configuration of a sidelink resource pool for at least transmission of SL-PRS; (ii) if the sidelink resource pool is utilized for both transmission of sidelink data and SL-PRS: perform a transmission of a data packet and an SL-PRS in the sidelink resource pool; determine the transmission corresponding to a last transmission of the data packet and the SL-PRS based on only transmission status of the data packet; and decrement a first counter for sidelink resource reselection by 1 in response to the determined last transmission; or (iii) if the sidelink resource pool is dedicated for transmission of SL-PRS: perform another transmission of an SL-PRS in the sidelink resource pool; determine the another transmission corresponding to a last transmission of the SL-PRS based on only transmission status of the SL-PRS, and decrement a second counter for sidelink resource reselection by 1 in response to the determined last transmission. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a first device, comprising:

receiving a configuration of a first sidelink resource pool for transmission of sidelink data and Sidelink Positioning Reference Signal (SL-PRS);

selecting or reserving one or more first sidelink resources in the first sidelink resource pool;

setting or maintaining a first counter for sidelink resource reselection;

performing a transmission of a data packet and an SL-PRS, on a first sidelink resource among the one or more first sidelink resources, in the first sidelink resource pool;

determining the transmission corresponding to a last transmission of the data packet and the SL-PRS based on only transmission status of the data packet;

decrementing the first counter by 1 in response to the determined last transmission; and clearing, at least when the first counter is zero, the one or more first sidelink resources and re-selecting one or more sidelink resources in the first sidelink resource pool.

2. The method of claim 1, wherein the last transmission of the data packet and the SL-PRS are determined not based on transmission status of the SL-PRS.

3. The method of claim 1, wherein:

the transmission of the data packet and the SL-PRS comprise a transmission of the data packet multiplexed with a transmission of the SL-PRS, and/or the transmission of the data packet and the SL-PRS comprise the transmission of the data packet and the transmission of the SL-PRS in a same sidelink Transmission Time Interval (TTI) and/or in same frequency domain resources.

4. The method of claim 1, wherein:

the transmission status of the data packet comprises at least whether a first number of Hybrid Automatic Repeat Request (HARQ) retransmissions of the data packet has been reached, and/or if the first device performs the transmission such that the first number of HARQ retransmissions of the data packet has been reached, the first device determines the transmission corresponding to the last transmission of the data packet and the SL-PRS.

5. The method of claim 1, wherein:

the transmission status of the data packet comprises at least whether the first device receives positive acknowledgement for the transmission of the data packet, and/or if the first device receives positive acknowledgement for the transmission of the data packet, the first device determines the transmission corresponding to the last transmission of the data packet and the SL-PRS.

6. The method of claim 1, wherein:

the transmission status of the data packet comprises at least whether the first device receives no negative acknowledgement for the transmission of the data packet if negative-only acknowledgement was enabled for the data packet, and/or if the first device receives no negative acknowledgement for the transmission of the data packet and if negative-only acknowledgement was enabled for the data packet, the first device determines the transmission corresponding to the last transmission of the data packet and the SL-PRS.

7. The method of claim 1, wherein:
the data packet is a Medium Access Control (MAC) Protocol Data Unit (PDU) or a transport block,
the transmission of the data packet is a sidelink data transmission comprising the data packet, and/or
the sidelink data transmission is a Physical Sidelink Shared Channel (PSSCH) transmission.

8. The method of claim 1, further comprising:
receiving a configuration of a second sidelink resource pool dedicated for transmission of SL-PRS;
setting or maintaining a second counter for sidelink resource reselection;
performing another transmission of an SL-PRS in the second sidelink resource pool;
determining the another transmission corresponding to a last transmission of the SL-PRS based on only transmission status of the SL-PRS, wherein the transmission status of the SL-PRS comprises at least whether a second number of SL-PRS transmissions has been reached; and
decrementing the second counter by 1 in response to the determined last transmission.

9. A method of a first device, comprising:
receiving a configuration of a first sidelink resource pool for transmission of sidelink data and Sidelink Positioning Reference Signal (SL-PRS);
selecting or reserving one or more first sidelink resources in the first sidelink resource pool;
setting or maintaining a first counter for sidelink resource reselection;
performing a transmission of a data packet and an SL-PRS, on a first sidelink resource among the one or more first sidelink resources, in the first sidelink resource pool;
determining the transmission corresponding to a last transmission of the data packet and the SL-PRS, if:
the first device receives positive acknowledgement for the transmission of the data packet;
the first device receives no negative acknowledgement for the transmission of the data packet if negative-only acknowledgement was enabled for the data packet; and/or
the first device performs the transmission such that a first number of Hybrid Automatic Repeat Request (HARQ) retransmissions of the data packet has been reached; and
decrementing the first counter by 1 in response to the determined last transmission; and
clearing, at least when the first counter is zero, the one or more first sidelink resources and re-selecting one or more sidelink resources in the first sidelink resource pool.

10. The method of claim 9, wherein the last transmission of the data packet and the SL-PRS are determined not based on transmission status of the SL-PRS.

11. The method of claim 9, wherein:
the transmission of the data packet and the SL-PRS comprise a transmission of the data packet multiplexed with a transmission of the SL-PRS, and/or
the transmission of the data packet and the SL-PRS comprise the transmission of the data packet and the transmission of the SL-PRS in a same sidelink Transmission Time Interval (TTI) and/or in same frequency domain resources.

12. The method of claim 9, wherein:
the data packet is a Medium Access Control (MAC) Protocol Data Unit (PDU) or a transport block,
the transmission of the data packet is a sidelink data transmission comprising the data packet, and/or
the sidelink data transmission is a Physical Sidelink Shared Channel (PSSCH) transmission.

13. The method of claim 9, further comprising:
receiving a configuration of a second sidelink resource pool dedicated for transmission of SL-PRS;
setting or maintaining a second counter for sidelink resource reselection;
performing another transmission of an SL-PRS in the second sidelink resource pool;
determining the another transmission corresponding to a last transmission of the SL-PRS, if the first device performs the another transmission such that a second number of SL-PRS transmissions has been reached; and
decrementing the second counter by 1 in response to the determined last transmission.

14. A method of a first device, comprising:
receiving a configuration of a sidelink resource pool for at least transmission of Sidelink Positioning Reference Signal (SL-PRS);
if the sidelink resource pool is utilized for both transmission of sidelink data and SL-PRS:
selecting or reserving one or more first sidelink resources in the sidelink resource pool;
performing a transmission of a data packet and an SL-PRS, on a first sidelink resource among the one or more first sidelink resources, in the sidelink resource pool;
determining the transmission corresponding to a last transmission of the data packet and the SL-PRS based on only transmission status of the data packet;
decrementing a first counter for sidelink resource reselection by 1 in response to the determined last transmission; and
clearing, at least when the first counter is zero, the one or more first sidelink resources and re-selecting one or more sidelink resources in the sidelink resource pool; or
if the sidelink resource pool is dedicated for transmission of SL-PRS:
selecting or reserving one or more second sidelink resources in the sidelink resource pool;
performing another transmission of an SL-PRS, on a second sidelink resource among the one or more second sidelink resources, in the sidelink resource pool;
determining the another transmission corresponding to a last transmission of the SL-PRS based on only transmission status of the SL-PRS;
decrementing a second counter for sidelink resource reselection by 1 in response to the determined last transmission; and
clearing, at least when the second counter is zero, the one or more second sidelink resources and re-selecting sidelink resources in the sidelink resource pool.

15. The method of claim 14, wherein:
the transmission status of the data packet comprises at least whether a first number of Hybrid Automatic Repeat Request (HARQ) retransmissions of the data packet has been reached,
if the first device performs the transmission such that the first number of HARQ retransmissions of the data packet has been reached, the first device determines the transmission corresponding to the last transmission of the data packet and the SL-PRS, the transmission status of the SL-PRS comprises at least whether a second number of SL-PRS transmissions has been reached, and/or if the first device performs the another transmission such that the second number of SL-PRS transmissions has been reached, the first device determines the another transmission corresponding to the last transmission of the SL-PRS.

16. The method of claim 14, wherein:

the transmission status of the data packet comprises at least whether the first device receives positive acknowledgement for the transmission of the data packet, if the first device receives positive acknowledgement for the transmission of the data packet, the first device determines the transmission corresponding to the last transmission of the data packet and the SL-PRS, the transmission status of the data packet comprises at least whether the first device receives no negative acknowledgement for the transmission of the data packet if negative-only acknowledgement was enabled for the data packet, and/or if the first device receives no negative acknowledgement for the transmission of the data packet and if negative-only acknowledgement was enabled for the data packet, the first device determines the transmission corresponding to the last transmission of the data packet and the SL-PRS.

17. The method of claim 14, wherein:

the transmission of the data packet and the SL-PRS comprises a transmission of the data packet multiplexed with a transmission of the SL-PRS, the transmission of the data packet and the SL-PRS comprise the transmission of the data packet and the transmission of the SL-PRS in a same sidelink Transmission Time Interval (TTI) and/or in same frequency domain resources, the data packet is a Medium Access Control (MAC) Protocol Data Unit (PDU) or a transport block, the transmission of the data packet is a sidelink data transmission comprising the data packet, and/or the sidelink data transmission is a Physical Sidelink Shared Channel (PSSCH) transmission.

* * * * *